(12) United States Patent
Natarajan et al.

(10) Patent No.: US 7,413,678 B1
(45) Date of Patent: *Aug. 19, 2008

(54) ELECTRICALLY SWITCHABLE POLYMER-DISPERSED LIQUID CRYSTAL MATERIALS

(75) Inventors: Lalgudi V. Natarajan, Beavercreek, OH (US); Richard L. Sutherland, Bellbrook, OH (US); Vince P. Tondiglia, Dayton, OH (US); Timothy J. Bunning, Beavercreek, OH (US)

(73) Assignee: Science Applications International Corporation, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/395,161

(22) Filed: Apr. 3, 2006

Related U.S. Application Data

(63) Continuation of application No. 10/235,633, filed on Sep. 6, 2002, now Pat. No. 7,077,984, which is a continuation-in-part of application No. 09/363,169, filed on Jul. 29, 1999, now Pat. No. 6,821,457.

(60) Provisional application No. 60/094,578, filed on Jul. 29, 1998.

(51) Int. Cl.
C09K 19/52 (2006.01)
C09K 19/38 (2006.01)
G02B 5/32 (2006.01)
G03H 1/04 (2006.01)

(52) U.S. Cl. .................. 252/299.01; 430/2; 430/20; 359/15

(58) Field of Classification Search .............. 428/1.1; 252/299.01; 430/2, 20; 359/15; 385/15, 385/16

See application file for complete search history.

(56) References Cited

U.S. PATENT DOCUMENTS

| | | | |
|---|---|---|---|
| 3,432,225 A | 3/1969 | Rock | 350/164 |
| 3,565,509 A | 2/1971 | Sulzbach | 350/164 |
| 3,580,655 A | 5/1971 | Leith et al. | 350/3.5 |
| 3,658,526 A | 4/1972 | Haugh | 96/27 |
| 3,667,946 A | 6/1972 | Sturdevant | 96/35.1 |
| 3,758,186 A | 9/1973 | Brumm | 350/3.5 |
| 4,003,629 A | 1/1977 | Baues et al. | 350/96 C |
| 4,006,963 A | 2/1977 | Baues et al. | 350/96 C |
| 4,018,228 A | 4/1977 | Goosen | 128/305 |
| 4,022,947 A | 5/1977 | Grubb et al. | 428/432 |
| 4,045,124 A | 8/1977 | Pollack et al. | 350/160 LC |
| 4,124,947 A | 11/1978 | Kuhl et al. | 40/453 |
| 4,210,132 A | 7/1980 | Perlin | 128/1 R |
| 4,368,736 A | 1/1983 | Kaster | 128/334 C |
| 4,374,371 A | 2/1983 | Narancic | 337/159 |
| 4,416,540 A | 11/1983 | Nicholson | 350/3.69 |
| 4,477,784 A | 10/1984 | Maerfeld et al. | 333/153 |
| 4,560,249 A | 12/1985 | Nishiwaki et al. | 350/162.17 |
| 4,673,241 A | 6/1987 | Nishiwaki et al. | 350/3.64 |
| 4,688,900 A | 8/1987 | Doane et al. | 350/347 V |
| 4,728,547 A | 3/1988 | Vaz et al. | 428/1 |
| 4,799,746 A | 1/1989 | Wreede | 359/3 |
| 4,809,713 A | 3/1989 | Grayzel | 128/785 |
| 4,810,063 A | 3/1989 | Fergason | 350/347 V |
| 4,818,070 A | 4/1989 | Gunjima et al. | 350/334 |
| 4,832,424 A | 5/1989 | McGrew | 350/3.65 |
| 4,856,876 A | 8/1989 | Fergason | 350/350 F |
| 4,857,425 A | 8/1989 | Phillips | 430/1 |
| 4,891,152 A | 1/1990 | Miller et al. | 252/299.01 |
| 4,923,269 A | 5/1990 | Healey | 350/96.15 |
| 4,929,240 A | 5/1990 | Kirsch et al. | 606/151 |
| 4,930,674 A | 6/1990 | Barak | 227/179 |
| 4,938,568 A | 7/1990 | Margerum et al. | 350/334 |
| 4,942,102 A | 7/1990 | Keys et al. | 430/1 |
| 4,983,176 A | 1/1991 | Cushman et al. | 606/151 |
| 4,994,204 A | 2/1991 | Doane et al. | 252/299.01 |
| 5,003,386 A | 3/1991 | Doyle et al. | 358/90 |
| 5,011,624 A | 4/1991 | Yamagishi et al. | 252/299.5 |
| 5,014,709 A | 5/1991 | Bjelkhagen et al. | 128/654 |
| 5,015,249 A | 5/1991 | Nakao et al. | 606/142 |
| 5,047,039 A | 9/1991 | Avant et al. | 606/148 |
| 5,047,040 A | 9/1991 | Simpson et al. | 606/159 |
| 5,084,203 A | 1/1992 | Sansone et al. | 252/299.5 |
| 5,096,282 A | 3/1992 | Margerum et al. | 359/3 |

(Continued)

FOREIGN PATENT DOCUMENTS

CA 544591 8/1957

(Continued)

OTHER PUBLICATIONS

International Search Report for Application No. PCT/US97/12577, dated Jan. 14, 1998 (mailing date).

(Continued)

Primary Examiner—Shean C Wu
(74) Attorney, Agent, or Firm—King & Spalding LLP

(57) ABSTRACT

A new photopolymerizable material allows single-step, fast recording of volume holograms with properties that can be electrically controlled. Polymer-dispersed liquid crystals (PDLCs) in accordance with the invention preferably comprise a homogeneous mixture of a nematic liquid crystal and a multifunctional pentaacrylate monomer in combination with photoinitiator, coinitiator and cross-linking agent. Optionally, a surfactant such as octanoic acid may also be added. The PDLC material is exposed to coherent light to produce an interference pattern inside the material. Photopolymerization of the new PDLC material produces a hologram of clearly separated liquid crystal domains and cured polymer domains.

19 Claims, 40 Drawing Sheets

U.S. PATENT DOCUMENTS

| | | | |
|---|---|---|---|
| 5,105,298 A | 4/1992 | Schellenberg | 359/3 |
| 5,136,666 A | 8/1992 | Anderson et al. | 385/24 |
| 5,166,813 A | 11/1992 | Metz | 359/15 |
| 5,170,925 A | 12/1992 | Madden et al. | 227/175 |
| 5,174,276 A | 12/1992 | Crockard | 128/4 |
| 5,182,180 A | 1/1993 | Gambogi, Jr. et al. | 430/1 |
| 5,182,665 A | 1/1993 | O'Callaghan et al. | 359/95 |
| 5,188,638 A | 2/1993 | Tzakis | 606/153 |
| 5,198,912 A | 3/1993 | Ingwall et al. | 359/3 |
| 5,210,630 A | 5/1993 | Heynderickx et al. | 359/106 |
| 5,220,928 A | 6/1993 | Oddsen et al. | 128/898 |
| 5,227,859 A | 7/1993 | Leib et al. | 556/347 |
| 5,227,906 A | 7/1993 | Tokumitsu | 359/117 |
| 5,234,447 A | 8/1993 | Kaster et al. | 606/153 |
| 5,235,445 A | 8/1993 | Hirai et al. | 359/52 |
| 5,240,636 A | 8/1993 | Doane et al. | 252/299.01 |
| 5,258,008 A | 11/1993 | Wilk | 606/219 |
| 5,264,950 A | 11/1993 | West et al. | 359/51 |
| 5,270,843 A | 12/1993 | Wang | 359/52 |
| 5,272,550 A | 12/1993 | Dickson et al. | 359/3 |
| 5,291,317 A | 3/1994 | Newswanger | 359/15 |
| 5,299,289 A | 3/1994 | Omae et al. | 359/95 |
| 5,303,322 A | 4/1994 | Winston et al. | 385/146 |
| 5,313,317 A | 5/1994 | Saburi et al. | 359/13 |
| 5,323,251 A | 6/1994 | Coates et al. | 359/51 |
| 5,328,800 A | 7/1994 | Yokoya et al. | 430/203 |
| 5,330,264 A | 7/1994 | Ando et al. | 359/12 |
| 5,330,486 A | 7/1994 | Wilk | 606/139 |
| 5,332,618 A | 7/1994 | Austin | 428/216 |
| 5,354,498 A | 10/1994 | Akashi et al. | 252/299.01 |
| 5,356,557 A | 10/1994 | Jubb et al. | 252/299.01 |
| 5,363,228 A | 11/1994 | DeJule et al. | 359/117 |
| 5,366,462 A | 11/1994 | Kaster et al. | 505/153 |
| 5,376,095 A | 12/1994 | Ortiz | 505/143 |
| 5,384,067 A | 1/1995 | Doane et al. | 252/299.01 |
| 5,453,338 A | 9/1995 | Suga et al. | 430/1 |
| 5,471,326 A | 11/1995 | Hall et al. | 359/15 |
| 5,488,681 A | 1/1996 | Deacon et al. | 385/37 |
| 5,499,118 A | 3/1996 | Wreede et al. | 359/12 |
| 5,529,861 A | 6/1996 | Redfield | 430/1 |
| 5,544,268 A | 8/1996 | Bischel et al. | 385/4 |
| 5,547,786 A | 8/1996 | Brandstetter et al. | 430/1 |
| 5,593,615 A | 1/1997 | Nerad et al. | 252/299.01 |
| 5,641,426 A | 6/1997 | Nerad et al. | 252/299.01 |
| 5,648,857 A | 7/1997 | Ando et al. | 359/12 |
| 5,661,533 A | 8/1997 | Wu et al. | 349/169 |
| 5,661,577 A | 8/1997 | Jenkins et al. | 359/11 |
| 5,680,233 A | 10/1997 | Faris et al. | 359/41 |
| 5,695,682 A | 12/1997 | Doane et al. | 252/299.01 |
| 5,698,134 A | 12/1997 | Jubb et al. | 252/299.01 |
| 5,698,343 A | 12/1997 | Sutherland et al. | 430/1 |
| 5,706,375 A | 1/1998 | Mihailov et al. | 385/24 |
| 5,725,970 A | 3/1998 | Martin et al. | 430/2 |
| 5,731,853 A | 3/1998 | Taketomi et al. | 349/15 |
| 5,734,485 A | 3/1998 | Buchkremer et al. | 359/25 |
| 5,748,272 A | 5/1998 | Tanaka et al. | 349/86 |
| 5,751,452 A | 5/1998 | Tanaka et al. | 359/52 |
| 5,771,320 A | 6/1998 | Stone | 385/16 |
| 5,832,148 A | 11/1998 | Yariv | 385/16 |
| 5,852,504 A | 12/1998 | Kato et al. | 359/9 |
| 5,862,214 A | 1/1999 | Aggus et al. | 379/435 |
| 5,875,012 A | 2/1999 | Crawford et al. | 349/74 |
| 5,915,051 A | 6/1999 | Damask et al. | 385/16 |
| 5,930,011 A | 7/1999 | Gambogi, Jr. et al. | 359/15 |
| 5,937,115 A | 8/1999 | Domash | 385/16 |
| 5,942,157 A | 8/1999 | Sutherland et al. | 252/582 |
| 6,115,152 A | 9/2000 | Popovich et al. | 359/15 |
| 6,118,512 A * | 9/2000 | Sakaigawa et al. | 349/166 |
| 6,172,778 B1 | 1/2001 | Reinhorn et al. | 359/15 |
| 6,211,976 B1 | 4/2001 | Popovich et al. | 359/15 |
| 6,426,811 B1 | 7/2002 | Popovich et al. | 359/15 |
| 6,646,772 B1 | 11/2003 | Popovich et al. | 359/15 |
| 6,667,134 B1 | 12/2003 | Sutherland et al. | 430/1 |
| 6,677,086 B1 | 1/2004 | Sutherland et al. | 430/1 |
| 6,692,666 B2 | 2/2004 | Sutherland et al. | 252/582 |
| 6,699,407 B1 | 3/2004 | Sutherland et al. | 252/582 |
| 6,706,451 B1 | 3/2004 | Sutherland et al. | 430/2 |
| 6,821,457 B1 | 11/2004 | Natarajan et al. | 252/582 |
| 6,833,938 B2 | 12/2004 | Nishioka | 359/15 |
| 6,867,888 B2 | 3/2005 | Sutherland et al. | 359/15 |
| 6,878,494 B2 | 4/2005 | Sutherland et al. | 430/2 |
| 7,018,686 B2 | 3/2006 | Sutehrland et al. | 428/1.1 |
| 7,077,984 B1 * | 7/2006 | Natarajan et al. | 252/582 |
| 7,081,215 B2 | 7/2006 | Natarajan et al. | 252/582 |
| 7,198,737 B2 | 4/2007 | Natarajan et al. | 252/582 |

FOREIGN PATENT DOCUMENTS

| | | |
|---|---|---|
| DE | 44 08 746 A1 | 9/1995 |
| EP | 0 087 281 A1 | 8/1983 |
| EP | 0 422 689 A2 | 4/1991 |
| EP | 0 672 386 A1 | 9/1995 |
| EP | 0 856 765 A1 | 8/1998 |
| EP | 0 856 766 A2 | 8/1998 |
| EP | 0 856 768 A2 | 8/1998 |
| EP | 0 867 749 A2 | 9/1998 |
| GB | 2 222 696 | 3/1990 |
| GB | 2 281 566 | 3/1995 |
| GB | 2 292 745 | 3/1996 |
| JP | 60189729 A | 9/1985 |
| JP | 1-68784 A | 3/1989 |
| JP | 3-188479 A | 8/1991 |
| JP | 10319237 | 12/1998 |
| SU | 1635966 | 3/1991 |
| WO | WO 81/00668 | 3/1981 |
| WO | WO 89/06264 | 7/1989 |
| WO | WO 94/04958 | 3/1994 |
| WO | WO 95/17127 | 6/1995 |
| WO | WO 97/27519 | 7/1997 |
| WO | WO 98/04650 | 2/1998 |
| WO | WO 99/09440 | 2/1999 |

OTHER PUBLICATIONS

Written Opinion for Application No. PCT/US97/12577, dated Apr. 28, 1998 (mailing date).

Preliminary Examination Report for Application No. PCT/US97/12577, dated Sep. 3, 1998 (mailing date).

European Search Report for Application No. EP 97 93 7988, dated Oct. 13, 1999.

International Search Report for Application No. PCT/US00/34661, dated Jul. 17, 2001.

International Preliminary Examination Report for Application No. PCT/US00/34661, dated Feb. 20, 2002.

International Search Report for Application No. PCT/US01/40691, dated Sep. 5, 2001 (mailing date).

Written Opinion for Application No. PCT/US01/40691, dated May 15, 2002 (mailing date).

Preliminary Examination Report for Application No. PCT/US01/40691, dated Sep. 10, 2002 (mailing date).

Sutherland, Richard L., "Polarization and Switching Properties of Holographic Polymer-Dispersed Liquid-Crystal Gratings. I. Theoretical Model," *J. Opt. Soc. Am. B*, vol. 19, No. 12, pp. 2995-3003, Dec. 2002.

Sutherland, Richard L., et al., "Polarization and Switching Properties of Holographic Polymer-Dispersed Liquid-Crystal Gratings. II. Experimental Investigations," *J. Opt. Soc. Am. B*, vol. 19, No. 12, pp. 3004-3012, Dec. 2002.

Sutherland, Richard L., et al., "Evolution of Anisotropic Reflection Gratings Formed in Holographic Polymer-Dispersed Liquid Crystals," *Applied Physics Letters*, vol. 79, No. 10, pp. 1420-1422, Sep. 3, 2001.

Bowley, Chris C., et al., "Variable-Wavelength Switchable Bragg Gratings Formed in Polymer-Dispersed Liquid Crystals," *Applied Physics Letters*, vol. 79, No. 1, pp. 9-11, Jul. 2, 2001.

"Handbook of Advanced Electronic and Photonic Materials and Devices," *Liquid Crystals, Display, and Laser Materials*, vol. 7, Academic Press, Cover, Copyright Page, Table of Contents (xiii-xvi), pp. 67-103, Copyright 2001.

Cramer, Neil B., et al., "Kinetics of Thiol-Ene and Thiol-Acrylate Photopolymerizations with Real-Time Fourier Transform Infrared," *Journal of Polymer Science: Part A: Polymer Chemistry*, vol. 39, pp. 3311-3319, 2001.

Warren, Garfield T., et al., "P-81: In-Situ Spectroscopy of Holographically Formed Polymer Dispersed Liquid Crystal Materials for High Performance Reflective Display Applications," *SID Digest of Technical Papers*, San Jose, pp. 866-869, 2001.

Sutherland, Richard L., et al., "Switchable Holograms for Displays and Telecommunications," *Proceedings of SPIE*, vol. 4463, pp. 1-10, 2001.

Cole, Michael C., et al., "Photoinitiatorless Photopolymerizations Involving Monomers That Form Charge Transfer Complexes," *Radtech Technical Proceedings*, Tokyo, Japan, pp. 211-220, Dec. 2000.

Bowley, C. C., et al., "Improved Reflective Displays Based on Polymer-Dispersed Liquid Crystals," *J. Opt. Technol.*, vol. 67, No. 8, pp. 717-722, Aug. 2000.

Domash, L., et al., "Holographic PDLC for Photonic Applications," *Proceedings of SPIE*, vol. 4107, pp. 46-58, 2000.

Bunning, T. J., et al., "Holographic Polymer-Dispersed Liquid Crystals (H-PDLCs)," *Annu. Rev. Mater. Sci.*, vol. 30, pp. 83-115, 2000.

R. T. Pogue, et al., "Monomer Functionality Effects in the Anisotropic Phase Separation of Liquid Crystals," *Polymer* 41, pp. 733-741, 2000.

Natarajan, L. V., et al., "Electrically Switchable Reflection Gratings in Polymer Dispersed Liquid Crystals," *Mat. Res. Soc. Symp. Proc.*, vol. 559, pp. 109-116, 1999.

Klosterman, A. M., et al., "Voltage Creep in Holographic PDLC Gratings," *Mat. Res. Soc. Symp. Proc.*, vol. 559, pp. 129-134, 1999.

C. C. Bowley, et al., "Advances in Holographic Polymer Dispersed Liquid Crystal Technology," in *Liquid Crystal Materials and Devices*, Mat. Res. Soc. Symposium Proceedings, vol. 559, pp. 97-107, 1999.

C. C. Bowley, et al., "45.3: Electro-Optic Investigations of H-PDLCS: The Effect of Monomer Functionality on Display Performance ," *SID International Symposium, Digest of Technical Papers*, First Edition, pp. 958-961, May 1999.

M. Escuti, et al., "5.3: A Model of the Fast-Switching Polymer-Stabilized IPS Configuration," *SID International Symposium, Digest of Technical Papers*, First Edition, pp. 32-35, May 1999.

M. Date, et al., "Full-Color Reflective Display Device Using Holographically Fabricated Polymer-Dispersed Liquid Crystal (HPDLC)," *Journal of the Society for Information Display (SID)*, vol. 7, pp. 17-22, 1999.

Seferis, James C., "Refractive Indices of Polymers," *Polymer Handbook*, 4th Edition, John Wiley & Sons, Inc., pp. 571-582, Copyright 1999.

C. C. Bowley, et al., "Morphology of Holographically-Formed Polymer Dispersed Liquid Crystals (H-PDLC)," *Mol. Cryst. Liq. Cryst.*, vol. 331, pp. 209-216, 1999.

J. A. Firehammer, et al., "Lasing Pixels: A New Application for Polymer Dispersed Liquid Crystals (PDLCs)," *Mol. Cryst. Liq. Cryst.*, vol. 331, pp. 165-172, 1999.

Richard L. Sutherland, et al., "Switchable Holograms for Displays and Other Applications," *SPIE Proceedings*, vol. 3421, pp. 8-18, Jun. 1998.

L. V. Natarajan, et al., "Holographic PDLCs for Optical Beam Modulation, Deflection, and Dynamic Filter Applications," *SPIE Proceedings*, vol. 3292, pp. 44-51, Jan. 28-29, 1998.

J. Liu, et al., "Cross-Link Optimized Cascaded Volume Hologram Array with Energy-Equalized One-to-Many Surface-Normal Fan-Outs," *Optics Letters*, vol. 22, pp. 1024-1026 (1997).

K. Thilo Weitzel,et al., "Hologram Recording in DuPont Photopolymer Films by Use of Pulse Exposure," *Optics Letter*, vol. 22, No. 24, Dec. 15, 1997.

L. V. Natarajan, et al., "Electrically Switchable Holograms Containing Novel PDLC Structures," *SPIE Proceedings*, vol. 3143, pp. 182-190, Jul. 28-29, 1997.

N. M. Lawandy, et al., "L1.3: Lasing Pixel PDLC Light Valves for Projection Applications," *SID International Symposium, Digest of Technical Papers*, First Edition, pp. 1001-1004, May 1997.

Montemazzani, G., et al., "Light Diffraction at Mixed Phase and Absorption Gratings in Anisotropic Media for Arbitrary Geometries," *Physical Review E*, vol. 55, No. 1, pp. 1035-1047, Jan. 1997.

Tondiglia, V. P., et al., "Effects of Varying Surfactants on the Electro-Optical Switching Characteristics of Volume Holograms Recorded in PDLC's," *Mat. Res. Soc. Symp. Proc.*, vol. 479, pp. 235-240, 1997.

G. P. Crawford, et al., "Reflective Color LCDs Based on H-PDLC and PSCT Technologies," *Journal of the Society for Information Display*, vol. 5, No. 1, pp. 45-48, 1997.

V. N. Mikhailov, et al., "Pulse Hologram Recording in DuPont's Photopolymer Films," *SPIE*, vol. 3011, pp. 200-202, 1997.

D. Schwarze-Haller and F. Noack, "Nuclear Magnetic Resonance Field-Cycling Proton Relaxation Study of Polymer Dispersed Liquid Crystals," *J. Chem. Phys.*, vol. 105, No. 11, pp. 4823-4832, Sep. 1996.

G. P. Crawford, et al., "Reflective Color LCDs Based on H-PDLC and PSCT Technologies," *SID International Symposium, Digest of Applications Papers*, pp. 99, May 14-16, 1996.

Lawrence H. Domash, et al., "Switchable-Focus Lenses in Holographic Polymer Dispersed Liquid Crystal," *SPIE*, vol. 2689, pp. 188-194, May 1996.

Richard L. Sutherland, et al., "The Physics of Photopolymer-Liquid Crystal Composite Holographic Gratings," *SPIE Proceedings*, vol. 2689, pp. 158-169, May 1996.

Timothy J. Bunning, et al., "The Effects of Eliminating the Chain Extender and Varying the Grating Periodicity on the Morphology of Holographically Written Bragg Gratings," *SPIE Proceedings*, vol. 2651, pp. 44-54, Jan. 31-Feb. 1, 1996.

T. J. Bunning, et al., "Morphology of Reflection Holograms Formed in situ Using Polymer-Dispersed Liquid Crystals," *Polymer*, vol. 37, No. 14, pp. 3147-3150, 1996.

G. S. Iannacchione, et al., "Deuterium NMR and Morphology Study of Polymer-Dispersed Liquid-Crystal Bragg Gratings," *Europhysics Letters*, vol. 36, No. 6, pp. 425-430, 1996.

L. V. Natarajan, et al., "Electro-Optical Switching Characteristics of Volume Holograms in Polymer Dispersed Liquid Crystals," *Journal of Nonlinear Optical Physics and Materials*, vol. 5, No. 1, pp. 89-98, Jan. 1996.

R. L. Sutherland, et al., "Switchable Bragg Gratings Formed Within a Polymer-Dispersed Liquid Crystal Composite Medium," *Materials Research Society Symp. Proc.*, vol. 425, pp. 331-341, Apr. 8-11, 1996.

Drzaic, P. S., "Phase Separation Methods for PDLC Films," *Liquid Crystal Dispersions, World Scientific*, Singapore, pp. 30-59, 1995.

Richard L. Sutherland, et al., "Analysis of Periodic Polymer-Dispersed Liquid Crystal Structures for Dynamic Hologram Applications," *SPIE Proceedings*, vol. 2532, pp. 309-318, Jul. 10-12, 1995.

V. P. Tondiglia, et al., "Volume Holographic Image Storage and Electro-Optical Readout in a Polymer-Dispersed Liquid Crystal Film," *Optics Letters*, vol. 20, No. 11, pp. 1325-1327, Jun. 1, 1995.

Richard L. Sutherland, et al., "Switchable Holograms in New Photopolymer-Liquid Crystal Composite Materials," *SPIE Proceedings*, vol. 2404, pp. 132-143, Feb. 9-10, 1995.

N. Kawatsuki and H. Ono, "Electro-Optical Properties of Polymer/(Liquid Crystal) Composite Film Fabricated by Two-Step Phase Separation Method," *Chemistry Letters*, No. 5, pp. 333-334, 1995.

T. J. Bunning, et al., "The Morphology and Performance of Holographic Transmission Gratings Recorded in Polymer Dispersed Liquid Crystals," *Polymer*, vol. 36, No. 14, pp. 2699-2708, 1995.

R. L. Sutherland, et al., "Electrically Switchable Volume Gratings in Polymer-Dispersed Liquid Crystals," *Appl. Phys. Lett.*, vol. 64, No. 9, pp. 1074-1076, Feb. 28, 1994.

Richard L. Sutherland, et al., "Development of Photopolymer-Liquid Crystal Composite Materials for Dynamic Hologram Applications," *SPIE Proceedings*, vol. 2152, pp. 303-313, Jan. 26-28, 1994.

J. Zhang, et al., "Switchable Holograms Recorded in Liquid Crystalline Monomers," *SPIE*, vol. 2042, pp. 238-247 (Jan. 1994).

K. Tanaka, et al., "Holographically Formed Liquid-Crystal/Polymer Device for Reflective Color Display," *Journal of the Society for Information Display*, vol. 2, No. 1, pp. 37-38, 1994.

L. Domash, et al., "Programmable Beamlet Generator, Dynamic Lens, and Optical Memory Using Electrically Switched Holographic Devices," *SPIE Proceedings*, vol. 2026, pp. 642-652, Nov. 1993.

Jacobine, A. F., "Thiol-Ene Photopolymers (Chapter 7)," in *Radiation Curing in Polymer Science and Technology—vol. III, Polymerization Mechanisms*, Elsevier Applied Science, Cover Page, Copyright Page, Table of Contents (v-vi), pp. 219-268, Copyright 1993.

D. J. Lougnot, et al., "Photopolymers for Holographic Recording: IV. New Self-Processing Formulations Based on β-Hydroxy Ethyloxazolidone Acrylate," *Pure Appl. Opt.*, vol. 2, pp. 383-392, 1993.

R. L. Sutherland, et al., "Bragg Gratings in an Acrylate Polymer Consisting of Periodic Polymer-Dispersed Liquid Crystal Planes," *Chem. Mater.*, vol. 5, No. 10, pp. 1533-1538, 1993.

Luck, Russell M., et al., "Shrinkage in Conventional Monomers During Polymerization (Chapter 1)," in *Expanding Monomers: Synthesis, Characterization, and Applications*, CRC Press, Inc., Cover Page, Copyright Page, Table of Contents (1 p.), 1-61.

H. I. Bjelkhagen, et al., "High-Resolution Contact Denisyuk Holography," *Applied Optics*, vol. 31, No. 8, pp. 1041-1047, Mar. 10, 1992.

Hideya Murai, et al., "Electro-Optic Properties for Liquid Crystal Phase Gratings," *SPIE Proceedings*, vol. 1665, pp. 230-239, Feb. 11-13, 1992.

Lawrence H. Domash, "Applications of Dynamic Holograms for Quasi-Volume Storage," *SPIE Proceedings, Very Large Optical Memories-Materials and System Architectures*, vol. 1773, 5 pp., 1992.

J. Zhang, et al., "Switchable Liquid Crystalline Photopolymer Media for Holography," *J. Am. Chem. Soc.*, vol. 114(4), pp. 1506-1507 (1992).

Richard T. Ingwall and Timothy Adams, Hologram: Liquid Crystal Composites, *SPIE Proceedings*, vol. 1555, pp. 279-290, Jul. 24-25, 1991.

R. L. Sutherland, "Optical Limiters, Switches, and Filters Based on Polymer Dispersed Liquid Crystals," *SPIE Proceedings*, vol. 1080, pp. 83-90, Jan. 17-18, 1989.

A. M. Lackner, et al., "Droplet Size Control in Polymer Dispersed Liquid Crystal Films," *SPIE Proceedings*, vol. 1080, pp. 53-61, Jan. 17-18, 1989.

Yamagishi, Frederick G., et al., "Morphological Control in Polymer-Dispersed Liquid Crystal Film Matrices," *SPIE*, vol. 1080, pp. 24-31, 1989.

Wu, Bao-Gang, et al., "Response Times and Voltages for PDLC Light Shutters," *Liquid Crystals*, vol. 5, No. 5, pp. 1453-1465, 1989.

Smith, G. W., et al., "The Interfacial Free Energy of Nematogen Droplets in an Isotropic Matrix: Determination of its Temperature Dependence from Coalescence Kinetics," *Mol. Cryst. Liq. Cryst.*, vol. 174, pp. 49-64, 1989.

G. von Bally, et al., "Gradient-Index Optical Systems in Holographic Endoscopy," *Applied Optics*, vol. 23, No. 11, pp. 1725-1729, Jun. 1, 1984.

Allan R. Tokuda, et al., "Holocamera for 3-D Micrography of the Alert Human Eye," *Applied Optics*, vol. 19, No. 13, pp. 2219-2225, Jul. 1, 1980.

Stephen A. Benton, et al., "One-Step White-Light Transmission Holography," *SPIE*, vol. 215, pp. 156-161, 1980.

Stephen A. Benton, et al., "One-Step White-Light Transmission Holography," *SPIE*, vol. 212, pp. 2-7, 1979.

Hori, Asai, and Fukai, "Field-Controllable Liquid-Crystal Phase Grating," *IEEE*, vol. ED-16, p. 1734 (4 pp.), 1979.

Born and Wolf, "Principles of Optics," 5th Edition, New York (1975).

Edited by H. Bennett, "Cooncise Chemical and Technical Dictionary, FAIC" Chemical Publishing Co., Inc., 1974.

R. A. Kashnow and J. E. Bigelow, "Diffraction From a Liquid Crystal Phase Grating," *Applied Optics*, vol. 12, No. 10, pp. 2302-2304, Oct. 1973.

Kogelnik, Herwig, "Coupled Wave Theory for Thick Hologram Gratings," *The Bell System Technical Journal*, vol. 48, No. 9, pp. 2909-2947, Nov. 1969.

Stoke, Funkhouser, Leonard, Indebetoew, and Zech, "Hand-Held Holography," 1 p., Sep. 19, 1966.

G. W. Stroke and A. E. Labeyrie, "White-Light Reconstruction of Holographic Images Using the Lippmann-Bragg Diffraction Effect," *Physics Letters*, vol. 20, No. 4, pp. 368-370, Mar. 1, 1966.

\* cited by examiner

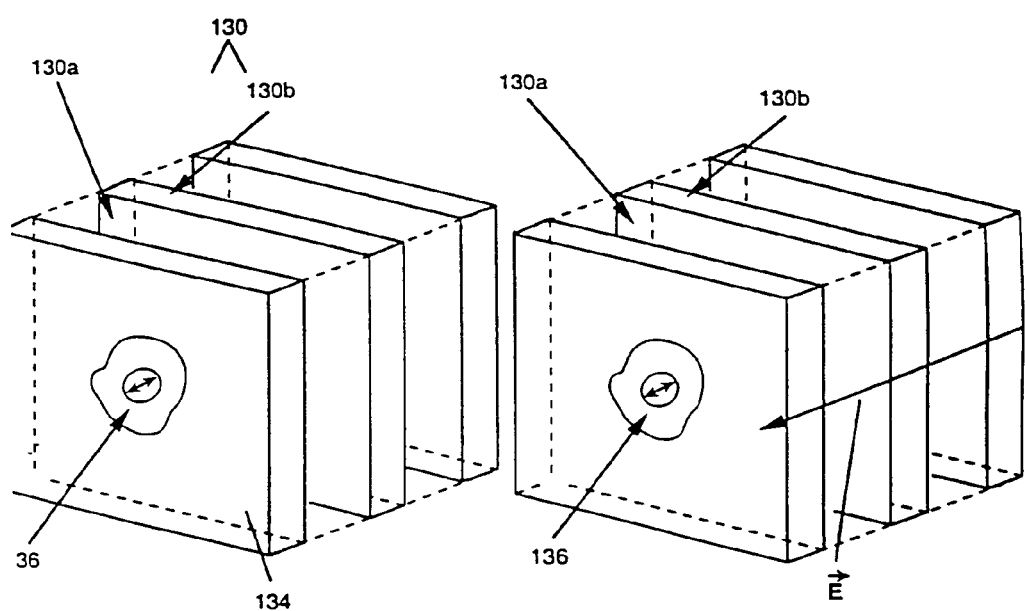
FIG. 8a    <u>Reflection Grating</u>    FIG. 8b

Reflection Grating

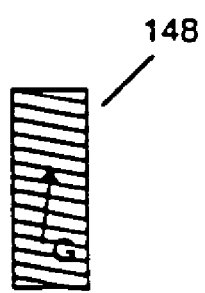
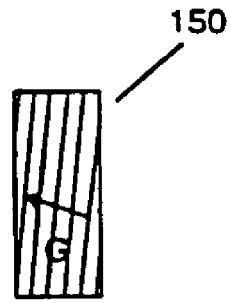
Slanted
transmission                    reflection
FIG. 11a                    FIG. 11b

Light Transmitted

Light Blocked

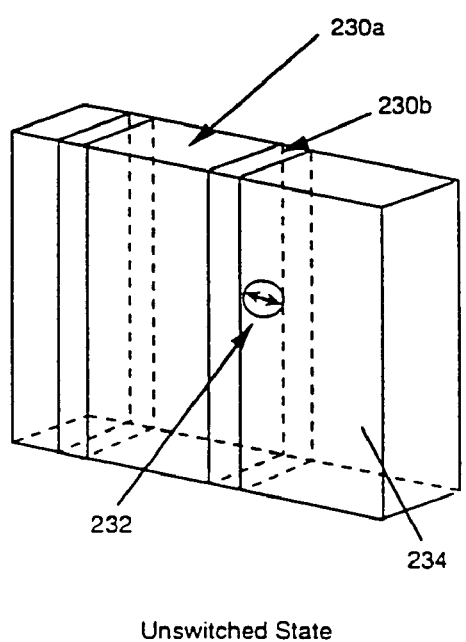 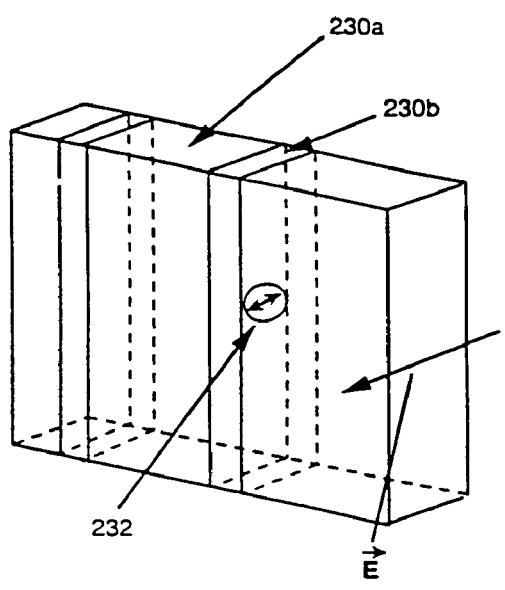
Unswitched State
Switched State
FIG. 16a
FIG. 16b

Voltage-On: Substrate Mode

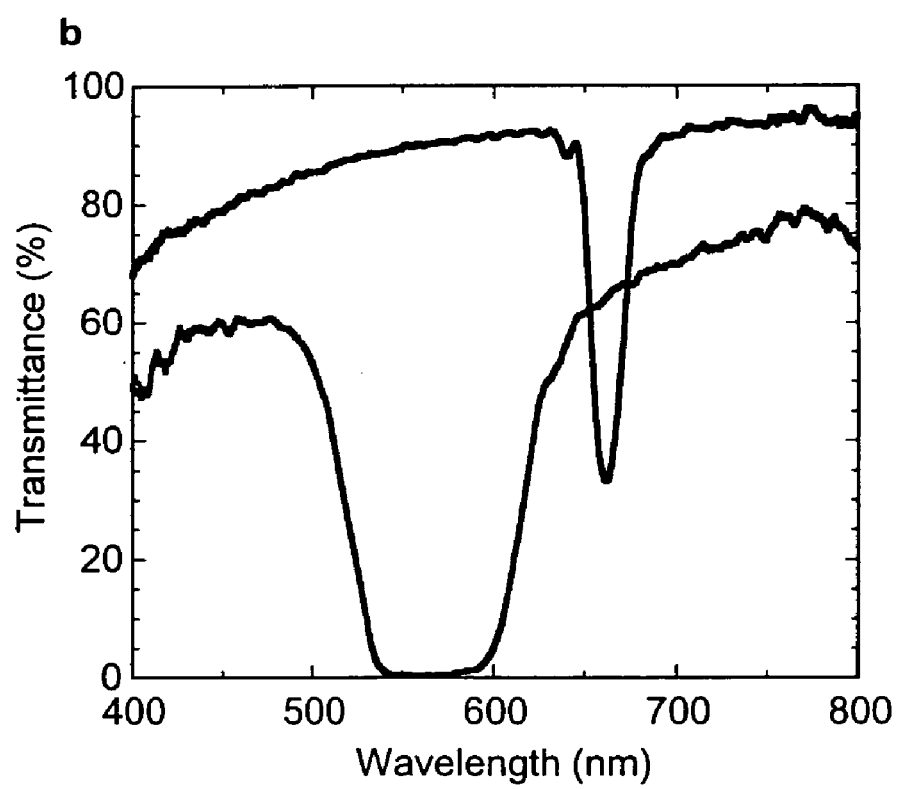
FIG. 35

 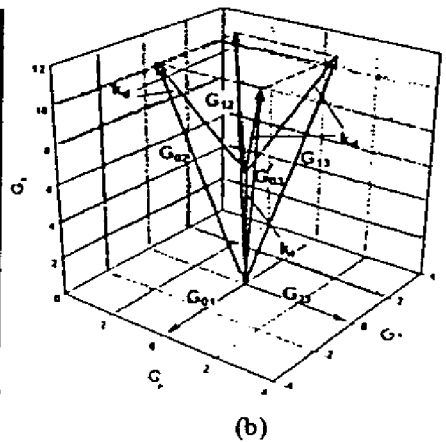
(a) (b)
FIG. 38

ELECTRICALLY SWITCHABLE POLYMER-DISPERSED LIQUID CRYSTAL MATERIALS

CROSS-REFERENCE TO RELATED APPLICATIONS

This application is a continuation of U.S. patent application Ser. No. 10/235,633, filed Sep. 6, 2002 now U.S. Pat. No. 7,077,984, which is a continuation-in-part of U.S. Utility patent application Ser. No. 09/363,169 filed Jul. 29, 1999 now U.S. Pat. No. 6,821,457, which claims the benefit of U.S. Provisional Application Ser. No. 60/094,578, filed Jul. 29, 1998 and U.S. Utility patent application Ser. No. 09/033,512 filed Mar. 2, 1998, which claims the benefit of U.S. application Ser. No. 08/680,292, now U.S. Pat. No. 5,942,157, which are incorporated herein by reference in their entireties.

BACKGROUND OF THE INVENTION

1. Field of Invention

The present invention relates generally to electrically switchable polymer-dispersed liquid crystal holographic materials, and more specifically to switchable polymer-dispersed liquid crystal materials suitable for switchable optical coupling and reconfigurable optical interconnects.

2. Description of Related Art

Typical state-of-the-art holographic materials do not have an electro-optical nature which can be exploited for real time control of their optical properties. That is, once the hologram is fixed, its optical characteristics cannot be changed. Thus, it is seen that there is a need for materials that can record volume holograms with properties that can be electrically controlled.

Liquid crystals have long been utilized in the prior art for their ability to change their optical orientation in the presence of an electric field. Additionally, liquid crystals can dramatically increase the diffraction efficiency of a volume hologram of which they are a part. Together, these properties offer the very desirable possibility of electrically switching the diffraction efficiency of volume holograms for use in a wide variety of optical information processing and display applications.

The prior art has attempted to combine the properties of liquid crystals with holograms by a variety of methods. Unfortunately, most of these prior art devices are complex to manufacture and are not successful at offering all the advantages of volume holographic gratings.

One approach for combining the advantages of liquid crystals with volume holographic gratings has been to first make a holographic transmission grating by exposing a photopolymerizable material with a conventional two-beam apparatus for forming interference patterns inside the material. After exposure, the material is processed to produce voids where the greatest amount of exposure occurred, that is, along the grating lines, and then, in a further step, the pores are infused with liquid crystals. Unfortunately, these materials are complex to manufacture and do not offer flexibility for in situ control over liquid crystal domain size, shape, density, or ordering.

Polymer-dispersed liquid crystals (PDLCs) are formed from a homogeneous mixture of prepolymer and liquid crystals. As the polymer cures, the liquid crystals separate out as a distinct microdroplet phase. If the polymer is a photopolymer, this phase separation occurs as the prepolymer is irradiated with light. If a photopolymerizable polymer-dispersed liquid crystal material is irradiated with light in a suitable pattern, a holographic transmission grating can be made inside the cured polymer comprising gratings of cured polymer separated by phase-separated liquid crystals. The prior art has attempted to employ polymer-dispersed liquid crystal materials for writing volume gratings, but, despite a variety of approaches, has not been able to achieve high efficiency in the Bragg regime, high density (small grating spacing) capability, or low voltage (<100 Vrms) switching for films in the range of 15 microns thickness. The inability to make an electrically switchable volume hologram that can be switched at voltages less than 100 volts has been a particular deficiency in the prior art in that lower voltages are necessary to be compatible with conventional display and information processing technology.

It is, therefore, a principal object of the present invention to provide an improved polymer-dispersed liquid crystal system suitable for recording volume holograms.

It is a particular object of the present invention to provide a polymer-dispersed liquid crystal system that has a fast curing rate to produce small liquid crystal droplets, particularly in the range of 0.01-0.05 microns, for greater clarity of any resulting film and for writing finer gratings.

It is another object of the present invention to provide a single-step, fast holographic recording material.

It is a further object of the present invention to provide electrically switchable volume holograms that can be switched at voltages less than 100 volts.

It is also an object of the present invention to provide an improved polymer-dispersed liquid crystal system suitable for recording reflection gratings, including, in particular, switchable reflection gratings.

It is also an object of the present invention to provide an improved polymer-dispersed liquid crystal system suitable for recording subwavelength gratings, including, in particular, switchable subwavelength gratings.

These and other objects of the present invention will become apparent as the description of certain representative embodiments proceeds.

BRIEF SUMMARY OF THE INVENTION

The present invention provides a novel photopolymerizable material for single-step, fast recording of volume holograms with properties that can be electrically controlled. The unique discovery of the present invention is a new homogeneous mixture of a nematic liquid crystal and a multifunctional pentaacrylate monomer, with a photoinitiator, a coinitiator and a cross-linking agent, that accomplishes the objects of the invention, particularly the object of fast curing speed and small liquid crystal droplet size.

Accordingly, the present invention is directed to a polymer-dispersed liquid crystal ("PDLC") material, comprising the monomer dipentaerythritol hydroxypentaacrylate, a liquid crystal, a cross-linking monomer, a coinitiator and a photoinitiator dye. The polymer-dispersed liquid crystal material may optionally further comprise a surfactant. The PDLC material may be approximately 10-40 wt % of the liquid crystal. The PDLC material may be approximately 5-15 wt % of the cross-linking monomer. The amount of the coinitiator may be $10^{-3}$ to $10^{-4}$ gram moles and the amount of the photoinitiator dye may be $10^{-5}$ to $10^{-6}$ gram moles. The surfactant, when present, may be up to approximately 6 wt % of the PDLC material.

The present invention is also directed to an electrically switchable hologram, comprising a pair of transparent plates, and sandwiched between the transparent plates, a volume hologram made by exposing an interference pattern inside a polymer-dispersed liquid crystal material, the polymer-dispersed liquid crystal material comprising, before exposure, the monomer dipentaerythritol hydroxypentaacrylate, a liquid crystal, a cross-linking monomer, a coinitiator and a photoinitiator dye. The electrically switchable hologram may optionally further comprise a surfactant.

The present invention is additionally directed to a method for reducing the switching voltage needed to switch the optical orientation of liquid crystals in a polymer-dispersed liquid crystal material, comprising the step of using alternating current switching voltage frequencies greater than 1000 Hz.

The present invention is additionally directed to a switchable slanted transmission grating comprising a polymer-dispersed liquid crystal material disposed between at least two optically transparent electrode plates, wherein the polymer-dispersed liquid crystal material is constructed by exposing to light in an interference pattern a mixture comprising, before exposure: (a) a polymerizable monomer comprising at least one acrylate; (b) at least one liquid crystal; (c) a chain-extending monomer; (d) a coinitiator; and (e) a photoinitiator.

The present invention is additionally directed to an optical coupling device comprising: at least one switchable slanted transmission grating and at least one voltage source associated with said switchable slanted transmission grating.

The present invention is additionally directed to a method for preparing a switchable slanted transmission grating, comprising: disposing between at least two optically transparent electrode plates a mixture that comprises, before exposure: (a) a polymerizable monomer comprising at least one acrylate; (b) a liquid crystal; (c) a chain-extending monomer; (d) a coinitiator; and (e) a photoinitiator; and exposing this mixture to light in an interference pattern.

The present invention is additionally directed to a method for preparing an optical coupling device comprising constructing a switchable slanted transmission grating, and electrically connecting said optically transparent electrodes to a voltage source.

It is a feature of the present invention that a very clear and orderly separation of liquid crystal from cured polymer results, so as to produce high quality holographic transmission gratings. The prior art has achieved generally only a distribution of large and small liquid crystal domains and not the clear, orderly separation made possible by the present invention.

It is also a feature of the present invention that volume Bragg gratings with small grating spacings (approximately 4,000 lines per mm) can be recorded.

It is another feature of the present invention that in situ control of domain size, shape, density, and ordering is allowed.

It is yet another feature of the present invention that holograms can be recorded using conventional optical equipment and techniques.

It is a further feature of the present invention that a unique photopolymerizable prepolymer material is employed. This unique material can be used to record holograms in a single step.

It is also a feature of the present invention that the PDLC material has an anisotropic spatial distribution of phase-separated liquid crystal droplets within a photochemically-cured polymer matrix.

It is an advantage of the present invention that single-step recording is nearly immediate and requires no later development or further processing.

It is another advantage of the present invention that uses thereof are not limited to transmission gratings, but can be extended to other holograms such as optical storage devices and reflection and transmission pictorial holograms.

It is also an advantage that, unlike holograms made with conventional photograph-type films or dichromated gels, holograms in accordance with the present invention can be exposed in a one-step process that requires little or no further processing.

It is a further advantage of the present invention that reflection, transmission and pictorial holograms made using the teachings provided herein can be switched on and off.

It is also an advantage of the present invention that switchable reflection gratings can be formed using positive and negative dielectric anisotropy liquid crystals.

These and other features and advantages of the present invention will become apparent as the description of certain representative embodiments proceeds.

BRIEF DESCRIPTION OF THE SEVERAL VIEWS OF THE DRAWINGS

The present invention will be more clearly understood from a reading of the following detailed description in conjunction with the accompanying figures wherein:

FIGS. 8a and 8b are elevational views of a reflection grating in accordance with the present invention having periodic planes of polymer channels and PDLC channels disposed parallel to the front surface in the absence of a field (FIG. 8a) and with an electric field applied (FIG. 8b) wherein the liquid crystal utilized in the formation of the grating has a positive dielectric anisotropy;

FIGS. 11a and 11b are representative side views of a slanted transmission grating (FIG. 11a) and a slanted reflection grating (FIG. 11b) showing the orientation of the grating vector G of the periodic planes of polymer channels and PDLC channels;

FIGS. 16a and 16b are elevational views of a subwavelength grating in accordance with the present invention having periodic planes of polymer channels and PDLC channels disposed perpendicular to the front face of the grating in the absence of an electrical field (FIG. 16a) and with an electric field applied (FIG. 16b) wherein the liquid crystal utilized in formation of the grating has a positive dielectric anisotropy;

FIG. 35 depicts a one-dimensional photonic crystal with liquid crystal removed;

FIGS. 38a-b depict the Bragg diffraction for light incident along the z axis in a sample;

DETAILED DESCRIPTION OF THE INVENTION

Figure 1:
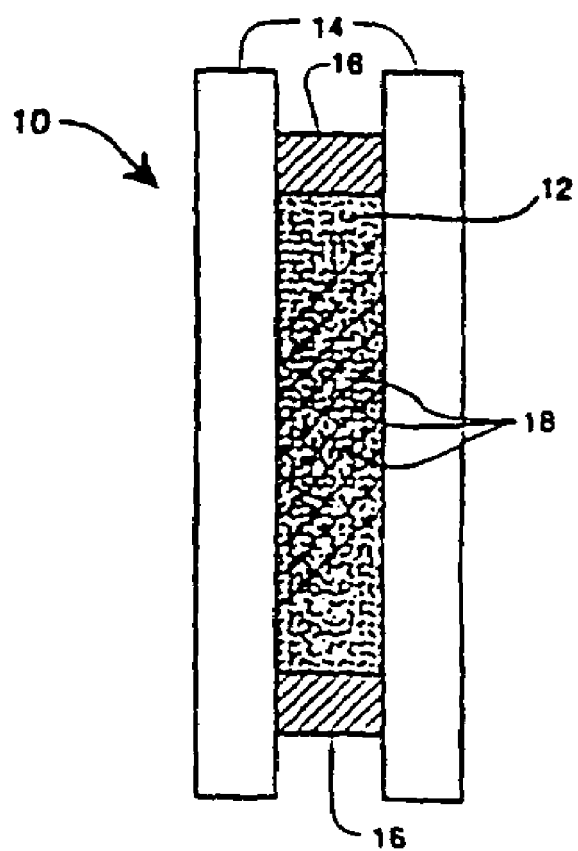
FIG. 1 is a cross-sectional view of an electrically switchable hologram made of an exposed polymer-dispersed liquid crystal material according to the teachings of the present invention.

In accordance with the present invention there is provided a polymer-dispersed liquid crystal ("PDLC") material comprising a monomer, a dispersed liquid crystal, a cross-linking monomer, a coinitiator and a photoinitiator dye. These PDLC materials exhibit clear and orderly separation of the liquid crystal and cured polymer, whereby the PDLC material advantageously provides high quality holographic gratings. The PDLC materials of the present invention are also advantageously formed in a single step. The present invention also utilizes a unique photopolymerizable prepolymer material that permits in situ control over characteristics of the resulting gratings, such as domain size, shape, density, ordering, and the like. Furthermore, methods and materials of the present invention can be used to prepare PDLC materials that function as switchable transmission or reflection gratings.

Polymer-dispersed liquid crystal materials, methods, and devices contemplated for use in the practice of the present invention are also described in R. L. Sutherland et al., "Bragg Gratings in an Acrylate Polymer Consisting of Periodic Polymer-Dispersed Liquid-Crystal Planes," *Chemistry of Materials*, No. 5, pp. 1533-1538 (1993); in R. L. Sutherland et al., "Electrically switchable volume gratings in polymer-dispersed liquid crystals," *Applied Physics Letters*, Vol. 64, No. 9, pp. 1074-1076 (1984); and T. J. Bunning et al., "The Morphology and Performance of Holographic Transmission Gratings Recorded in Polymer-Dispersed Liquid Crystals," *Polymer*, Vol. 36, No. 14, pp. 2699-2708 (1995), G. S. Iannacchinoe, et al., *Europhys. Lett.* 36, 425 (1996); and V. P. Tondiglia, et al. *Opt. Lett.* 20, pp. 1325-1327 (1995) all of which are fully incorporated by reference into this Detailed Description of the Invention. Copending patent application Ser. Nos. 08/273,436 and 08/273,437, Sutherland et al., titled "Switchable Volume Hologram Materials and Devices," and "Laser Wavelength Detection and Energy Dosimetry Badge," respectively, include background material on the formation of transmission gratings inside volume holograms. Reference is also made to copending application Ser. Nos. 09/033,513, 09/033,512, 09/033,514 and 09/034,014, also incorporated herein.

The process by which a hologram is formed according to the invention is controlled primarily by the choice of components used to prepare the homogeneous starting mixture, and to a lesser extent by the intensity of the incident light pattern. The preferred polymer-dispersed liquid crystal ("PDLC") material employed in the practice of the present invention creates a switchable hologram in a single step. A new feature of the preferred PDLC material is that illumination by an inhomogeneous, coherent light pattern initiates a patterned, anisotropic diffusion (or counter diffusion) of polymerizable monomer and second phase material, particularly liquid crystal ("LC") for this application. Thus, alternating well-defined channels of second phase-rich material, separated by well-defined channels of nearly pure polymer, are produced in a single-step process.

The resulting preferred PDLC material has an anisotropic spatial distribution of phase-separated LC droplets within the photochemically cured polymer matrix. Prior art PDLC materials made by a single-step process can achieve at best only regions of larger LC bubbles and smaller LC bubbles in a polymer matrix. The large bubble sizes are highly scattering which produces a hazy appearance and multiple order diffractions, in contrast to the well-defined first order diffraction and zero order diffraction made possible by the small LC bubbles of the preferred PDLC material in well-defined channels of LC-rich material. Reasonably well-defined alternately LC-rich channels and nearly pure polymer channels in a PDLC material are possible by multi-step processes, but such processes do not achieve the precise morphology control over LC droplet size and distribution of sizes and widths of the polymer and LC-rich channels made possible by the preferred PDLC material.

The sample is prepared by coating the mixture between two indium-tin-oxide (ITO) coated glass slides separated by spacers of nominally 10-20 µm thickness. The sample is placed in a conventional holographic recording setup. Gratings are typically recorded using the 488 nm line of an argon ion laser with intensities of between about 0.1-100 mW/cm$^2$ and typical exposure times of 30-120 seconds. The angle between the two beams is varied to vary the spacing of the intensity peaks, and hence the resulting grating spacing of the hologram. Photopolymerization is induced by the optical intensity pattern. A more detailed discussion of an exemplary recording apparatus can be found in R. L. Sutherland, et al., "Switchable Holograms in New Photopolymer—Liquid Crystal Composite Materials," Society of Photo-Optical Instrumentation Engineers (SPIE), Proceedings Reprint, Volume 2404, reprinted from *Diffractive and Holographic Optics Technology II* (1995), incorporated herein by reference.

The features of the PDLC material are influenced by the components used in the preparation of the homogeneous starting mixture and, to a lesser extent, by the intensity of the incident light pattern. In a preferred embodiment, the prepolymer material comprises a mixture of a photopolymerizable monomer, a second phase material, a photoinitiator dye, a coinitiator, a chain extender (or cross-linker), and, optionally, a surfactant.

Photonic crystals are periodic structures having lattice constants commensurate with the wavelengths of visible and infrared photons. Multiple interference of waves scattered from 'atoms' in the lattice results in a frequency range over which propagation of light is prohibited. Hence this structure exhibits a 'photonic bandgap' analogous to the electronic bandgap in semiconductors. Numerous applications employing photonic crystals have been suggested. However, many devices would benefit from control of the band structure through electro-optic effects. Liquid crystals are useful electro-optical materials and have been readily incorporated into one-dimensional periodic composite structures. Attempts to produce three-dimensional electro-optical photonic crystals have typically involved filling opal crystals with liquid crystal. These multi-step methods are too protracted for volume manufacturing and are not readily amenable to a wide range of crystal symmetries and lattice constants.

The present invention provides a simple technique for one-step fabrication of such devices, employing holographic polymerization of a monomer-liquid crystal mixture whereby liquid crystal separates as nanoscale droplets at crystal lattice or interstitial points within a crosslinked polymer matrix. Such structures can be formed in seconds, over relatively large areas, with easily modifiable lattice constants.

With the present invention, diffractive properties of these photonic crystals can be modulated by an external electric field and a number of different lattice types can be generated.

The method of the present invention relies on the anisotropic diffusion and phase separation of liquid crystal in a polymerizable monomer when the solution is subjected to an inhomogeneous pattern of light. A homogeneous mixture of monomer, liquid crystal, and photo-initiator dye is exposed to a specific configuration of multiple laser beams. This three-dimensional interference pattern drives the phase separation of nanoscale (~50 nm) liquid crystal domains, which preferentially form at the null points of the interference pattern. Since the effective dielectric constant of the liquid crystal droplet differs from that of the polymer matrix, a medium with a three-dimensional, periodically varying dielectric constant is formed. The dielectric constant can be modulated by an external electric field, which reorients liquid crystal within the domains.

Figure 31:
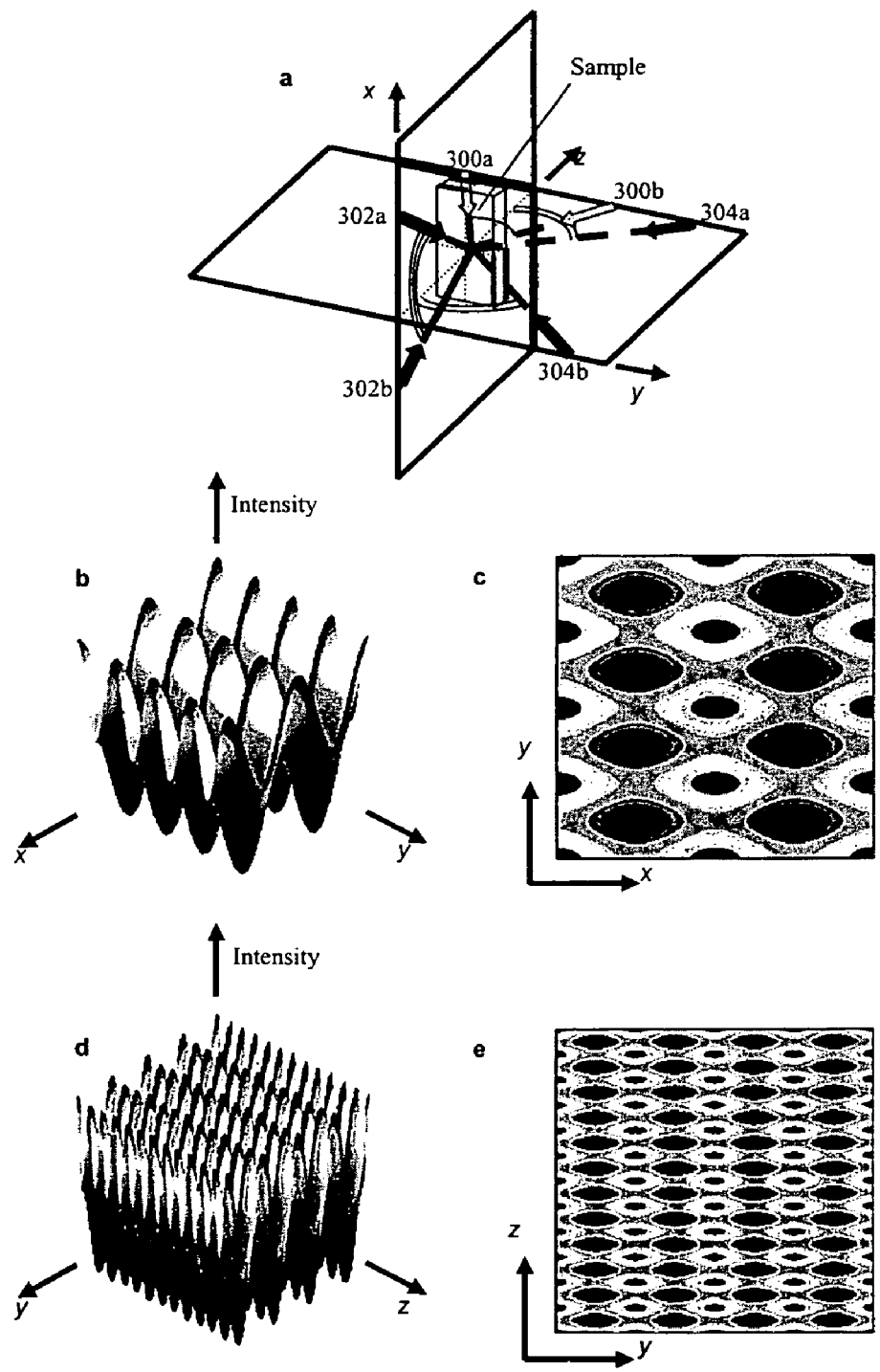
FIGS. 31a-e depict a laser beam geometry and intensity patterns for recording an orthorhombic P photonic crystal in a monomer-liquid crystal mixture.

The configuration in FIG. 31a yields a superposition of three mutually orthogonal gratings. In planes parallel to the sample surface the two-dimensional intensity pattern has the form of an egg-crate. The valleys of this structure reach true minima in periodic planes along the sample normal axis. Liquid crystal coalesces in these valleys (the dark spots in FIGS. 31c and 31e), forming a three-dimensional array of nanodroplets. The geometry of FIG. 31a yields an orthorhombic P lattice. By an appropriate adjustment of incident angles, it is possible to obtain equal lattice constants and thus form a simple cubic (sc) crystal.

Figure 32:
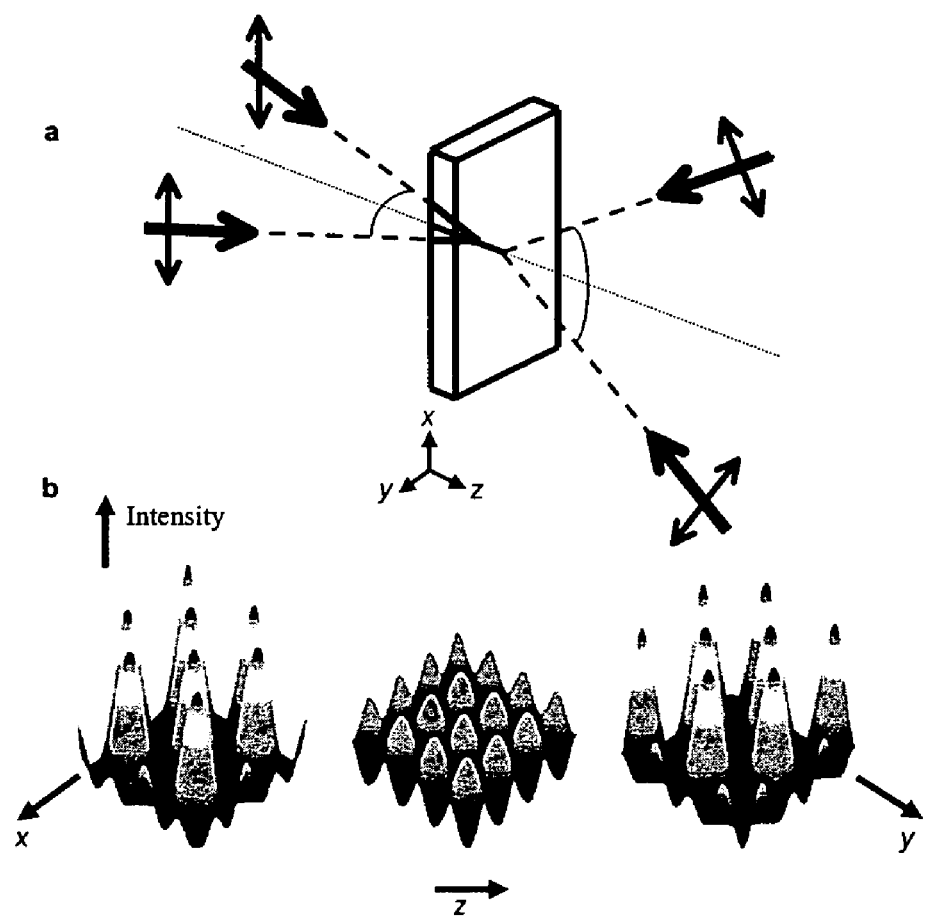
FIGS. 32a-b depict a laser beam configuration and intensity patterns for recording an fcc liquid-crystal-filled photonic crystal in polymer.

Much attention has focused on colloidal self-assembly of opal and inverse-opal templates for forming photonic nano-composite materials. Liquid crystal can fill the interstitial volume of these crystals by capillary action. The advantage of holographic polymerization-induced phase separation is that the liquid crystal naturally collects in the regions of minimum intensity, and the methods of holography offer a wide variety of crystal symmetries with controllably sized unit cells. For example, a face centered cubic (fcc) or orthorhombic F polymer crystal is obtained with the recording geometry illustrated in FIG. 32. The liquid crystal phase-separates in the interstitial volume, yielding a structure similar to liquid-crystal-filled opal crystals. Lattice constants scale simply with recording wavelength and beam angles.

Figure 36:
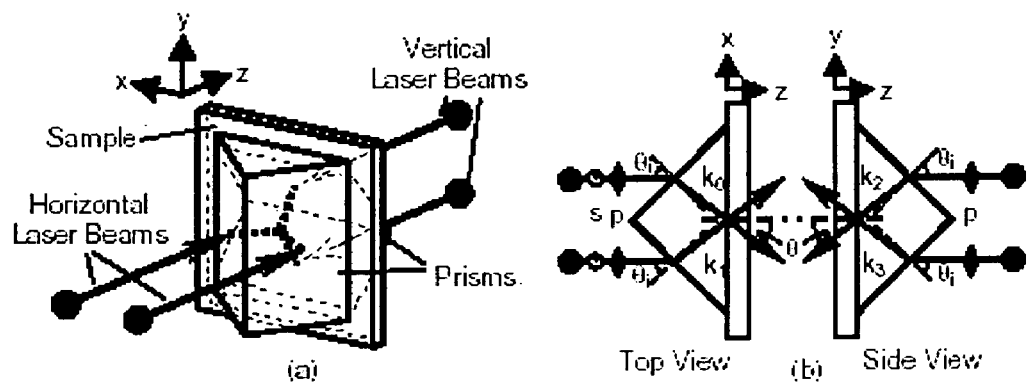
FIGS. 36a-b depict a basic experimental configuration for holographically recording photonic crystals.

The basic experimental configuration and recording geometry are illustrated schematically in FIGS. 36a and 36b. A sample is sandwiched between two 45-45-90 prisms with their apexes orthogonal to one another. Two horizontally spaced laser beams are incident on the vertically oriented prism, while two vertically spaced beams are incident on the other prism. A 3D perspective of the configuration is given in FIG. 36a. Details of the recording geometry can be seen in FIG. 36b. Two combinations of beam polarization are included in this study. In one, all incident beams are polarized along y. This is called the sp configuration since one set of beams is s-polarized while the other is p-polarized. In the second set, the beams on the left in FIG. 36b are polarized along x while the beams on the right remain polarized along y. This is called the pp configuration. A variety of other combinations are possible, but these are the simplest from an experimental point of view. The beams are incident at an angle $\theta_i$ with respect to the normal to the prism faces, then cross the z axis at an angle $\theta$.

The intensity pattern in the recording volume is $$I(r) = 4 + \sum_{m \neq n} S_{mn} \exp(iG_{mn} \cdot r) \quad (1)$$

where $G_{mn}$ (m,n=0 . . . 3) are reciprocal lattice vectors given by $G_{mn}=k_m-k_n$, and the wave vectors $k_m$ are defined in FIG. 36b. There are a total of six vectors; three can be selected to form the basis of the reciprocal lattice, while the other three are linear combinations of the basis vectors. The chosen basis vectors are $-G_{03}$, $G_{02}$, and $G_{13}$. These become the basis of a bcc reciprocal lattice when $\theta=\tan^{-1}(2)$. The basis vectors form equal angles $\theta_G=\tan^{-1}(2^{-1/2}\tan\theta)$ with respect to the z axis. The basis vectors of the crystal lattice are determined to be $a'=(a/2)(\hat{x}+\hat{y})$, $b'=(a/2)(\hat{y}+\frac{1}{2}\tan\theta\hat{z})$, $c'=(a/2)(\hat{x}+\frac{1}{2}\tan\theta\hat{z})$, where $a=\lambda/n\sin\theta$ is the dimension of the conventional unit cube, $\lambda$ is the recording wavelength, and n is the refractive index. The structure factors are given by $S_{mn}=\hat{e}_m\cdot\hat{e}_n$, where $\hat{e}_m$ is the unit polarization vector of the m-th beam. For the sp configuration, $S_{01}=1$, $S_{02}=S_{03}=S_{12}=S_{13}=\cos\theta$, $S_{23}=\cos^2\theta-\sin^2\theta$. The pp configuration has a more symmetric form, yielding $S_{01}=S_{23}=\cos^2\theta-\sin^2\theta$ while $-S_{02}=S_{03}=S_{12}=-S_{13}=\sin^2\theta$.

Figure 37:
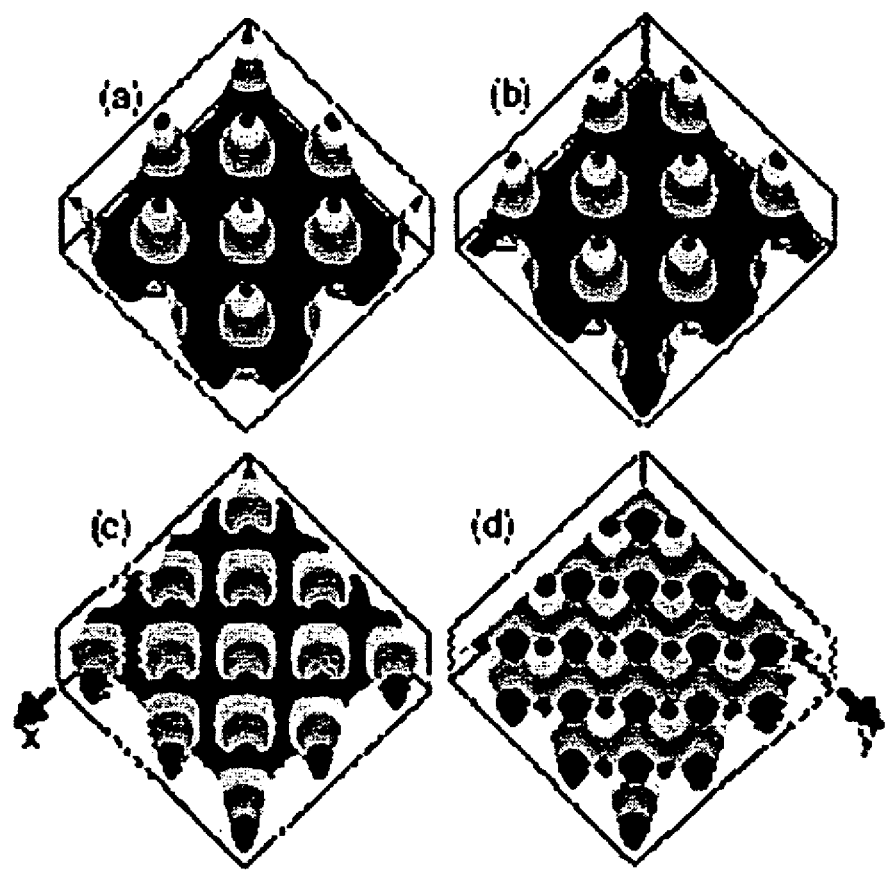
FIGS. 37a-d depict computed intensity patterns in the xy plane with sp and pp configurations.

Referring to FIGS. 37a-d, examples of the intensity patterns generated by Eq. (1) are illustrated. The xy plane is tilted in perspective to aid viewing the intensity peaks and valleys. These plots are made for comparison and are not all drawn to the same scale. FIG. 37a represents the case of sp polarization configuration, with $\theta_i=45°$ and $\theta=17.28°$, and shows the intensity pattern in the base plane (z=0). FIG. 37b gives the pattern in the plane at $z=(a/4)\tan\theta$, illustrating the orthorhombic F symmetry. The pattern repeats itself at increments of $(a/2)\tan\theta$ along the z axis. This structure is analogous to the fcc lattice in colloidal crystals.[5,6] Polymerization is favored at regions of peak intensity, and monomer diffuses to bright regions to replace consumed monomers. LC molecules are excluded by chemical potential forces and diffuse to the dark areas. Hence the low intensity regions appear to act as potential wells that attract LC molecules. At a critical concentration the miscibility gap is breached and the LC separates as a distinct phase. For FIGS. 37a and 37b, this would be in the interstitial volume of the crystal.

Referring to FIG. 37c, an interesting case for the pp configuration with $\theta_i=14.9°$ and $\theta=\tan^{-1}(2^{-1/2})$ is illustrated. Under this condition all the structure factors have equal magnitude. Note that this yields the inverse structure of that shown in FIG. 37a, which would give a polymer backbone with LC droplets in the symmetric "potential wells" of the lattice. This is analogous to the inverse opal structure. FIG. 37d (pp) gives the pattern obtained with $\theta_i=0°$ ($\theta=45°$). In this case a binary lattice appears to form, one of polymer and one of LC droplets in the symmetric "potential wells." For sp configurations (FIG. 37a, and particularly for a fcc lattice, not shown), the intensity peaks are broader and more asymmetric, and the valleys have a bowtie shape.

A recipe for a prepolymer syrup is similar to that described previously in the studies of electrically switchable holograms. (See Sutherland, R. L., Natarajan, L. V., Tondiglia, V. P. & Bunning, T. J. Bragg gratings in an acrylate polymer consisting of periodic polymer-dispersed liquid crystal planes. *Chem. Mater.* 5, 1533-1538 (1993); Sutherland, R. L., Tondiglia, V. P., Natarajan, L. V., Bunning, T. J. & Adams, W. W. Electrically switchable volume gratings in polymer-dispersed liquid crystals. *Appl. Phys. Lett.* 64, 1074-1076 (1994); and Tondiglia, V. P., Natarajan, L. V., Sutherland, R. L., Bunning, T. J. & Adams, W. W. Volume holographic image storage and electro-optical readout in a polymer-dispersed liquid-crystal film. *Opt. Lett.* 20, 1325-1327 (1995). The main ingredients are the monomer dipentaerythrol hydroxy pentaacrylate mixed with 31.5 wt-% of the liquid crystal TL213. The free-radical polymerization is initiated via absorption of light by the sensitizing dye Rose Bengal, which undergoes an electron-transfer reaction with the co-initiator monomer N-phenylglycine, forming the primary radical. Samples, ~10 µm thick, are prepared between indium-tin-oxide (ITO) coated glass slides, leaving exposed ITO areas on each piece of glass for attachment of electrical leads.

Referring to FIGS. 31a-e, a laser beam geometry and intensity patterns for recording an orthorhombic P photonic crystal in a monomer-liquid crystal mixture are illustrated. Specifically, FIG. 31a depicts the beam and sample geometry. The arrows 300a, 300b, 302a, 302b, 304a, 304b represent beams that are mutually incoherent (or orthogonally polarized), and each set of arrows 300, 302, 304, represent beams that are coherent. Beams 300a and 300b are incident from the back of the sample in the horizontal (yz) plane, beams 302a, 302b from the front in the vertical (xz) plane, and beams 304a, 304b from opposite sides of the sample in the horizontal plane. FIG. 31b depicts the intensity pattern in the xy-plane. The pattern has the form of an egg-crate. FIG. 31c depicts the intensity map in the xy-plane. FIG. 31d is similar to FIG. 31b except that it depicts the yz-plane. FIG. 31e is similar to FIG. 31c except it depicts the yz-plane.

To create an orthorhombic P crystal, six beams were used (FIG. 31a) generated from two continuous-wave lasers, an Ar-ion laser at 514 nm and a frequency-doubled, diode-pumped Nd:YVO$_4$ laser at 532 nm. The 514-nm beam is split into two equal-intensity beams (17.5 mW cm$^{-2}$) that are directed to the sample from opposite sides at symmetric angles of 49°. These beams lie in the horizontal yz-plane. The 532-nm beam is split into four beams (two pairs) with equal intensity of 17.5 mW cm$^{-2}$, and the pairs are directed to the sample from opposite sides as shown in FIG. 31a. One pair is in the horizontal plane, directed at symmetric incident angles of 22° and with polarization vectors lying in the horizontal plane. The second pair is incident in the vertical xz-plane, each with polarization in that plane, with equal incident angles of 11°. A mechanical shutter opens to simultaneously expose the sample to both lasers. The total exposure time is 30 seconds.

Figure 33:
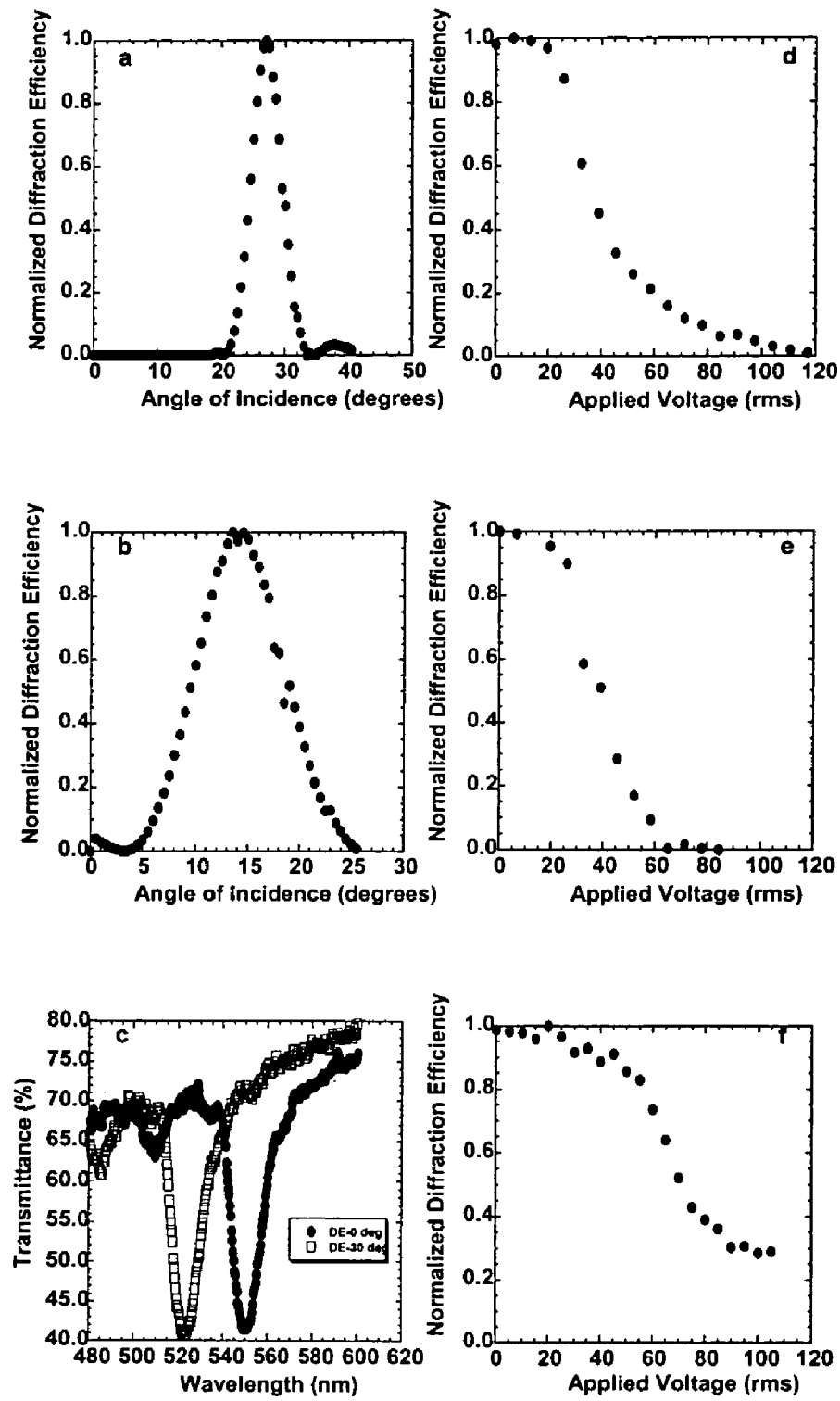
FIGS. 33a-f depict the normalized efficiency of Bragg diffraction as a function of angle, wavelength, and voltage.

Referring to FIGS. 33a-f, the normalized efficiency of Bragg diffraction as a function of angle, wavelength, and voltage are illustrated. FIG. 33a depicts the angular scan of diffraction efficiency for rotation about the vertical (x) axis. FIG. 33b depicts the angular scan of diffraction efficiency for rotation about the horizontal (y) axis. The probe wavelength in each case is 632.8 nm. FIG. 33c depicts the spectral scan of diffraction efficiency for normal incidence and 30° rotation about the vertical (x) axis. The data represent the transmittance of a white light probe. Based on Bragg's law of diffraction, the data yield lattice constants of a=1355 nm, b=697 nm, and c=180 nm. FIGS. 33d, 33e, and 33f depict peak diffraction efficiency as a function of applied voltage for Bragg grating vector along y, x, z, respectively.

The diffraction effects of the liquid-crystal-filled photonic crystal using a HeNe laser at 632.8 nm and a white-light probe, fiber-coupled grating spectrometer (Ocean Optics) are examined. The transmission pattern of a normally incident laser contains multiple weak spots that are due to scattering from surface gratings. When the sample is rotated about axes in the vertical and horizontal directions, bright first-order Bragg diffraction spots appear in the horizontal and vertical planes, respectively, corresponding to two orthogonal gratings. Angular scans of diffraction efficiency are shown in FIG. 33a and FIG. 33b. The first is for Bragg diffraction in the horizontal plane and yields a lattice constant b=697 nm. The second gives the Bragg pattern in the vertical plane and corresponds to lattice constant a=1355 nm. FIG. 33c shows an Ocean Optics spectrometer trace of transmission as a function of wavelength for two angles of incidence. The stop band is blue-shifted for the 30° angle of incidence as expected for a reflection grating. These data reveal a grating along the z-axis with lattice constant c=180 nm. The measured lattice constants are in good agreement with theoretical values based on the recording wavelengths and angles (a=1394 nm, b=710 nm, and c=193 nm, respectively).

The electro-optical nature of this photonic crystal is illustrated in the plots of normalized diffraction efficiency versus applied voltage shown in FIGS. 33d-33f. These plots correspond, respectively, to the gratings of FIGS. 33a-33c situated at the respective Bragg angles. As applied voltage increases, the nematic configuration is distorted to yield a minimum contrast of refractive index between the two components, leading to a reduction in diffraction efficiency. Hence, the photonic band structure of the crystal can be tuned by the application of a suitable electric field. The polymer index is ~1.5. When the liquid crystal director is oriented such that radiation sees the ordinary index of TL213 (1.53), the index contrast in the photonic crystal is a minimum. Orientational ordering is highly nonuniform in a small confined space, exhibiting low order parameter and trapped defects of size comparable with the droplet. The threshold field required to overcome surface correlation effects and partially reorient some portion of droplet volume is ~2.5 V/μm. At about 10 V/μm the reorientation is nearly complete. Relaxation to the equilibrium orientation at zero-field is <1 ms. In silica opal crystals, strong anchoring on the surface of the silica spheres leads to a threshold field approximately an order of magnitude larger and response time >100 ms.

Figure 34:
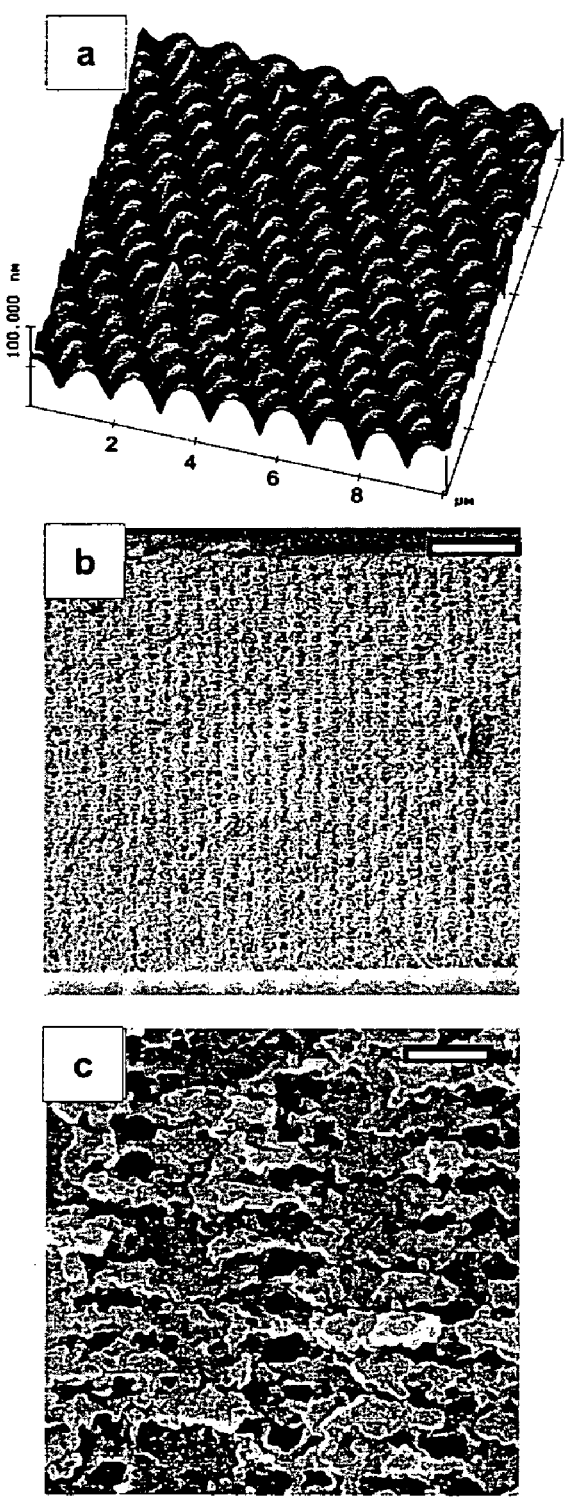
FIGS. 34a-c depict AFM and SEM images of an orthorhombic P liquid-crystal-filled photonic crystal.

Referring to FIGS. 34a-c, the AFM and SEM images of an orthorhombic P liquid-crystal-filled photonic crystal are illustrated. FIG. 34a depicts an AFM image (Digital Instruments Nanoscope IIIa Multimode) of the (001) plane obtained in tapping mode. FIGS. 34b and 34c depict secondary-electron low-voltage scanning electron microscopy (Hitachi S-900) images obtained at 1 kV with 1-nm tungsten coating of the (100) plane after freeze-fracture and removal of the liquid crystal. Scale bars, 2.5 μm (b) and 250 nm (c).

A second orthorhombic P sample was fabricated using the same recording geometry but different angles, illustrating that modified lattice constants may readily be obtained. FIG. 34a shows an atomic force microscopy (AFM) image of the (001) surface (xy-plane) that was in contact with one glass substrate. The image reveals a rectangular lattice, and the egg-crate morphology, with an approximate 2:1 ratio of lattice constants predicted by the form of FIG. 31b, is apparent. Valleys are areas where liquid crystal resided. FIG. 34b shows the (100) plane (yz-plane) revealed by freezing the film in liquid nitrogen followed by fracture along a cleavage plane. A two-dimensional pattern of holes separated by crosslinked polymer is present throughout the entire thickness and over a large lateral area. The dark voids, in the form suggested by FIG. 31e, are regions that were occupied by liquid crystal droplets. FIG. 34c shows in more detail the rectangular lattice in the (100) plane, with lattice constants having an approximate 3:1 ratio. Note that single, quasi-ellipsoidal liquid crystal domains, with average long dimension ~50 nm, appear to be positioned at each lattice point. Lattice constants obtained by SEM are a=990 nm, b=540 nm, and c=160 nm. These are in good agreement with lattice constants determined by Bragg diffraction (a=1098 nm, b=597 nm, c=180 nm). Lattice spacing determined through SEM is smaller by ~10% due to contraction of the sample when the liquid crystal is removed.

Referring to FIGS. 38a-b, the results of a sample recorded according to the geometry specified for FIG. 37a are illustrated. The lattice constants for this photonic crystals are theoretically a'=833 nm and b'=c'=596 nm. White light is incident along the z axis, forming four symmetrically spaced green diffraction spots as shown in the photograph of FIG. 38a. Light will diffract in directions and at the wavelength determined by the Bragg condition, $$k_d = k_i + G \qquad (2)$$

where $k_d$, $k_i$ are the diffracted and incident wave vectors, respectively, and G is a reciprocal lattice vector. The reciprocal lattice vectors are plotted in FIG. 38b along with the wave vectors that satisfy the Bragg condition. The wave vectors form equal azimuth angles (45°) in the four quadrants and equal polar angles of $\theta_d = 2\theta_G = 24.8°$. This corresponds to an external angle (after refraction) of 39.6°, in close agreement to 38° measured experimentally. We calculate the diffracted wavelength to be $\lambda_d = 531$ nm, which agrees well with the experimental value of 524 nm. Normally there is a small blueshift due to polymer shrinkage, which in this case amounts to 1.3%.

Figure 39:
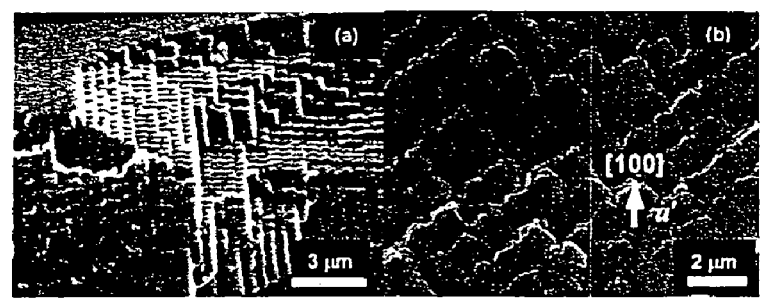
FIGS. 39a-b depict an SEM of the sample of FIG. 38.

Referring to FIG. 39, the scanning electron micrograph (SEM) of this sample is illustrated. FIG. 39a gives a 3D perspective, illustrating cleavage planes. FIG. 39b is a top view of the crystal and reveals the close packing structure. The arrow gives the [100] direction. The small holes near the corners of the square polymer regions comprise the interstitial volume where LC would reside. From this SEM we estimate a'=765 nm, which is about 8% shorter than expected theoretically. However, there is ~10% contraction of the sample when LC is removed.[8] Consequently, this estimate is in good agreement with the theoretical value.

Figure 40:
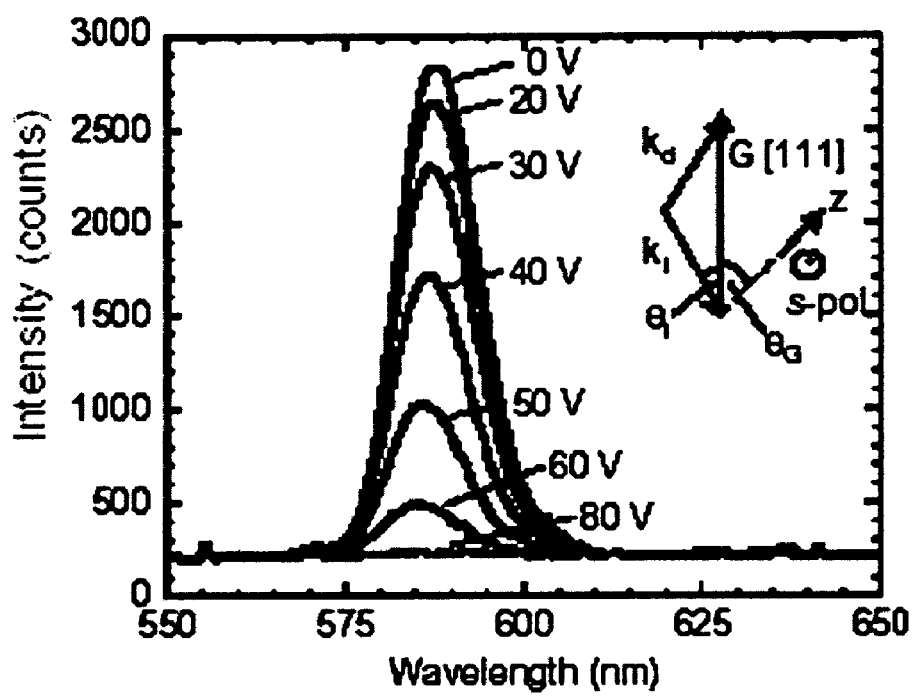
FIG. 40 depicts the results for an orthorhombic F photonic crystals.

The electro-optical behavior of these photonic crystals are studied by applying an electric field along the z axis and observing the light back-scattered from the (111) planes. We direct s-polarized white light at a small angle with respect to the [111] direction and collect the Bragg diffracted light with an optical fiber that is coupled to an Ocean Optics spectrometer. The diffracted light spectrum is measured as a function of the amplitude of a bipolar 2-kHz square-wave voltage. Results for an orthorhombic F photonic crystal recorded with $\theta=0°$ ($\theta=45°$) are shown in FIG. 40. The geometry of the experiment is shown as an inset to FIG. 40. As can be seen, a field of 8-10 V/μm closes the bandgap completely. For sufficiently large field strength, the LC molecules will align with the z axis, a direction perpendicular to the optical polarization which is in the xy plane. The optical field then sees a refractive index for the LC droplets that is approximately equal to the ordinary refractive index of the bulk LC, which is closely matched to the polymer index. Hence the scattering from the (111) planes is minimized.

The theoretical lattice constants for these photonic crystals are a'=350 nm and b'=c'=277 mm. This yields a value of $\theta_G = \tan^{-1}(2^{-1/2}) = 35.26°$ for the reciprocal lattice basis vectors. The expected Bragg wavelength for the small angle of incidence (4.25°) in our experiment is 613 nm, whereas the peak diffracted wavelength measured at zero field is 588 mm. This amounts to a blueshift of about 4%.

A further utility of this fabrication method is that the liquid crystal is easily removed by soaking the sample in methanol or acetone. FIGS. 35*a-b* show a one-dimensional photonic bandgap crystal in which the liquid crystal has been removed. Note that the high contrast of dielectric constant between polymer and air has opened up a wide bandgap in the material. The reflection stop band is blue-shifted by nearly 100 nm due to a decrease in the average refractive index and to contraction of the lattice spacing. It is also possible to fill the voids with other highly refractive materials for wider bandgaps.

FIG. 35*a* provides a photograph of a one-dimensional photonic bandgap crystal (PBC) consisting of periodic voids in a polymer matrix, compared in size to a USA one-penny coin. FIG. 35*b* depicts a spectral transmittance of the one-dimensional PBC illustrating the opening up of the bandgap when liquid crystal is removed and the spectral transmittance of the PBC prior to removal of liquid crystal.

Previous attempts to fabricate electro-optical photonic crystals have included loading liquid crystal into opal photonic crystals, which are grown by slow sedimentation of silica or polystyrene spheres in water. The rate of growth of such a crystal may be ~1 mm/day, and the process is further complicated by the need to evaporate the water, thermally anneal the sample, and backfill liquid crystal at an elevated temperature. Fabrication of a photonic crystal in polymers could be hastened by holographic lithography in standard photoresists, but to obtain electro-optical properties the additional steps of rinsing undeveloped photoresist and backfilling liquid crystal are still required. Our method incorporating holographic polymerization-induced phase separation of liquid crystal requires only a single exposure step lasting a few seconds. Robust, switchable, three-dimensional gratings are obtained, with relatively low critical field for liquid crystal reorientation and sub-millisecond response time. These devices may find multiple applications in optical integrated circuits for computers and telecommunications. The materials and technique are inexpensive, and the technology is potentially scalable to volume production.

The polymer-dispersed material employed in the present invention is formed from a pre-polymer material that is a homogeneous mixture of a polymerizable monomer comprising of dipentaerythritol penta-/hexa-acrylate (available for example from Aldrich Chemical Company, Milwukee), approximately 31.5% by weight of the nematic liquid crystal TL213 (provided by EM Industries, New York), which is a mixture of fluoro and chlorosubstituted biphenyls and triphenyls. The pre-polymer syrup can also be prepared from a mixture of urethane acrylates with acrylate functionality ranging from 3 to 6 (available from UCB Radcure, Atlanta) and nematic liquid crystals of the BL series (available from EM Industries, New York), consisting of a mixture of cyano substituted biphenyls and tri-phenyls. The formulation also contains the chain-extending monomer N-vinylpyrrolidone (NVP) at 10% by weight (available from Aldrich Chemical Company, Milwaukee, Wis.), coinitiator N-phenyl glycine (NPG) at 1.5% by weight (also available from Aldrich Chemical Company, Milwaukee, Wis.), and the photoinitiator dye Rose Bengal ester at 0.5% by weight (2,4,5,7-tetraiodo-3',4', 5',6'-tetrachlorofluorescein-6-acetate ester) marketed as RBAX by Spectragraph, Ltd. (Maumee, Ohio). Rose Bengal is also available as a sodium salt from Aldrich Chemical Company (Milwaukee, Wis.). Octanoic acid at 6% by weight (Aldrich Chemical Company, Milwaukee, Wis.) is also added to the formulation. Other long chain aliphatic, i.e., fatty, acids like decanoic and dodecanoic acids can be added instead of octanoic acid. Usually 2 grams of the formulation are made for one set of experiments, and the mixture was homogenized to a syrup by sonicating in a water bath for 30 minutes at 30° C. The Rose Bengal syrup is suitable for the Argon ion laser wavelengths 468, 476, 488 and 514 nm as the absorption spectrum is broad covering the region 430-590 nm. For writing with red wavelengths, for example at 647 mm or 633 nm, the Rose Bengal in the recipe is replaced by the cyano substituted tetra chlorofluorescein ester marketed as HNU-635 by Spectragraph, Ltd. (Maumee, Ohio).

For writing 3D structures with UV sources, another class of polymers, namely thiol-ene polymers, are employed. The formation of thiol-ene polymers proceeds by the combination of free radical and step growth processes. The typical formulation consists of pentaerythritol tetrakis-3-mercaptopropionate and trimethylolpropane diallyl ether (Aldrich Chemical Company, Milwaukee, Wis.) in a 1:1 mole ratio. Nematic liquid crystal BL038 (available from EM Industries, New York) at 35% by weight added along with the UV initiator Darocur 4265 at 1% by weight (obtained from Ciba-Geigy, Los Angeles) are added to the thiol mixture. The mixture is homogenized to a syrup by sonicating in a water bath at 30° C. Other UV initiators which work as well are Irgacure 369 and Darocur 1173, available from Ciba-Geigy (Los Angeles). The syrup of the pre-polymer material is spread between indium-tin-oxide (ITO) glass slides with spacers of 8 or 10 μm. The edges of the cell are glued by commercially available epoxy glue. Unexposed areas are left behind in each glass plate for the attachment of the electrodes. Preparation, mixing, and transfer of the pre-polymer material onto the glass slides are preferably done in the dark as the mixture is extremely sensitive to room lights.

In the preferred embodiment, the two major components of the prepolymer mixture are the polymerizable monomer and the second phase material, which are preferably completely miscible. Highly functionalized monomers are preferred because they form densely cross-linked networks which shrink to some extent and tend to squeeze out the second phase material. As a result, the second phase material is moved anisotropically out of the polymer region and, thereby, separated into well-defined polymer-poor, second phase-rich regions or domains. Highly functionalized monomers are also preferred because the extensive cross-linking associated with such monomers yields fast kinetics, allowing the hologram to form relatively quickly, whereby the second phase material will exist in domains of less than approximately 0.1 μm.

Highly functionalized monomers, however, are relatively viscous. As a result, these monomers do not tend to mix well with other materials, and they are difficult to spread into thin films. Accordingly, it is preferable to utilize a mixture of pentaacrylates in combination with di-, tri-, and/or tetra-acrylates in order to optimize both the functionality and viscosity of the prepolymer material. Suitable acrylates, such as triethyleneglycol diacrylate, trimethylolpropane triacrylate, pentaerythritol triacrylate, pentaerythritol tetraacrylate, pentaerythritol pentaacrylate, and the like can be used in accordance with the present invention. In the preferred embodiment, it has been found that an approximately 1:4 mixture of tri- to pentaacrylate facilitates homogeneous mixing while providing a favorable mixture for forming 10-20 μm films on the optical plates.

The second phase material of choice for use in the practice of the present invention is a liquid crystal. This also allows an electro-optical response for the resulting hologram. The concentration of LC employed should be large enough to allow a significant phase separation to occur in the cured sample, but not so large as to make the sample opaque or very hazy. Below about 20% by weight very little phase separation occurs and diffraction efficiencies are low. Above about 35% by weight, the sample becomes highly scattering, reducing both diffraction efficiency and transmission. Samples fabricated approximately 25% by weight typically yield good diffraction efficiency and optical clarity. In prepolymer mixtures utilizing a surfactant, the concentration of LC may be increased to 35% by weight without loss in optical performance by adjusting the quantity of surfactant. Suitable liquid crystals contemplated for use in the practice of the present invention include the mixture of cyanobiphenyls marketed as E7 by Merck, 4'-n-pentyl-4-cyanobiphenyl, 4'-n-heptyl-4-cyanobiphenyl, 4'-octaoxy-4-cyanobiphenyl, 4'-pentyl-4-cyanoterphenyl, ∝-methoxybenzylidene-4'-butylaniline, and the like. Other second phase components are also possible.

The preferred polymer-dispersed liquid crystal material employed in the practice of the present invention is formed from a prepolymer material that is a homogeneous mixture of a polymerizable monomer comprising dipentaerythritol hydroxypentaacrylate (available, for example, from Polysciences, Inc., Warrington, Pa.), approximately 10-40 wt % of the liquid crystal E7 (which is a mixture of cyanobiphenyls marketed as E7 by Merck and also available from BDH Chemicals, Ltd., London, England), the chain-extending monomer N-vinylpyrrolidone ("NVP") (available from the Aldrich Chemical Company, Milwaukee, Wis.), coinitiator N-phenylglycine ("NPG") (also available from the Aldrich Chemical Company, Milwaukee, Wis.), and the photoinitiator dye rose bengal ester; (2,4,5,7-tetraiodo-3',4',5',6'-tetrachlorofluorescein-6-acetate ester) marketed as RBAX by Spectragraph, Ltd., Maumee, Ohio). Rose bengal is also available as rose bengal sodium salt (which must be esterified for solubility) from the Aldrich Chemical Company. This system has a very fast curing speed which results in the formation of small liquid crystal micro-droplets.

The mixture of liquid crystal and prepolymer material are homogenized to a viscous solution by suitable means (e.g., ultrasonification) and spread between indium-tin-oxide ("ITO") coated glass slides with spacers of nominally 15-100 μm thickness and, preferably, 10-20 μm thickness. The ITO is electrically conductive and serves as an optically transparent electrode. Preparation, mixing and transfer of the prepolymer material onto the glass slides are preferably done in the dark as the mixture is extremely sensitive to light.

The sensitivity of the prepolymer materials to light intensity is dependent on the photoinitiator dye and its concentration. A higher dye concentration leads to a higher sensitivity. In most cases, however, the solubility of the photoinitiator dye limits the concentration of the dye and, thus, the sensitivity of the prepolymer material. Nevertheless, it has been found that for more general applications photoinitiator dye concentrations in the range of 0.2-0.4% by weight are sufficient to achieve desirable sensitivities and allow for a complete bleaching of the dye in the recording process, resulting in colorless final samples. Photoinitiator dyes that are useful in generating PDLC materials in accordance with the present invention are rose bengal ester (2,4,5,7-tetraiodo-3',4',5', 6'tetrachlorofluorescein-6-acetate ester); rose bengal sodium salt; eosin; eosin sodium salt; 4,5-diiodosuccinyl fluorescein; camphorquinone; methylene blue, and the like. These dyes allow a sensitivity to recording wavelengths across the visible spectrum from nominally 400 nm to 700 nm. Suitable near-infrared dyes, such as cationic cyanine dyes with trialkylborate anions having absorption from 600-900 nm as well as merocyanine dyes derived from spiropyran should also find utility in connection with the present invention.

The coinitiator employed in the practice of the present invention controls the rate of curing in the free radical polymerization reaction of the prepolymer material. Optimum phase separation and, thus, optimum diffraction efficiency in the resulting PDLC material, are a function of curing rate. It has been found that favorable results can be achieved utilizing coinitiator in the range of 2-3% by weight. Suitable coinitiators include N-phenylglycine; triethylene amine; triethanolamine; N,N-dimethyl-2,6-diisopropyl aniline, and the like.

Other suitable dyes and dye coinitiator combinations that should be suitable for use in the present invention, particularly for visible light, include eosin and triethanolamine; camphorquinone and N-phenyglycine; fluorescein and triethanolamine; methylene blue and triethanolamine or N-phenylglycine; erythrosin B and triethanolamine; indolinocarbocyanine and triphenyl borate; iodobenzospiropyran and triethylamine, and the like.

The chain extender (or cross linker) employed in the practice of the present invention helps to increase the solubility of the components in the prepolymer material as well as to increase the speed of polymerization. The chain extender is preferably a smaller vinyl monomer as compared with the pentaacrylate, whereby it can react with the acrylate positions in the pentaacrylate monomer, which are not easily accessible to neighboring pentaacrylate monomers due to steric hindrance. Thus, reaction of the chain extender monomer with the polymer increases the propagation length of the growing polymer and results in high molecular weights. It has been found that a chain extender in general applications in the range of 10-18% by weight maximizes the performance in terms of diffraction efficiency. In the preferred embodiment, it is expected that suitable chain extenders can be selected from the following: N-vinyl pyrrolidone; N-vinyl pyridine; acrylonitrile; N-vinyl carbazole, and the like.

It has been found that the addition of a surfactant material, particularly, octanoic acid and/or octanol, in the prepolymer material lowers the switching voltage and also improves the diffraction efficiency. In particular, the switching voltage for PDLC materials containing a surfactant are significantly lower than those of a PDLC material made without the surfactant. While not wishing to be bound by any particular theory, it is believed that these results may be attributed to the weakening of the anchoring forces between the polymer and the phaseseparated LC droplets. SEM studies have shown that droplet sizes in PDLC materials including surfactants are reduced to the range of 30-50 nm and the distribution is more homogeneous. Random scattering in such materials is reduced due to the dominance of smaller droplets, thereby increasing the diffraction efficiency. Thus, it is believed that the shape of the droplets becomes more spherical in the presence of a surfactant, thereby contributing to the decrease in switching voltage.

For more general applications, it has been found that samples with as low as 5% by weight of a surfactant exhibit a significant reduction in switching voltage. It has also been found that, when optimizing for low switching voltages, the concentration of surfactant may vary up to about 10% by weight (mostly dependent on LC concentration) after which there is a large decrease in diffraction efficiency, as well as an increase in switching voltage (possibly due to a reduction in total phase separation of LC). Suitable surfactants include octanoic acid; heptanoic acid; hexanoic acid; dodecanoic acid; decanoic acid, and the like, and also octanol, heptanol, hexanol, dodecanol, decanol, and the like.

In samples utilizing octanoic acid as the surfactant, it has been observed that the conductivity of the sample is high, presumably owing to the presence of the free carboxyl (COOH) group in the octanoic acid. As a result, the sample increases in temperature when a high frequency (~2 KHz) electrical field is applied for prolonged periods of time. Thus, it is desirable to reduce the high conductivity introduced by the surfactant, without sacrificing the high diffraction efficiency and the low switching voltages. It has been found that suitable electrically switchable gratings can be formed from a polymerizable monomer, vinyl neononanoate ("VN") ($C_8H_{17}CO_2CH=CH_2$) commercially available from the Aldrich Chemical Co. in Milwaukee, Wis.). Favorable results have also been obtained where the chain extender N-vinyl pyrrolidone ("NVP") and the surfactant octanoic acid are replaced by 6.5% by weight VN. VN also acts as a chain extender due to the presence of the reactive acrylate monomer group. In these variations, high optical quality samples were obtained with about 70% diffraction efficiency, and the resulting gratings could be electrically switched by an applied field of 6 V/µm.

PDLC materials in accordance with the present invention may also be formed using a liquid crystalline bifunctional acrylate as the monomer ("LC monomer"). The LC monomers have an advantage over conventional acrylate monomers due to their high compatibility with the low molecular weight nematic LC materials, thereby facilitating formation of high concentrations of low molecular weight LC and yielding a sample with high optical quality. The presence of higher concentrations of low molecular weight LCs in the PDLC material greatly lowers the switching voltages (e.g., to ~2 V/µm). Another advantage of using LC monomers is that it is possible to apply low AC or DC fields while recording holograms to pre-align the host LC monomers and low molecular weight LC so that a desired orientation and configuration of the nematic directors can be obtained in the LC droplets. The chemical formulae of several suitable LC monomers are as follows:

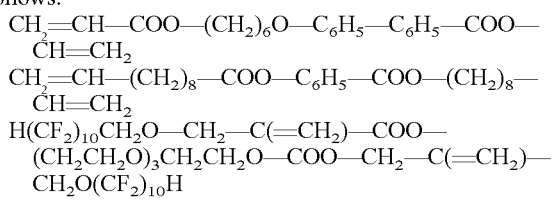

Semifluorinated polymers are known to show weaker anchoring properties and also significantly reduced switching fields. Thus, it is believed that semifluorinated acrylate monomers which are bifunctional and liquid crystalline will find suitable application in the present invention.

Referring now to FIG. 1 of the drawings, there is shown a cross-sectional view of an electrically switchable hologram 10 made of an exposed polymer-dispersed liquid crystal material according to the teachings of the present invention. A layer 12 of the polymer-dispersed liquid crystal material is sandwiched between a pair of indium-tin-oxide (ITO) coated glass slides 14 and spacers 16. The interior of hologram 10 shows the Bragg transmission gratings 18 formed when layer 12 was exposed to an interference pattern from two intersecting beams of coherent laser light. The exposure times and intensities can be varied depending on the diffraction efficiency and liquid crystal domain size desired. Liquid crystal domain size can be controlled by varying the concentrations of photoinitiator, coinitiator and chain-extending (or cross-linking) agent. The orientation of the nematic directors can be controlled while the gratings are being recorded by application of an external electric field across the ITO electrodes.

Figure 2:
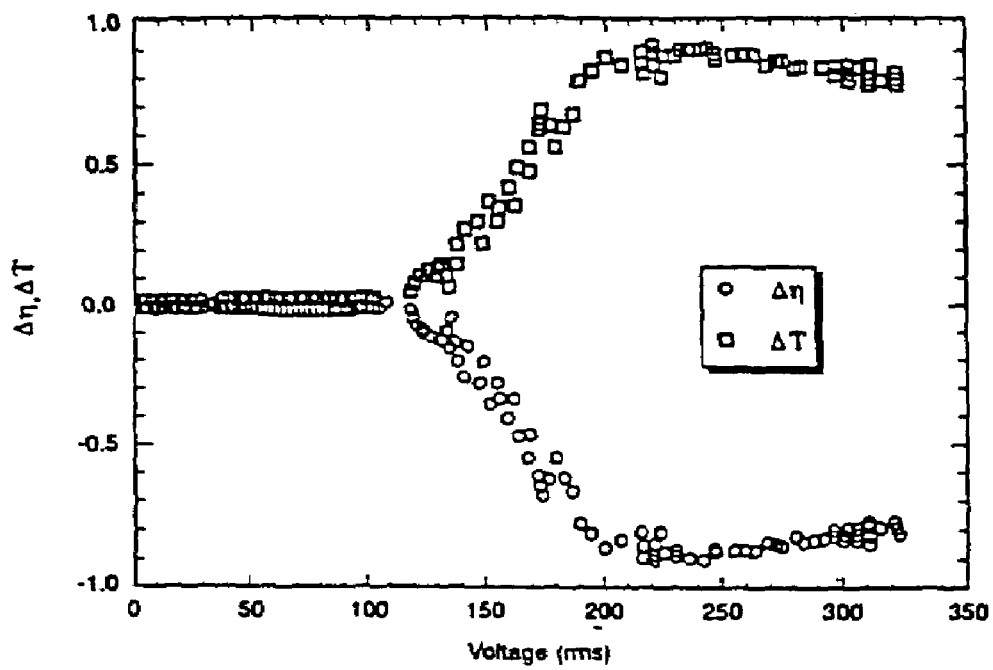
FIG. 2 is a graph of the normalized net transmittance and normalized net diffraction efficiency of a hologram made according to the teachings of the present invention (without the addition of a surfactant) versus the rms voltage applied across the hologram.

FIG. 2 is a graph of the normalized net transmittance and normalized net diffraction efficiency of a hologram made according to the teachings of the present invention versus the root mean square voltage ("Vrms") applied across the hologram. $\Delta\eta$ is the change in first order Bragg diffraction efficiency. $\Delta T$ is the change in zero order transmittance. FIG. 2 shows that energy is transferred from the first order beam to the zero-order beam as the voltage is increased. There is a true minimum of the diffraction efficiency at approximately 225 Vrms. The peak diffraction efficiency can approach 100%, depending on the wavelength and polarization of the probe beam, by appropriate adjustment of the sample thickness. The minimum diffraction efficiency can be made to approach 0% by slight adjustment of the parameters of the PDLC material to force the refractive index of the cured polymer to be equal to the ordinary refractive index of the liquid crystal.

Figure 3:
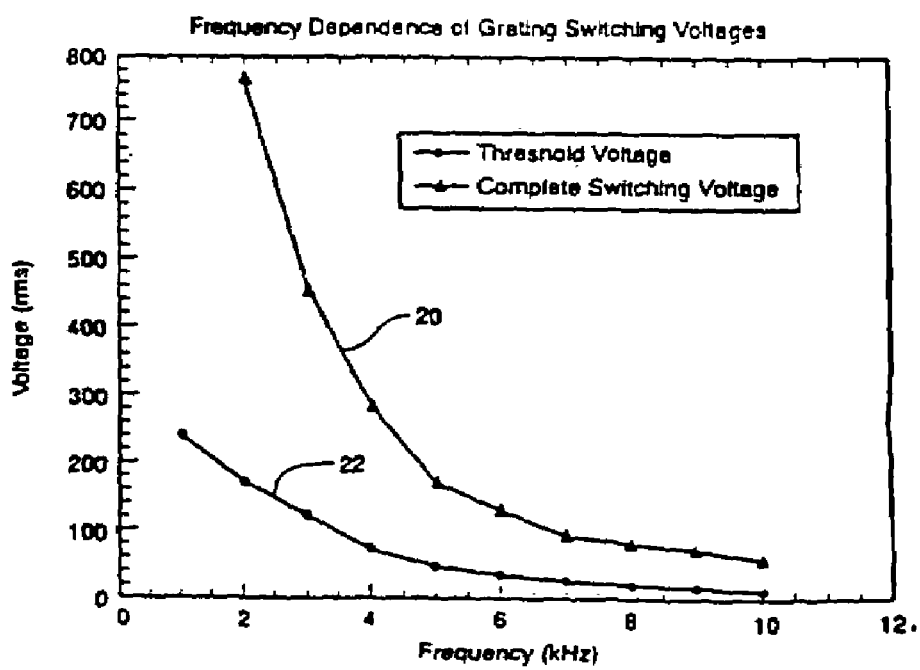
FIG. 3 is a graph of both the threshold and complete switching rms voltages needed for switching a hologram made according to the teachings of the present invention to minimum diffraction efficiency versus the frequency of the rms voltage.

By increasing the frequency of the applied voltage, the switching voltage for minimum diffraction efficiency can be decreased significantly. This is illustrated in FIG. 3, which is a graph of both the threshold rms voltage 20 and the complete switching rms voltage 22 needed for switching a hologram made according to the teachings of the present invention to minimum diffraction efficiency versus the frequency of the rms voltage. The threshold and complete switching rms voltages are reduced to 20 Vrms and 60 Vrms, respectively, at 10 kHz. Lower values are expected at even higher frequencies.

Figure 4:
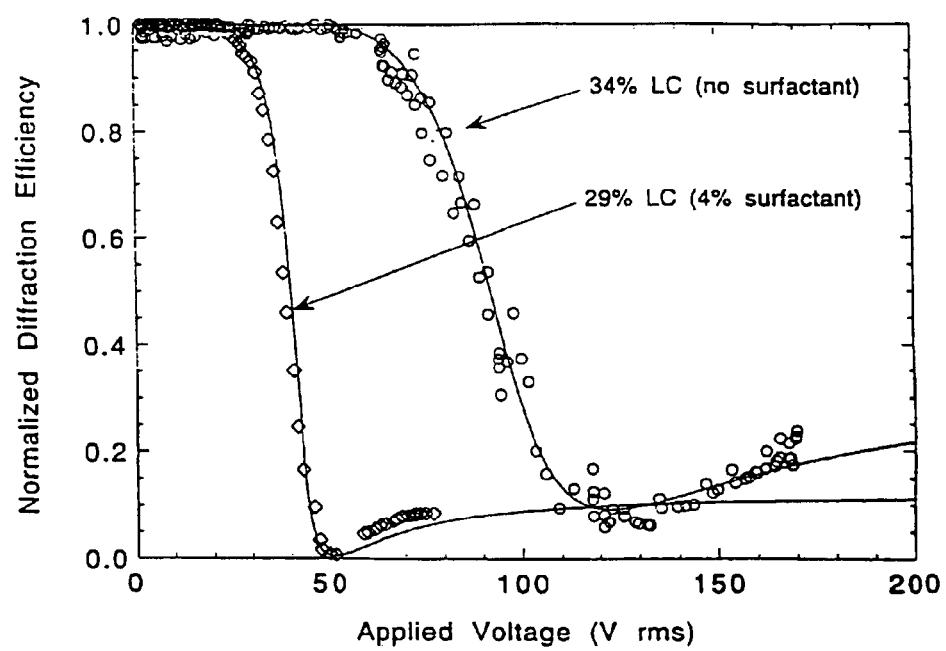
FIG. 4 is a graph of the normalized diffraction efficiency as a function of the applied electric field for a PDLC material formed with 34% by weight liquid crystal surfactant present and a PDLC material formed with 29% by weight liquid crystal and 4% by weight surfactant.
Figure 5:
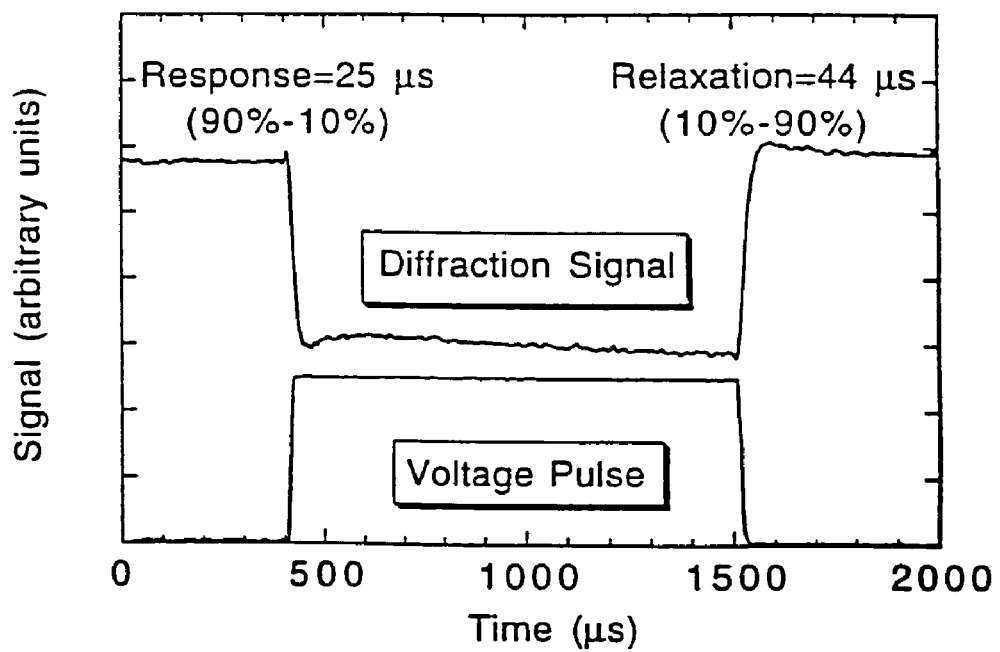
FIG. 5 is a graph showing the switching response time data for the diffracted beam in the surfactant-containing PDLC material in FIG. 5.

Smaller liquid crystal droplet sizes have the problem that it takes high switching voltages to switch their orientation. As described in the previous paragraph, using alternating current switching voltages at high frequencies helps reduce the needed switching voltage. As demonstrated in FIG. 4, another unique discovery of the present invention is that adding a surfactant (e.g., octanoic acid or octanol) to the prepolymer material in amounts of about 4%-6% by weight of the total mixture resulted in sample holograms with switching voltages near 50 Vrms at lower frequencies of 1-2 kHz. As shown in FIG. 5, it has also been found that the use of the surfactant with the associated reduction in droplet size, reduces the switching time of the PDLC materials. Thus, samples made with surfactant can be switched on the order of 25-44 microseconds. Without wishing to be bound by any theory, the surfactant is believed to reduce switching voltages by reducing the anchoring of the liquid crystals at the interface between liquid crystal and cured polymer.

Figure 6:
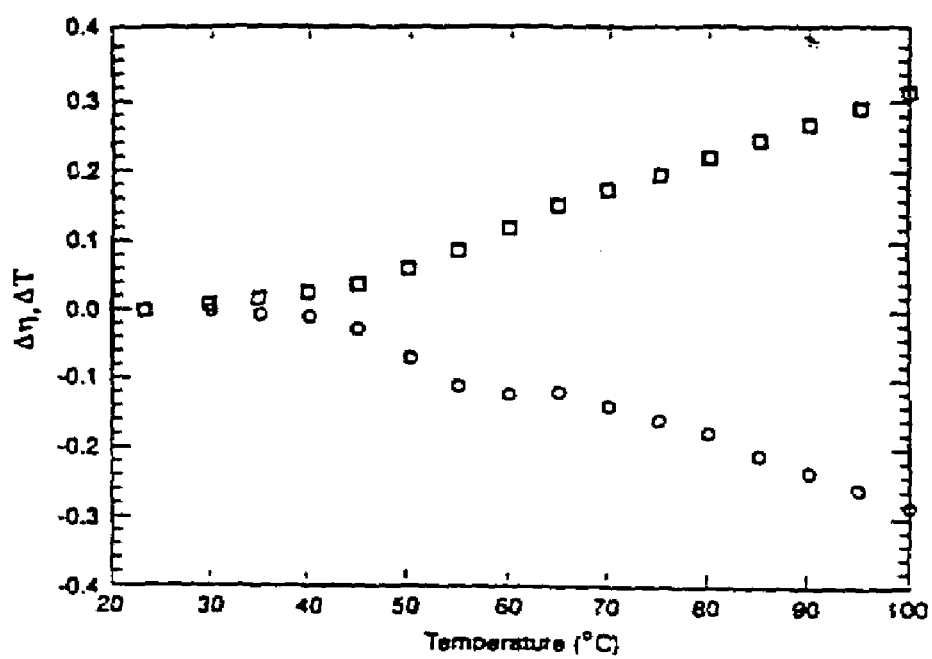
FIG. 6 is a graph of the normalized net transmittance and the normalized net diffraction efficiency of a hologram made according to the teachings of the present invention versus temperature.

Thermal control of diffraction efficiency is illustrated in FIG. 6. FIG. 6 is a graph of the normalized net transmittance and normalized net diffraction efficiency of a hologram made according to the teachings of the present invention versus temperature.

The polymer-dispersed liquid crystal materials described herein successfully demonstrate the utility for recording volume holograms of a particular composition for such polymer-dispersed liquid crystal systems. Although the disclosed polymer-dispersed liquid crystal systems are specialized, the present invention will find application in other areas where a fast curing polymer and a material that can be phase-separated from the polymer will find use.

Figure 7:
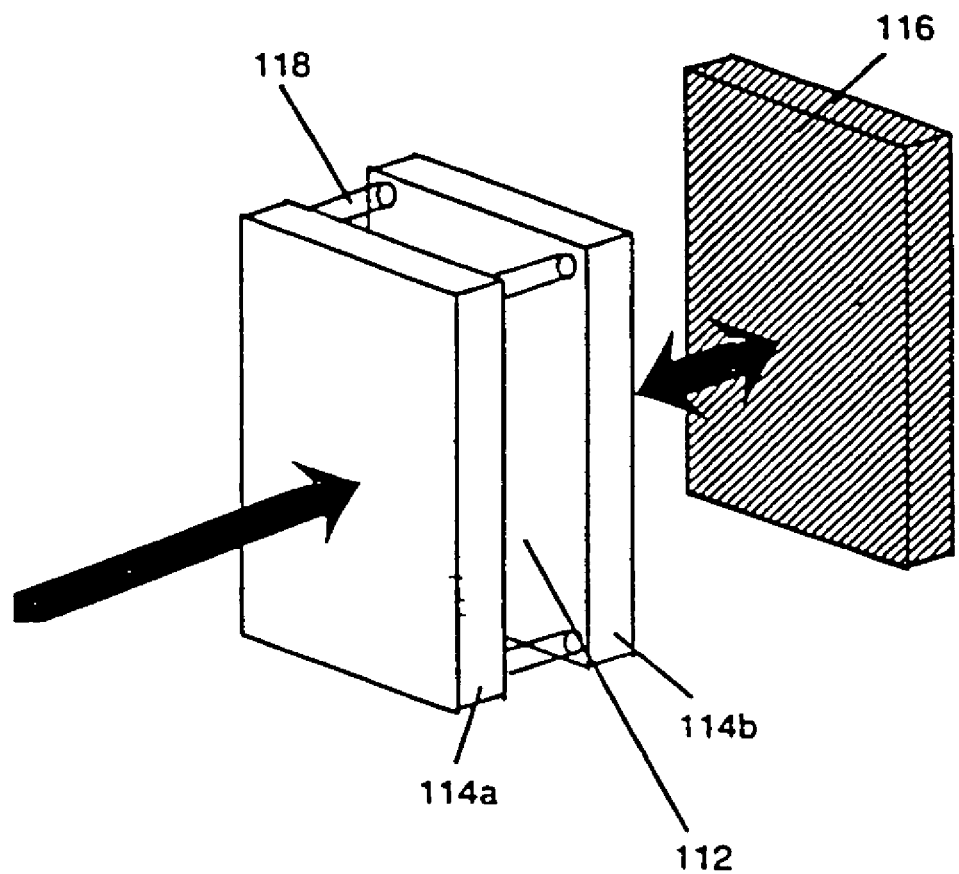
FIG. 7 is an elevational view of a typical experimental arrangement for recording reflection gratings.

As shown in FIG. 7, a PDLC reflection grating is prepared by placing several drops of the mixture of prepolymer material 112 on an indium-tin oxide ("ITO") coated glass slide 114a. A second indium-tin oxide ("ITO") coated slide 114b is then pressed against the first, thereby causing the prepolymer material 112 to fill the region between the slides 114a and 114b. Preferably, the separation of the slides is maintained at approximately 20 µm by utilizing uniform spacers 118. Preparation, mixing and transfer of the prepolymer material is preferably done in the dark. Once assembled, a mirror 11b is placed directly behind the glass plate 114b. The distance of the mirror from the sample is preferably substantially shorter than the coherence length of the laser. The PDLC material is preferably exposed to the 488 nm line of an argon ion laser, expanded to fill the entire plane of the glass plate, with an intensity of approximately 0.1-100 mWatts/cm$^2$ with typical exposure times of 30-120 seconds. Constructive and destructive interference within the expanded beam establishes a periodic intensity profile through the thickness of the film.

In the preferred embodiment, the prepolymer material utilized to make a reflection grating comprises a monomer, a liquid crystal, a cross-linking monomer, a coinitiator, and a photoinitiator dye. In the preferred embodiment, the reflection grating is formed from prepolymer material comprising by total weight of the monomer dipentaerythritol hydroxypentaacrylate ("DPHA"), 34% by total weight of a liquid crystal comprising a mixture of cyanobiphenyls (known commercially as "E7"), 10% by total weight of a cross-linking monomer comprising N-vinylpyrrolidone ("NVP"), 2.5% 10 by weight of the coinitiator N-phenylglycine ("NPG"), and $10^{-5}$ to $10^{-6}$ gram moles of a photoinitiator dye comprising rose bengal ester. Further, as with transmission gratings, the addition of surfactants is expected to facilitate the same advantageous properties discussed above in connection with transmission gratings. It is also expected that similar ranges and variation of prepolymer starting materials will find ready application in the formation of suitable reflection gratings.

It has been determined by low voltage, high resolution scanning electron microscopy ("LVHRSEM") that the resulting material comprises a fine grating with a periodicity of 165 nm with the grating vector perpendicular to the plane of the surface. Thus, as shown schematically in FIG. 8a, grating 130 includes periodic planes of polymer channels 130a and PDLC channels 130b which run parallel to the front surface 134. The grating spacing associated with these periodic planes remains relatively constant throughout the full thickness of the sample from the air/film to the film/substrate interface.

Although interference is used to prepare both transmission and reflection gratings, the morphology of the reflection grating differs significantly. In particular, it has been determined that, unlike transmission gratings with similar liquid crystal concentrations, very little coalescence of individual droplets was evident. Furthermore, the droplets that were present in the material were significantly smaller, having diameters between 50 and 100 nm. Furthermore, unlike transmission gratings where the liquid crystal-rich regions typically comprise less than 40% of the grating, the liquid crystal-rich component of a reflection grating is significantly larger. Due to the much smaller periodicity associated with reflection gratings, i.e., a narrower grating spacing (~0.2 microns), it is believed that the time difference between completion of curing in high intensity versus low intensity regions is much smaller. Thus, gelation occurs more quickly and droplet growth is minimized. It is also believed that the fast polymerization, as evidenced by small droplet diameters, traps a significant percentage of the liquid crystal in the matrix during gelation and precludes any substantial growth of large droplets or diffusion of small droplets into larger domains.

Analysis of the reflection notch in the absorbance spectrum supports the conclusion that a periodic refractive index modulation is disposed through the thickness of the film. In PDLC materials that are formed with the 488 nm line of an argon ion laser, the reflection notch typically has a reflection wavelength at approximately 472 nm for normal incidence and a relatively narrow bandwidth. The small difference between the writing wavelength and the reflection wavelength (approximately 5%) indicates that shrinkage of the film is not a significant problem. Moreover, it has been found that the performance of such gratings is stable over periods of many months.

In addition to the materials utilized in the preferred embodiment described above, it is believed that suitable PDLC materials could be prepared utilizing monomers such as triethyleneglycol diacrylate, trimethylolpropanetriacrylate, pentaerythritol triacrylate, pentaerythritol tetraacrylate, pentaerythritol pentaacrylate, and the like. Similarly, other coinitiators such as triethylamine, triethanolamine, N,N-dimethyl-2,6-diisopropylaniline, and the like could be used instead of N-phenyl glycine. Where it is desirable to use the 458 nm, 476 nm, 488 nm or 514 nm lines of an argon ion laser, the photoinitiator dyes rose bengal sodium salt, eosin, eosin sodium salt, fluorescein sodium salt and the like will give favorable results. Where the 633 nm line is utilized, methylene blue will find ready application. Finally, it is believed that other liquid crystals, such as 4'-pentyl-4-cyanobiphenyl or 4'-heptyl-4-cyanobiphenyl, can be utilized in accordance with the invention.

Referring again to FIG. 8a, there is shown an elevational view of a reflection grating 130 in accordance with the invention having periodic planes of polymer channels 130a and PDLC channels 130b disposed parallel to the front surface 134 of the grating 130. The symmetry axis 136 of the liquid crystal domains is formed in a direction perpendicular to the periodic channels 130a and 130b of the grating 130 and perpendicular to the front surface 134 of the grating 130. Thus, when an electric field E is applied, as shown in FIG. 8b, the symmetry axis 136 is already in a low energy state in alignment with the field E and will not reorient. Thus, reflection gratings formed in accordance with the procedure described above will not normally be switchable.

In general, a reflection grating tends to reflect a narrow wavelength band, such that the grating can be used as a reflection filter. In the preferred embodiment, however, the reflection grating is formed so that it will be switchable. In accordance with the present invention, switchable reflection gratings can be made utilizing negative dielectric anisotropy LCs (or LCs with a low cross-over frequency), an applied magnetic field, an applied shear stress field, or slanted gratings.

Figures 9A, 9B:
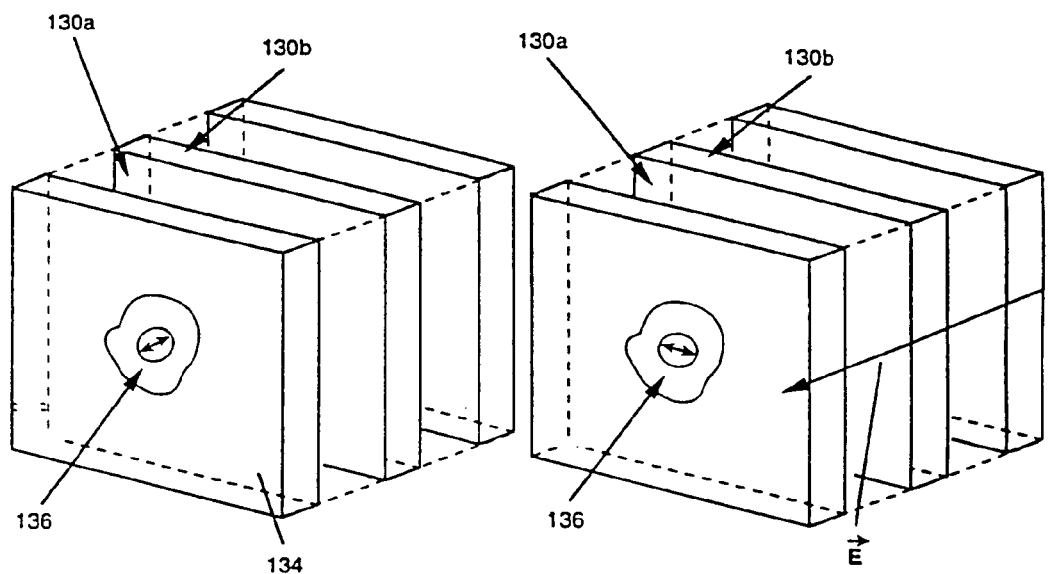
FIGS. 9a and 9b are elevational views of a reflection grating in accordance with the invention having periodic planes of polymer channels and PDLC channels disposed parallel to the front surface of the grating in the absence of an electric field (FIG. 9a) and with an electric field applied (FIG. 9b) wherein the liquid crystal utilized in the formation of the grating has a negative dielectric anisotropy.

It is known that liquid crystals having a negative dielectric anisotropy (Δ∈) will rotate in a direction perpendicular to an applied field. As shown in FIG. 9a, the symmetry axis 136 of the liquid crystal domains formed with liquid crystal having a negative ΔЄ will also be disposed in a direction perpendicular to the periodic channels 130*a* and 130*b* of the grating 130 and to the front surface 134 of the grating. However, when an electric field E is applied across such gratings, as shown in FIG. 9*b*, the symmetry axis of the negative ΔЄ liquid crystal will distort and reorient in a direction perpendicular to the field E, which is perpendicular to the film and the periodic planes of the grating. As a result, the reflection grating can be switched between a state where it is reflective and a state where it is transmissive. The following negative ΔЄ liquid crystals and others are expected to find ready application in the methods and devices of the present invention:

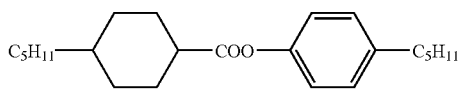

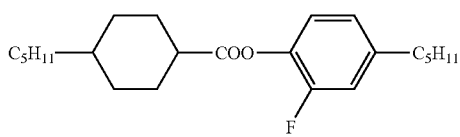

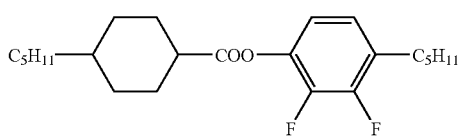

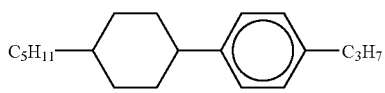

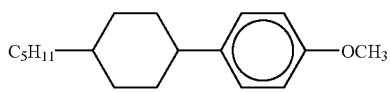

Liquid crystals can be found in nature (or synthesized) with either positive or negative ΔЄ. Thus, in more detailed aspects of the invention, it is possible to use a LC which has a positive ΔЄ at low frequencies, but becomes negative at high frequencies. The frequency (of the applied voltage) at which ΔЄ changes sign is called the cross-over frequency. The crossover frequency will vary with LC composition, and typical values range from 1-10 kHz. Thus, by operating at the proper frequency, the reflection grating may be switched. In accordance with the invention, it is expected that low crossover frequency materials can be prepared from a combination of positive and negative dielectric anisotropy liquid crystals. A suitable positive dielectric liquid crystal for use in such a combination contains four ring esters as shown below:

A strongly negative dielectric liquid crystal suitable for use in such a combination is made up of pyridazines as shown below:

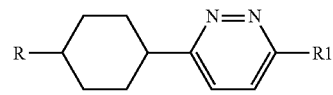

Both liquid crystal materials are available from LaRoche & Co., Switzerland. By varying the proportion of the positive and negative liquid crystals in the combination, crossover frequencies from 1.4-2.3 kHz are obtained at room temperature. Another combination suitable for use in the present embodiment is a combination of the following: p-pentylphenyl-2-chloro-4-(p-pentylbenzoyloxy)benzoate and benzoate. These materials are available from Kodak Company.

Figure 10A:
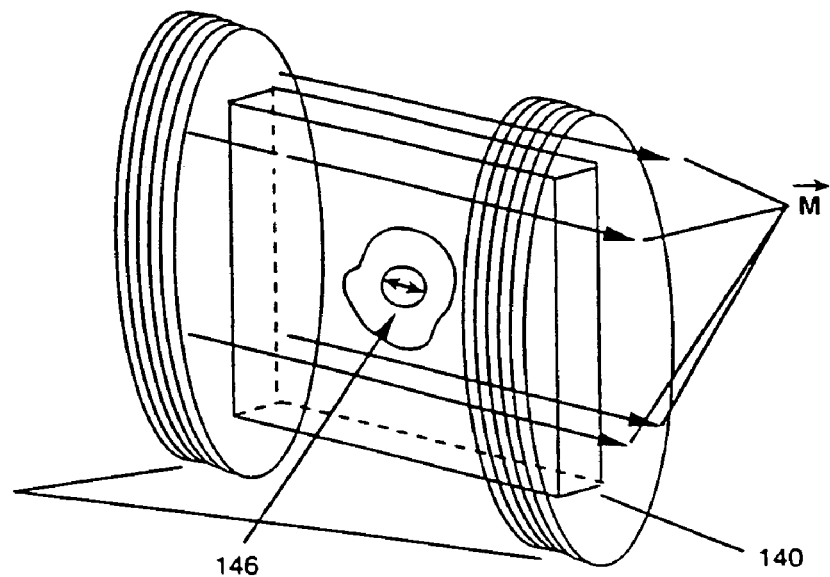
FIG. 10a is an elevational view of a reflection grating in accordance with the invention disposed within a magnetic field generated by Helmholtz coils.
Figure 10B:
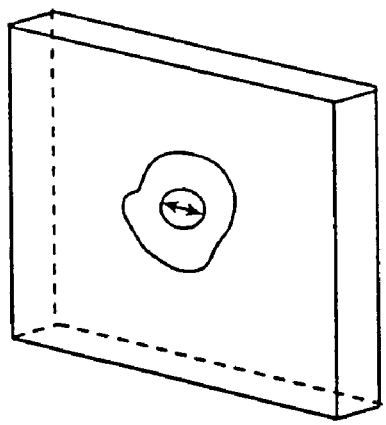
FIGS. 10b and 10c are elevational views of the reflection grating of FIG. 10a in the absence of an electric field (FIG. 10b) and with an electric field applied (FIG. 10c)
Figure 10C:
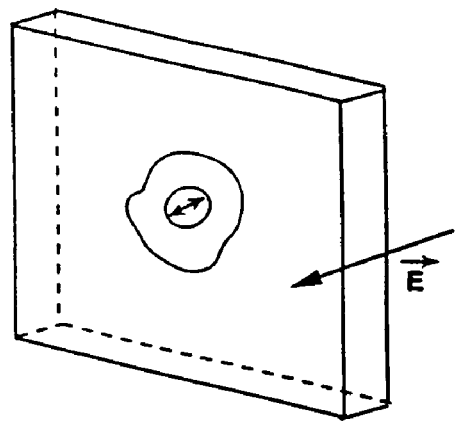

In still more detailed aspects of the invention, switchable reflection gratings can be formed using positive ΔЄ liquid crystals. As shown in FIG. 10*a*, such gratings are formed by exposing the PDLC starting material to a magnetic field during the curing process. The magnetic field can be generated by the use of Helmholtz coils (as shown in FIG. 10*a*), the use of a permanent magnet, or other suitable means. Preferably, the magnetic field M is oriented parallel to the front surface of the glass plates (not shown) that are used to form the grating 140. As a result, the symmetry axis 146 of the liquid crystals will orient along the field while the mixture is fluid. When polymerization is complete, the field may be removed and the alignment of the symmetry axis of the liquid crystals will remain unchanged. (See FIG. 10*b*.) When an electric field is applied, as shown in FIG. 10*c*, the positive ΔЄ liquid crystal will reorient in the direction of the field, which is perpendicular to the front surface of grating and to the periodic channels of the grating.

FIG. 11*a* depicts a slanted transmission grating 148 and FIG. 11*b* depicts a slanted reflection grating 150. A holographic transmission grating is considered slanted if the direction of the grating vector G is not parallel to the grating surface. In a holographic reflection grating, the grating is said to be slanted if the grating vector G is not perpendicular to the grating surface. Slanted gratings have many of the same uses as nonslanted gratings such as visual displays, mirrors, line filters, optical switches, and the like.

Primarily, slanted holographic gratings are used to control the direction of a diffracted beam. For example, in reflection holograms a slanted grating is used to separate the specular reflection of the film from the diffracted beam. In a PDLC holographic grating, a slanted grating has an even more useful advantage. The slant allows the modulation depth of the grating to be controlled by an electric field when using either tangential or homeotropic aligned liquid crystals. This is because the slant provides components of the electric field in the directions both tangential and perpendicular to the grating vector. In particular, for the reflection grating, the LC domain

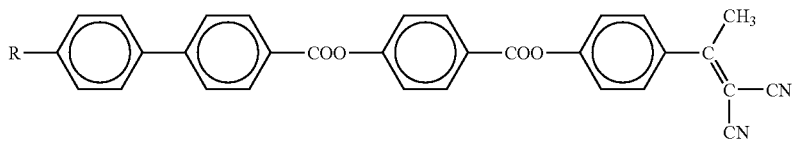

symmetry axis will be oriented along the grating vector G and can be switched to a direction perpendicular to the film plane by a longitudinally applied field E. This is the typical geometry for switching of the diffraction efficiency of a slanted reflection grating.

When recording slanted reflection gratings, it is desirable to place the sample between the hypotenuses of two right-angle glass prisms. Neutral density filters can then be placed in optical contact with the back faces of the prisms using index matching fluids so as to frustrate back reflections which would cause spurious gratings to also be recorded. The incident laser beam is split by a conventional beam splitter into two beams which are then directed to the front faces of the prisms, and then overlapped in the sample at the desired angle. The beams thus enter the sample from opposite sides. This prism coupling technique permits the light to enter the sample at greater angles. The slant of the resulting grating is determined by the angle at which the prism assembly is rotated (i.e., the angle between the direction of one incident beam and the normal to the prism front face at which that beam enters the prism).

Figure 12:
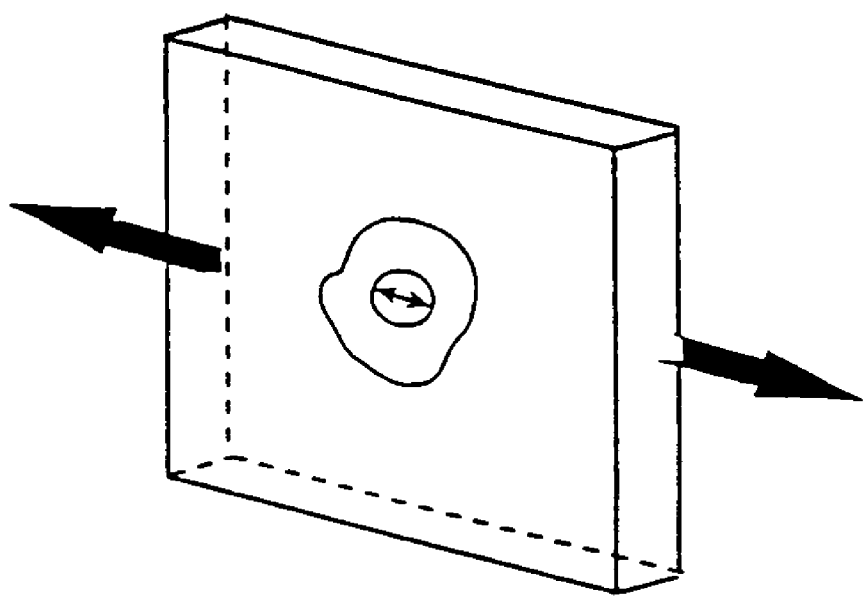
FIG. 12 is an elevational view of a reflection grating formed in accordance with the invention while a shear stress field is applied.

As shown in FIG. 12, switchable reflection gratings may be formed in the presence of an applied shear stress field. In this method, a shear stress would be applied along the direction of a magnetic field M. This could be accomplished, for example, by applying equal and opposite tensions to the two ITO coated glass plates which sandwich the prepolymer mixture while the polymer is still soft. This shear stress would distort the LC domains in the direction of the stress, and the resultant LC domain symmetry axis will be preferentially along the direction of the stress, parallel to the PDLC planes and perpendicular to the direction of the applied electric field for switching.

Reflection gratings prepared in accordance with the teachings of the present invention will find application in color reflective displays, switchable wavelength filters for laser projection, and the like.

As described herein, a holographic grating may be formed by overlapping two interfering incident beams in a sample. Similarly, a slanted grating can be prepared by overlapping the beams so that the angle of incidence of the first beam with respect to a normal from the sample is different from the angle of incidence of the second beam. In recording a slanted reflection grating the beams preferably enter the sample from opposite sides. In recording a slanted transmission grating, however, the beams enter the sample from the same side. The resulting slant of the grating, $\frac{1}{2}(\theta_{ref}-\theta_{obj})$, will be related to the angle between the incident beams. In certain applications, it may be desirable to prepare slanted gratings in which the grating vector G is disposed at a large angle to the grating surface. Such gratings are referred to as highly slanted gratings.

In preparing highly slanted gratings, it is desirable to dispose the first incident beam at a large angle of incidence with respect to the second beam, which is directed along a normal to the sample. However, this arrangement may result in undesirable reflection losses in the first beam, which may affect the balance between the intensity of the incident beams and the resulting index modulation. Therefore, it may be desirable to reduce these reflection losses by directing the incident beam through a prism assembly as shown in FIG. 18.

Figure 18:
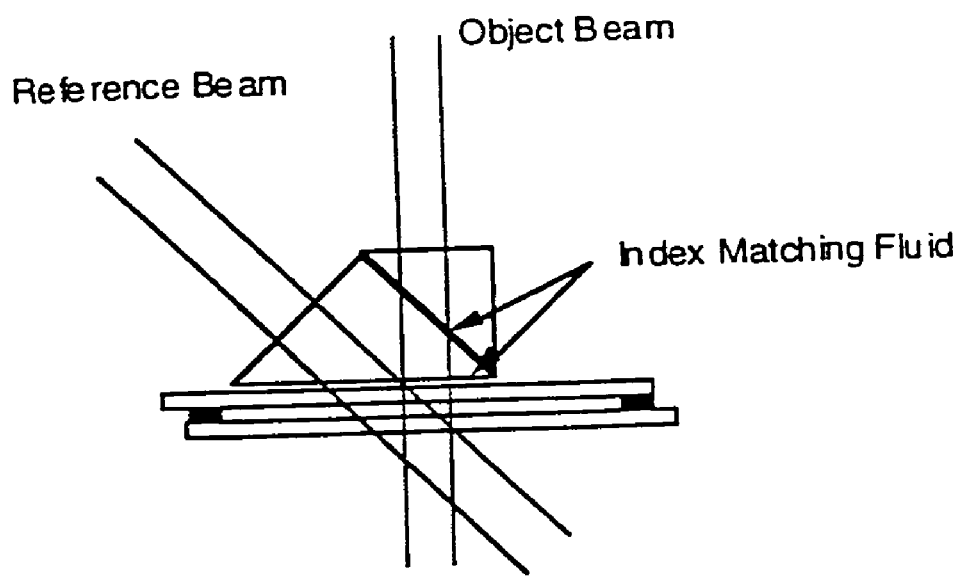
FIG. 18 is a cross sectional view of the prism system and geometric arrangement for forming highly slanted transmission gratings in accordance with the present invention.

In the particular arrangement shown in FIG. 18, two right angle prisms are combined into an assembly that is adapted to reduce reflection losses. This assembly is disposed on the surface of the sample. It is desirable to utilize an index matching fluid between the prisms and between the prism assembly and the sample in order to minimize reflections. The prisms are advantageously selected so that the first, object beam may be directed at a normal to one of the prisms (corresponding to a normal to the sample) and the second, reference beam can be directed at a normal to the other prism (corresponding to the desired angle to the sample). Neutral density filters can then be placed in optical contact with the back faces of the prisms using index matching fluids so as to frustrate back reflections which would cause spurious gratings to also be recorded. The incident laser beam is split by a conventional beam splitter into two beams which are then directed to the front faces of the prisms, and then overlapped in the sample at the desired angle. The beams thus enter the sample from the same side and the prism assembly advantageously reduces spurious reflections.

Figure 19:
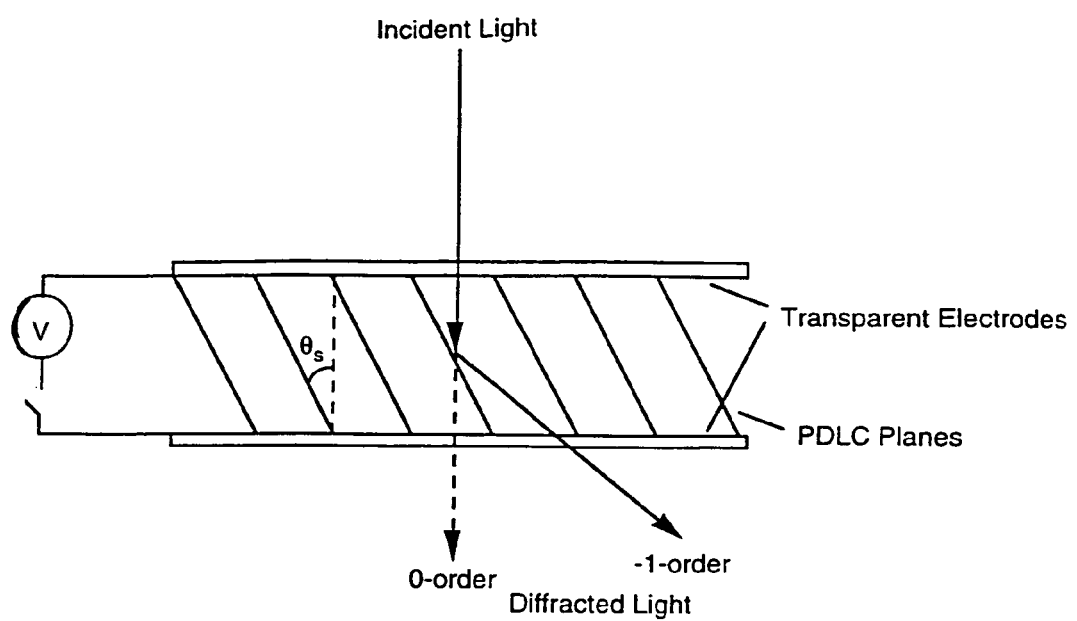
FIG. 19 is a cross sectional view of a switchable highly slanted transmission grating in accordance with the present invention.

A switchable slanted transmission grating made in accordance with the present invention is shown in FIG. 19. Light of a wavelength that is matched to the Bragg condition will be diffracted into the −1-order by the grating and deflected by an angle $2\theta_s$, where $\theta_s$ or $\theta_{slant}$ is the slant angle of the grating. When a voltage is applied, the index modulation of the grating is reduced and the incident radiation can pass through the grating.

Figure 20:
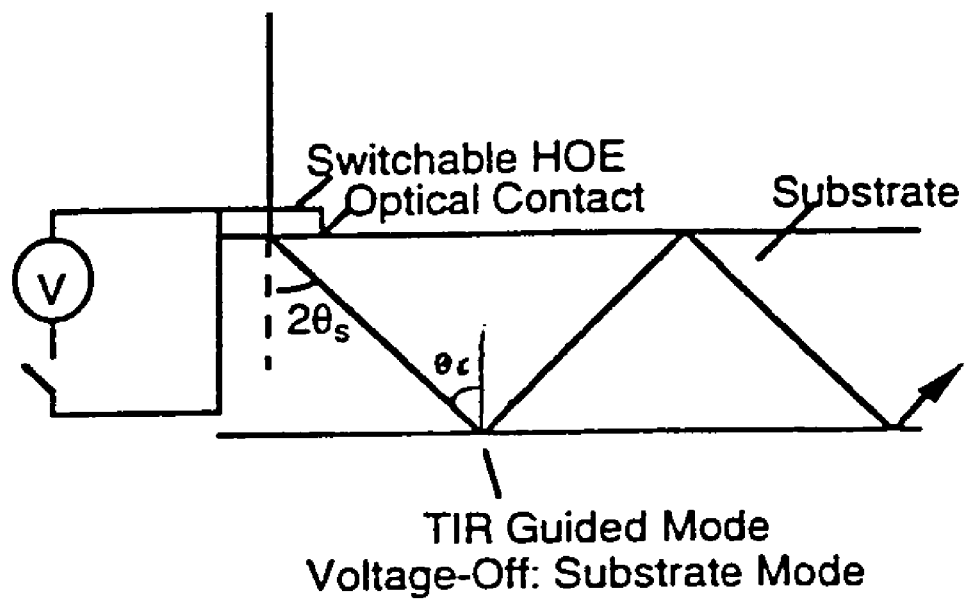
FIG. 20 is a representative side view of a switchable highly slanted transmission grating coupled to a substrate in the absence of an applied field.
Figure 21:
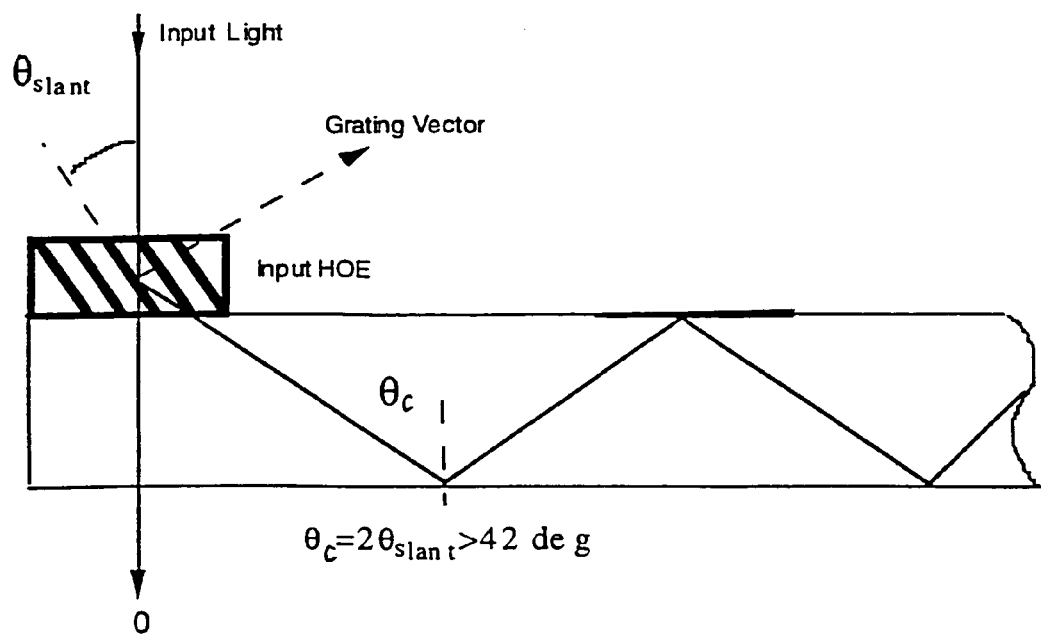
FIG. 21 is a representative side view of a switchable highly slanted transmission grating coupled as an input to a substrate.
Figure 22:
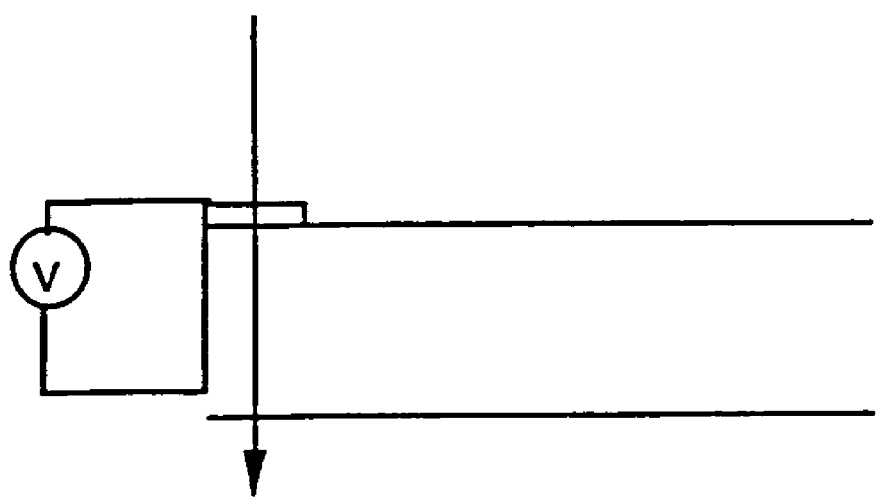
FIG. 22 is a representative side view of a switchable highly slanted transmission grating coupled as an input to a substrate in the presence of an applied field.

As shown in FIGS. 20-22, switchable slanted transmission gratings in accordance with the present invention can be utilized as holographic optical elements (HOEs), and, more particularly, as switchable optical coupling devices. In the system shown in FIGS. 20-22, a switchable slanted transmission grating is placed in optical contact with a transparent substrate. The substrate is preferably a thick transparent medium, such as glass, so that the light guided by total internal reflection (TIR) follows a path determined primarily by geometric optics rather than in a waveguide mode (which would occur for a thin film of thickness comparable to the optical wavelength). In the system shown in FIGS. 20-22, the grating has a slant angle, $\theta_s$ or $\theta_{slant}$, and the substrate has a critical angle, $\theta_c$, for total internal reflection. If, as shown in FIGS. 20-21, the condition $2\theta_{slant}>\theta_c$, is satisfied, then the input light will be diffracted into the substrate where it will be subjected to total internal reflection. Moreover, if a voltage is applied to the switchable slanted transmission grating, as shown in FIG. 22, the diffraction efficiency of the grating can be modified so that the incident light will be transmitted through the grating. Thus, by applying a voltage, the system shown in FIGS. 20-21 can be selectively switched out of the TIR substrate mode. In addition, by varying the applied voltage and the corresponding diffraction efficiency of the grating, the amount of light diffracted into the substrate can be selectively controlled.

Figure 23:
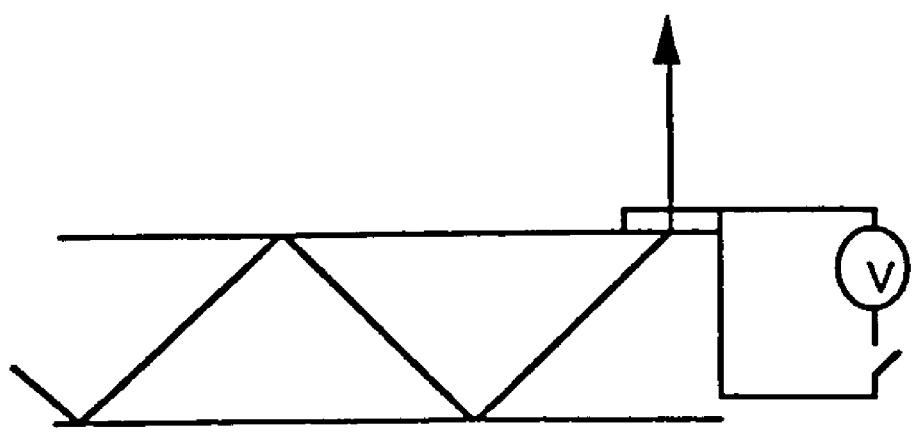
FIG. 23 is a representative side view of a switchable highly slanted transmission grating coupled as an output to a substrate in the absence of an applied field.
Figure 24:
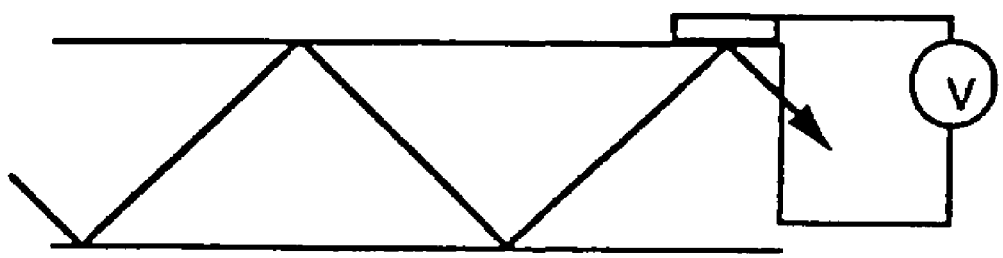
FIG. 24 is a representative side view of a highly slanted transmission grating coupled as an output to a substrate in the presence of an applied field.

Referring now to FIGS. 23 and 24, a switchable slanted transmission grating may similarly be utilized as an output coupling device. As shown in FIG. 23, a switchable slanted transmission grating may be placed in optical contact with a transparent substrate at a point where light is totally internally reflected within the substrate, so that the light will be diffracted out of the substrate. Where a voltage is applied to the switchable slanted transmission grating, as shown in FIG. 24, the diffraction efficiency of the grating can be modified so that the incident light will not be diffracted through the grating. More detailed aspects of such output coupling devices are discussed in connection with the discussion of FIGS. 25 and 26.

Where a slanted grating is to be used for optical coupling to a substrate, it is often desirable to select the angle of the slant and to match the index of the grating to that of the substrate. Moreover, it will be appreciated that the application of an anti-reflective coating to the grating will advantageously reduce spurious reflections. It will also be appreciated that the polymer-dispersed liquid crystal material may be selected so that the diffraction efficiency of the grating can be conveniently adjusted from 0 to 100% by the application of an electric field.

An example of a static one-to-many fan-out optical interconnect is given in an article entitled "Cross-link Optimized Cascaded Volume Hologram Array with Energy-equalized One-to-many Surface-normal Fan-outs," by J. Liu, C. Zhao, R. Lee, and R. T. Chen, Optics Letters, 22, pp. 1024-26 (1997), incorporated herein by reference.

Figure 25:
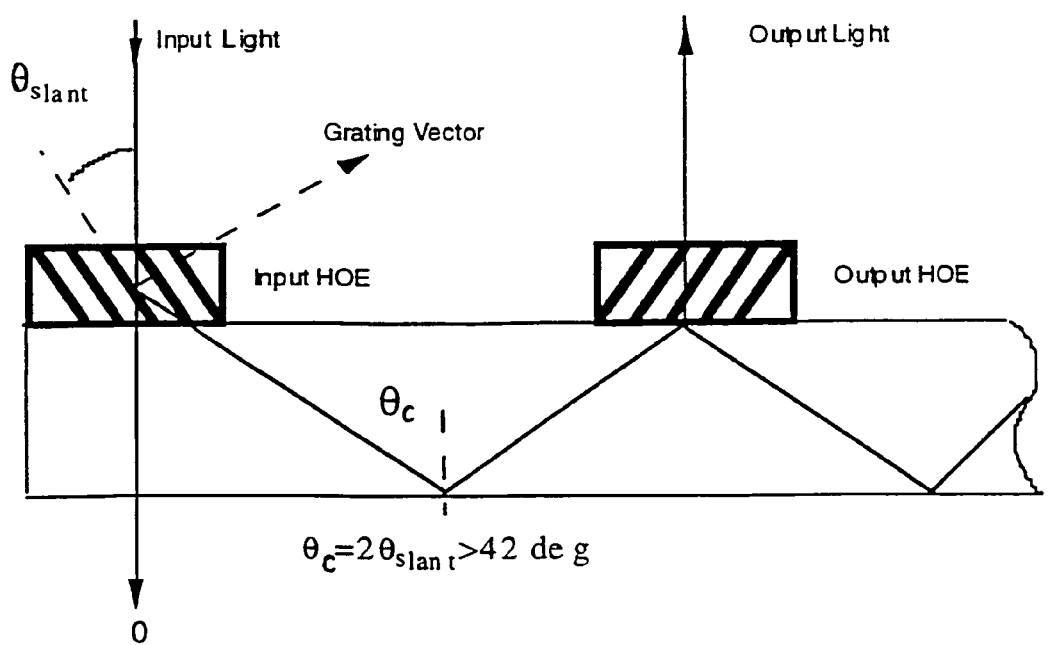
FIG. 25 is a representative side view of a first highly slanted transmission grating coupled as an input to a substrate and a second highly slanted transmission grating coupled as an output to a substrate.
Figure 26:
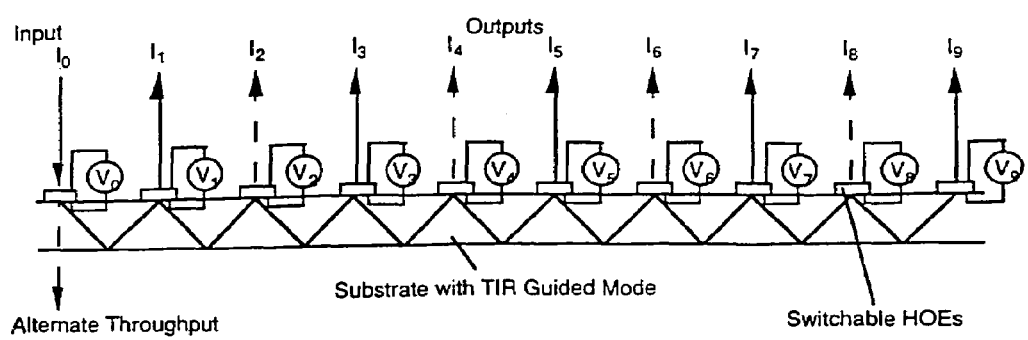
FIG. 26 is a representative side view of a selectively adjustable and reconfigurable one-to-many fan-out optical interconnect in accordance with the present invention.

As shown in FIGS. 25 and 26, however, switchable slanted transmission gratings can be used as optical couplers to form devices such as a selectively adjustable and reconfigurable one-to-many fan-out optical interconnect. A first input slanted transmission grating, such as the grating shown in FIG. 19, is disposed in optical contact with the substrate. At several points along the substrate where light reflects internally, additional output slanted transmission gratings, such as those shown in FIGS. 23-24, may be deposited with good optical contact so that the light may be diffracted out of the substrate. It will be appreciated that the slant angle, $\theta_s$ or $\theta_{slant}$, of the output gratings is advantageously oriented at the opposite angle of the input grating. Individual voltage sources are preferably connected to the input and each of the output gratings.

As shown in the particular example in FIG. 25, the slant angle of the grating should exceed 23° so that the diffracted angle is 46° and greater than the 41.3° critical angle for the total internal reflection for the BK-7 glass substrate (having a refractive index of 1.52). This large slant allows light, normally incident on the waveguide, to be diffracted at such a large angle that the light becomes trapped inside the glass slab due to total internal reflection.

For a one-to-many fan-out optical interconnect having a total of N outputs of equal optical power, the diffraction efficiencies of each successive HOE is given by:

$$\eta_j = \frac{1}{N - j + 1}, (j = 1^K N)$$

Thus, light may be coupled into the substrate by a diffraction grating which deflects the light at an angle greater than the critical angle for TIR. The coupled light is guided along the substrate by TIR. At each output node some light is coupled out of the substrate by diffraction while the remainder continues to propagate down the substrate. Eventually all of the light may be coupled out of the substrate and sent to N other inputs, such as detectors, nodes of other switches, or the like. In such devices, it is desirable to control the diffraction efficiency to equalize the output power in each channel of the fan-out.

In static optical interconnects, it is difficult to control the diffraction efficiencies for a one-to-many fan-out. In particular, the holographic optical elements must be manufactured to exacting tolerances concerning their diffraction efficiency. Deviations from the required values result in either poor performance or rejection of the element and re-manufacture of the part. In particular, it is difficult to achieve a uniform fan-out energy distribution in such substrate guided-wave interconnects. In the present invention, the holographic optical elements can be manufactured with the same diffraction efficiency (~100%) and voltage-tuned in real-time to achieve the desired diffraction efficiency. As a result, the yield and quality of such elements can be increased and the ease of use is dramatically improved. Moreover, in devices incorporating static HOEs, it is difficult to adjust individual outputs and the configuration of the device. Typically such changes must be made mechanically by alteration of the existing HOEs or substitution of HOEs within the system. In particular, the same HOEs could not be used in a general reconfiguration of a substrate guided-wave interconnect since the diffraction efficiencies would not be correct for equal power fan-out. Finally, it is desirable to incorporate an input HOE having a high diffraction efficiency, such as the switchable gratings of the present invention, into such devices.

Switchable polymer-dispersed liquid crystal materials in accordance with the invention have been advantageously utilized to provide electrically switchable substrate guidedwave optical interconnects. Advantageously, the diffraction efficiency of each HOE can be tuned electrically to achieve equal-power fan-out. This feature eases manufacturing tolerances. In addition, by adjusting the output of the HOEs, the system can be reconfigured to display different fan-out, different outputs, different modules, or other configurational changes. Moreover, when a system is reconfigured, the diffraction efficiencies can be voltage-tuned to equalize the fan-out energy distribution, if desired.

In the example of a reconfigurable interconnect incorporating switchable HOEs in accordance with the present invention shown in FIG. 26, each HOE is preferably fabricated with a nominal diffraction efficiency $\eta^-100\%$. Each HOE may then be individually voltage-tuned to a value $\eta_j = (N-j+1)^{-1}$, where, for example, N=9. If $V_o = V_{sw}$, (where $V_{sw}$ is the 100%-switching voltage), the fan-out is 1-to-0, i.e., no fan-out. If $V_0 = 0$ such that $\eta_0 = 100\%$, the fan-out is 1-to-N. Examples of reconfigurable voltage/fan-out schemes corresponding to the reconfigurable substrate mode optical interconnect shown in FIG. 26 are set forth in the following table.

| Reconfigurable Fan-Out Scheme | | | |
|---|---|---|---|
| 1-to-9 Fan-Out | | 1-to-5 Fan-Out | |
| $V_1$ | $\eta = 11\%$ | V1' | $\eta = 20\%$ |
| $V_2$ | $\eta = 12\%$ | $V_{SW}$ | $\eta = 0\%$ |
| $V_3$ | $\eta = 14\%$ | V3' | $\eta = 25\%$ |
| $V_4$ | $\eta = 16\%$ | $V_{SW}$ | $\eta = 0\%$ |
| $V_5$ | $\eta = 20\%$ | V5' | $\eta = 33\%$ |
| $V_6$ | $\eta = 25\%$ | $V_{SW}$ | $\eta = 0\%$ |
| $V_7$ | $\eta = 33\%$ | V7' | $\eta = 50\%$ |
| $V_8$ | $\eta = 50\%$ | $V_{SW}$ | $\eta = 0\%$ |
| $V_9$ | $\eta = 100\%$ | V9' | $\eta = 100\%$ |
| with each output $I_j = I_0/9$ | | with each output $I_j = I_0/5$ | |

In the 1-9 Fan-Out Configuration, the voltages $V_j$ are adjusted to yield diffraction efficiencies such that the outputs will have equal output intensities. In the 1-5 Fan-Out Configuration, four of the HOE outputs are set to yield zero diffraction efficiency, i.e., no output, and the remaining five voltages are adjusted to yield equal output intensities of the five active channels. It will be appreciated that a variety of configurations are possible, such as a 1-to-5 fan-out involving just the first five channels, or a 1-to-3 fan-out involving the first, sixth, and ninth channel. Moreover, it will be appreciated that the relative intensities of the outputs can be advantageously adjusted by adjusting the switching voltages. In addition, for any system including N channels, the outputs can be matched by adjusting the voltage of each HOE to $V_j(N)$ to keep $\eta_j = (N-j+1)^{-1}$ for each value of N.

It will be appreciated that such systems can include a plurality of inputs and that these inputs may be disposed on either side of the substrate. Similarly, such systems could advantageously include one or a plurality of outputs and that these outputs may be disposed on either side of the substrate. It will be further appreciated that a static input could be combined with switchable outputs and that static outputs could be substituted for one or all of the switchable outputs. Moreover, as noted above, the ability to switch the PDLC grating allows for selected control of the intensity and position of light coupled into or out of the substrate and has more potential for use as reconfigurable optical interconnects.

It will be appreciated that prepolymer mixtures for the preparation of switchable slanted gratings have been described herein. In the preparation of switchable slanted gratings for use as optical coupling devices, it is desirable to select the prepolymer mixture so that the average refractive index of the resulting grating is similar to the refractive index of the substrate. In the preferred embodiment in which the grating is coupled to a glass substrate, it has been found that a combination of the following prepolymer components will yield a grating having a desirable average index of refraction: dipentaerythritol pentaacrylate, the chain extender N-vinyl pyrrolidinone (NVP), the liquid crystal E7, the photoinitiator rose bengal and a co-initiator N-phenyl glycine as described previously herein.

Highly slanted gratings in accordance with the invention can be prepared by disposing the prepolymer mixture between ITO coated glass slides using spacers of thickness 15-20 µm. The gratings were recorded using the 488 nm line of an argon-ion laser. The geometry for writing the gratings is shown in FIG. 18. Reading of the gratings was carried out using a He—Ne (633 nm) laser beam.

Electrical switching of the gratings can be accomplished by monitoring the change in the diffraction efficiency (DE) and transmission as the strength of the electric field is increased. The electric field was produced by applying an amplified 2 kHZ square wave from a function generator to the ITO electrodes on the sample. Using square wave pulse, the time responses of the gratings for electrical switching were also measured. Both field on and off times were measured.

Low voltage, high resolution scanning electron microscopy (SEM) can be used to obtain film thickness and morphology. Samples for SEM can be prepared by removing the films from the glass slides and fracturing in liquid nitrogen. The liquid crystal in the sample can be removed by soaking in methanol, and the films coated with 2-3 nm tungsten.

Figure 27:
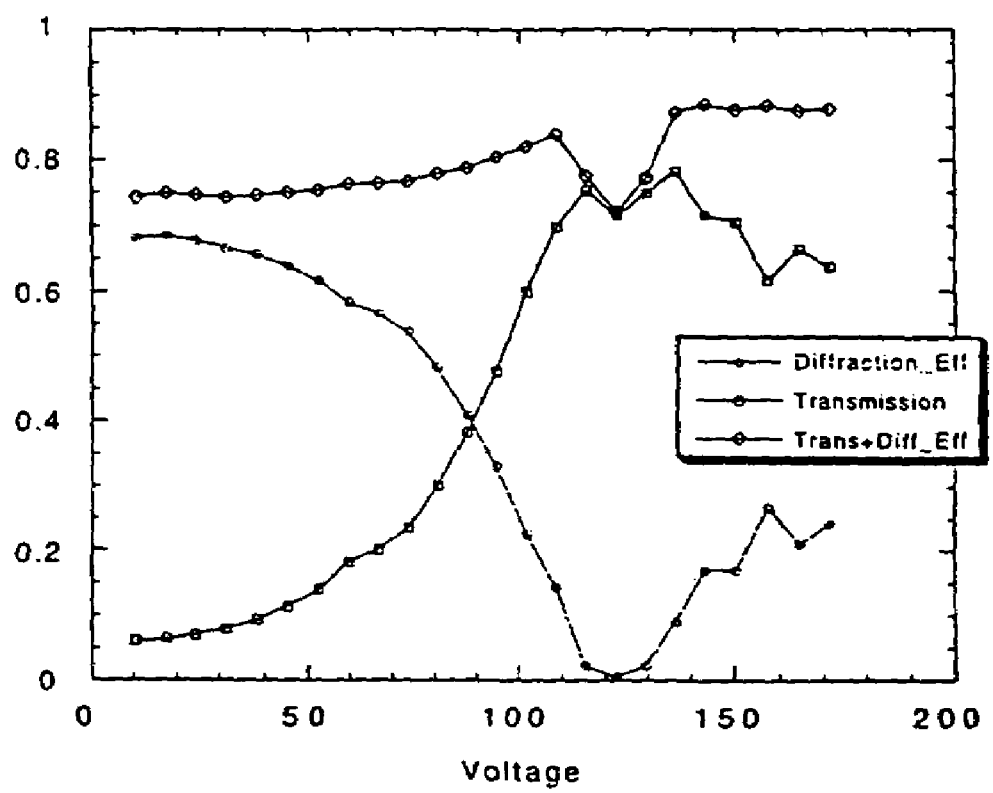
FIG. 27 is a graph of the electrical switching of a highly slanted transmission grating.
Figure 28:
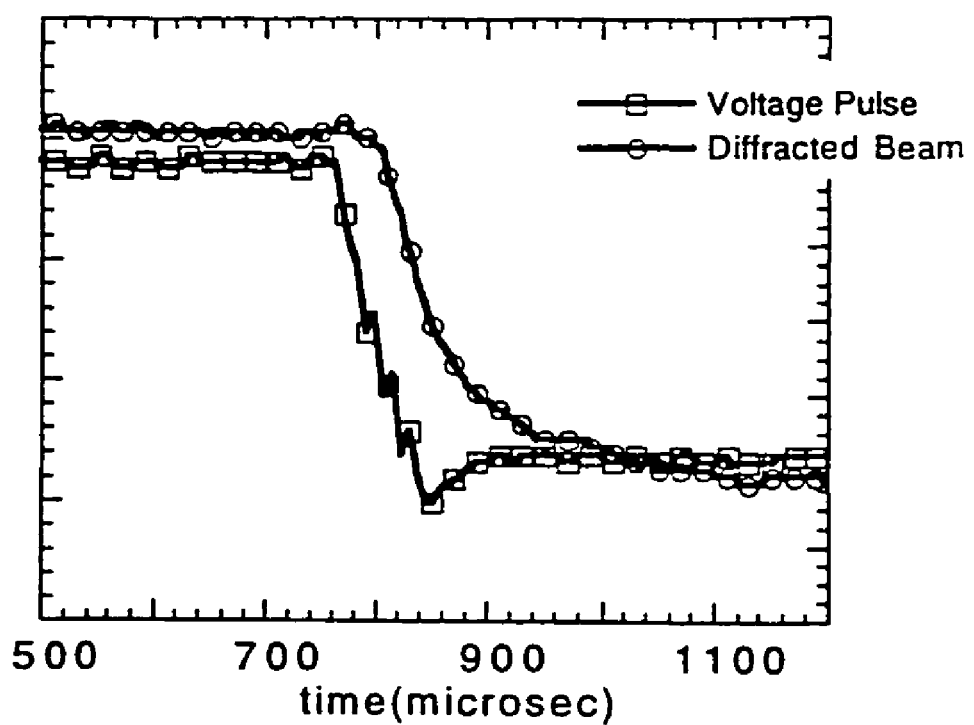
FIG. 28 is a graph of the electrical switching time response of a highly slanted grating for a 97V step voltage.
Figure 29:
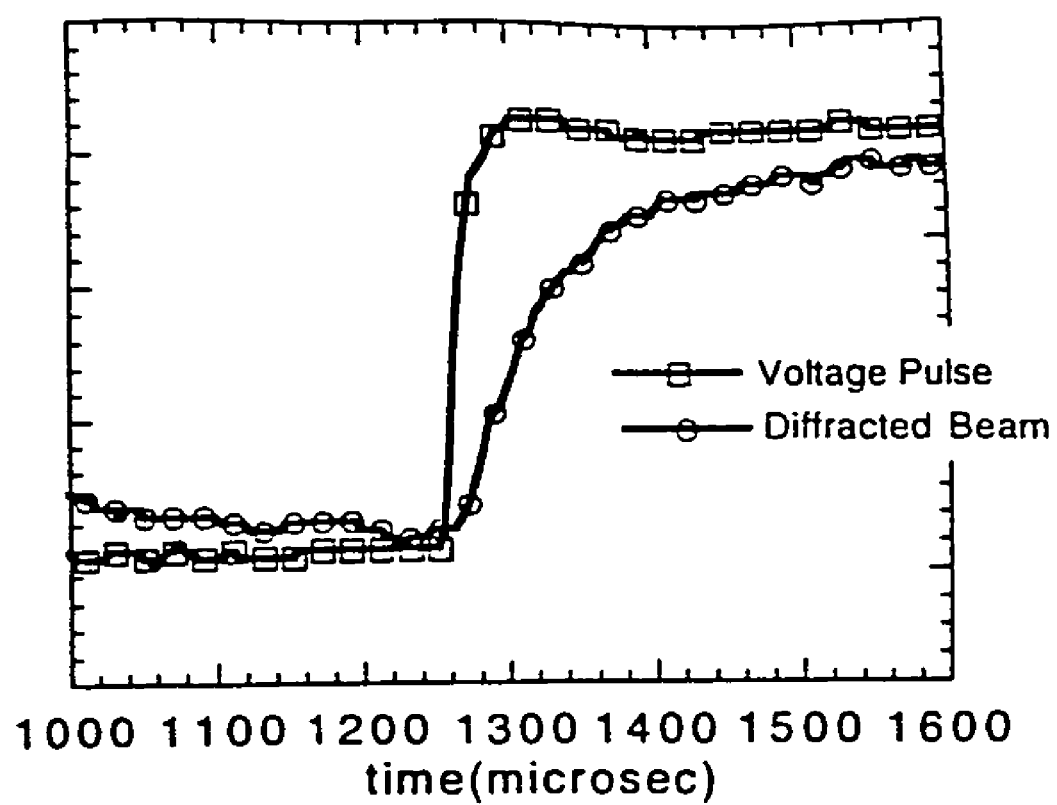
FIG. 29 is a graph of the relaxation of a slanted grating when a switching field of 97 V step voltage was turned off.
Figure 30:
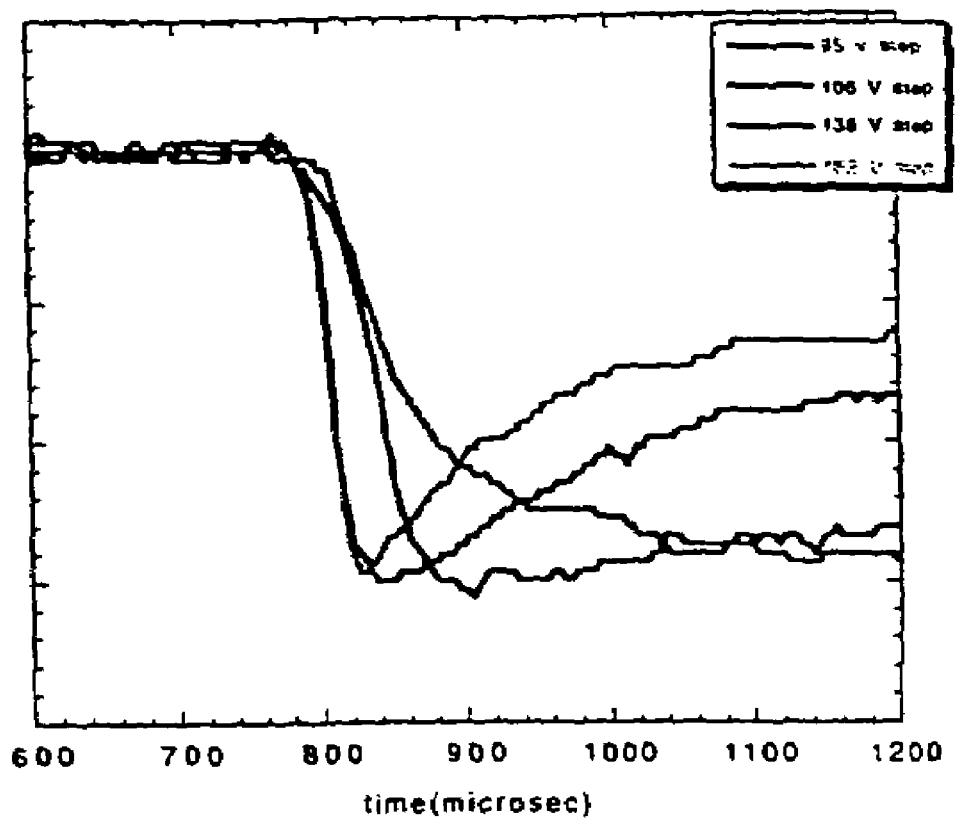
FIG. 30 is a graph of the time response of a slanted grating with higher switching voltages.

FIG. 27 shows the electrical switching curve for a switchable guided substrate-mode coupler. The curve is very similar to non-slanted grating curves with a critical switching field of about 7.5 V/µm. The best dynamic range measured was 17.8 dB in the transmitted beam and 20.6 dB in the diffracted beam. The switching times of the slanted gratings were also measured as shown in FIGS. 28 and 29. The measured on time was 197 µs and the off time 168 µs for an applied 95 V step voltage. Higher driving voltages appear to lead to the unusual response shown in FIG. 30 where the diffracted beam quickly reaches a minimum and then increases again to a constant. It is believed that this effect is due to the rotation of the LC symmetry axis far past the angle for best index matching, a situation which is difficult to obtain in a non-slanted grating but not in a highly slanted grating.

An experimental demonstration of the coupling of the diffracted light from the slanted grating on to a glass slab and the electrical switching is shown in FIGS. 7 and 8 of an article entitled "Electrically Switchable Holograms Containing Novel PDLC Structures," L. V. Natarajan, R. L. Sutherland, V. P. Tondiglia, T. J. Bunning, and R. M. Neal, Vol. 3143, Liquid Crystals, SPIE (1997), incorporated herein by reference. Similarly, an SEM image, which clearly shows the slanted nature of the grating, is shown in FIG. 9 of this article. According to the SEM image, the grating spacing was found to be 0.35 µm and the slant angle of the grating calculated from the SEM image was found to be 26°, which was in agreement with the theoretical expectation. It is also seen from the SEM image that the grating consists of periodic planes of phase separated liquid crystals and polymer.

Figure 13:
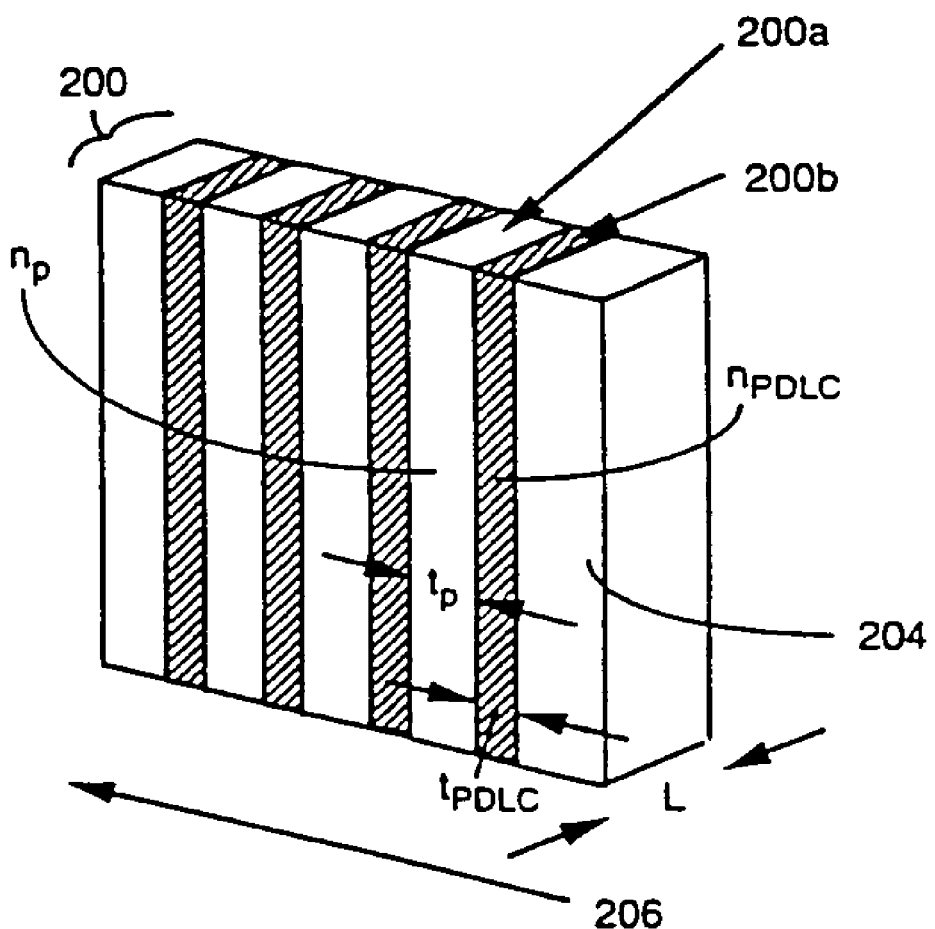
FIG. 13 is an elevational view of a subwavelength grating in accordance with the present invention having periodic planes of polymer channels and PDLC channels disposed perpendicular to the front surface of the grating.

In another embodiment of the present invention, PDLC materials can be made that exhibit a property known as form birefringence whereby polarized light that is transmitted through the grating will have its polarization modified. Such gratings are known as subwavelength gratings, and they behave like a negative uniaxial crystal, such as calcite, potassium dihydrogen phosphate, or lithium niobate, with an optic axis perpendicular to the PDLC planes. Referring now to FIG. 13, there is shown an elevational view of a transmission grating 200 in accordance with the present invention having periodic planes of polymer planes 200a and PDLC planes 200b disposed perpendicular to the front surface 204 of the grating 200. The optic axis 206 is disposed perpendicular to polymer planes 200a and the PDLC planes 200b. Each polymer plane 200a has a thickness $t_p$, and refractive index $n_p$, and each PDLC plane 200b has a thickness $t_{PDLC}$ and refractive index $N_{PDLC}$.

Where the combined thickness of the PDLC plane and the polymer plane is substantially less than an optical wavelength (i.e. $(t_{PDLC}+t_p) \ll \lambda$), the grating will exhibit form birefringence. As discussed below, the magnitude of the shift in polarization is proportional to the length of the grating. Thus, by carefully selecting the length, L, of the subwavelength grating for a given wavelength of light, one can rotate the plane of polarization or create circularly polarized light. Consequently, such subwavelength gratings can be designed to act as a half-wave or quarter-wave plate, respectively. Thus, an advantage of this process is that the birefringence of the material may be controlled by simple design parameters and optimized to a particular wavelength, rather than relying on the given birefringence of any material at that wavelength.

To form a half-wave plate, the retardance of the subwavelength grating must be equal to one-half of a wavelength, i.e., retardance=$\lambda/2$, and to form a quarter-wave plate, the retardance must be equal to one-quarter of a wavelength, i.e., retardance=$\lambda/4$. It is known that the retardance is related to the net birefringence, $|\Delta n|$, which is the difference between the ordinary index of refraction, $n_o$, and the extraordinary index of refraction $n_e$, of the sub-wavelength grating by the following relation:

$$\text{Retardance}=|\Delta n|L=|n_e-n_o|L$$

Thus, for a half-wave plate, i.e., a retardance equal to one-half of a wavelength, the length of the subwavelength grating should be selected so that:

$$L=\lambda/(2|\Delta n|)$$

Similarly, for a quarter-wave plate, i.e., a retardance equal to one-quarter of a wavelength, the length of the subwavelength grating should be selected so that:

$$L=\lambda/(4|\Delta n|)$$

Figure 14A:
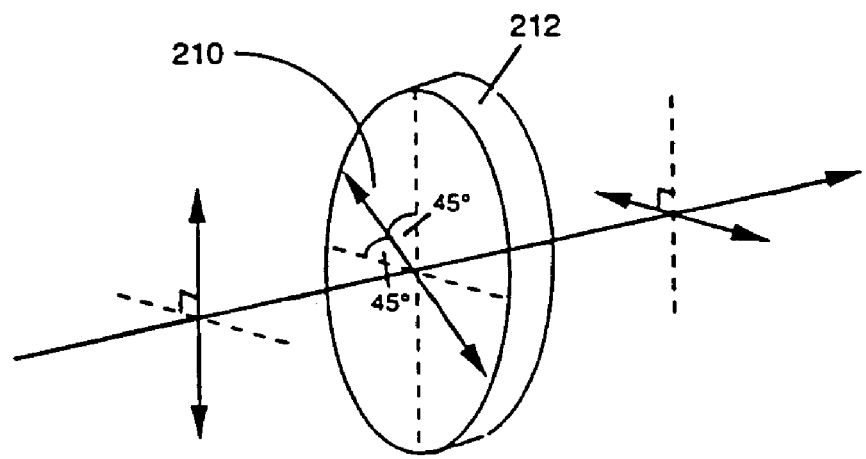
FIG. 14a is an elevational view of a switchable subwavelength grating in accordance with the present invention wherein the subwavelength grating functions as a half wave plate whereby the polarization of the incident radiation is rotated by 90°.
Figure 14B:
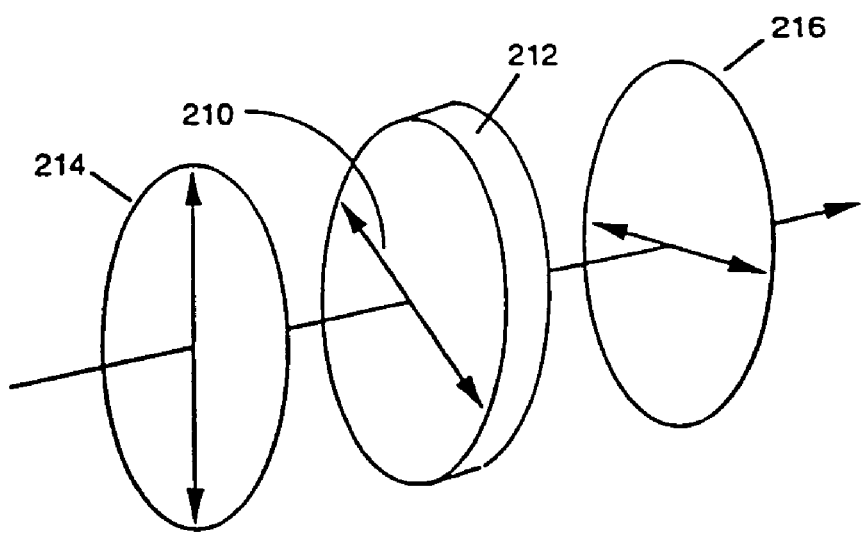
FIG. 14b is an elevational view of the switchable half wave plate shown in FIG. 14a disposed between crossed polarizers whereby the incident light is transmitted.
Figure 14C:
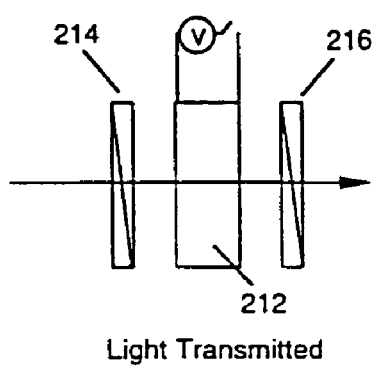
FIGS. 14c and 14d are side views of the switchable half wave plate and crossed polarizers shown in FIG. 14b showing the effect of the application of a voltage to the plate whereby the polarization of the light is no longer rotated and thus blocked by the second polarizer.
Figure 14D:
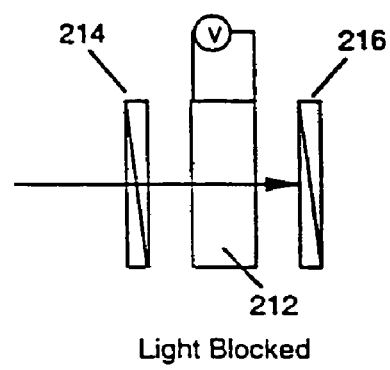

If, for example, the polarization of the incident light is at an angle of 45° with respect to the optic axis 210 of a half-wave plate 212, as shown in FIG. 14a, the plane polarization will be preserved, but the polarization of the wave exiting the plate will be shifted by 90°. Thus, referring now to FIGS. 14b and 14c, where the half-wave plate 212 is placed between cross polarizers 214 and 216, the incident light will be transmitted. If an appropriate switching voltage is applied, as shown in FIG. 14d, the polarization of the light is not rotated and the light will be blocked by the second polarizer.

Figures 15A, 15B:
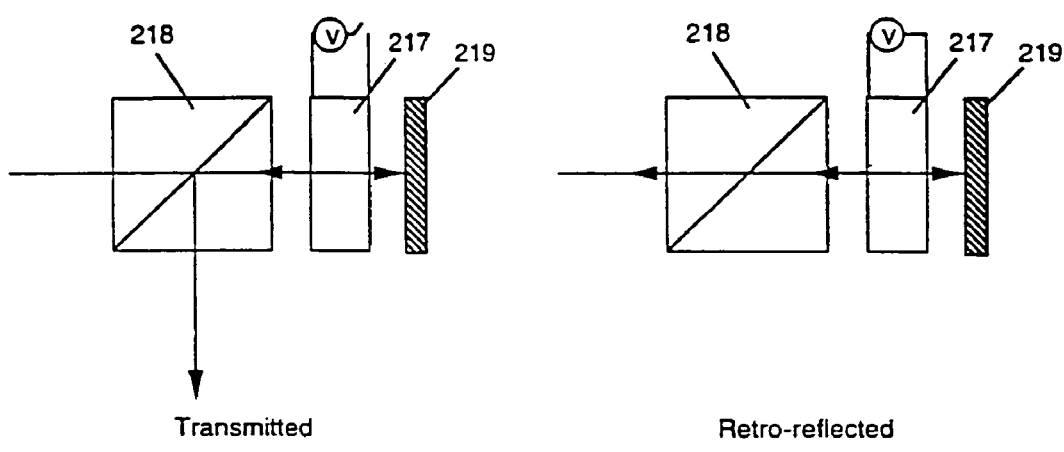
FIG. 15a is a side view of a switchable subwavelength grating in accordance with the invention wherein the subwavelength grating functions as a quarter wave plate whereby plane polarized light is transmitted through the subwavelength grating, retroreflected by a mirror and reflected by the beam splitter.
FIG. 15b is a side view of the switchable subwavelength grating of FIG. 15a showing the effect of the application of a voltage to the plate whereby the polarization of the light is no longer modified, thereby permitting the reflected light to pass through the beam splitter.

For a quarter-wave plate plane polarized light is converted to circularly polarized light. Thus, referring now to FIG. 15a, where quarter wave plate 217 is placed between a polarizing beam splitter 218 and a mirror 219, the reflected light will be reflected by the beam splitter 218. If an appropriate switching voltage is applied, as shown in FIG. 15b, the reflected light will pass through the beam splitter and be retroreflected on the incident beam.

Referring now to FIG. 16a, there is shown an elevational view of a subwavelength grating 230 recorded in accordance with the above-described methods and having periodic planes of polymer channels 230a and PDLC channels 230b disposed perpendicular to the front surface 234 of grating 230. As shown FIG. 16a, the symmetry axis 232 of the liquid crystal domains is disposed in a direction parallel to the front surface 234 of the grating and perpendicular to the periodic channels 230a and b of the grating 230. Thus, when an electric field E is applied across the grating, as shown in FIG. 15b, the symmetry axis 232 distorts and reorients in a direction along the field E, which is perpendicular to the front surface 234 of the grating and parallel to the periodic channels 230a and 230b of the grating 230. As a result, subwavelength grating 230 can be switched between a state where it changes the polarization of the incident radiation and a state in which it does not. Without wishing to be bound by any theory, it is currently believed that the direction of the liquid crystal domain symmetry 232 is due to a surface tension gradient which occurs as a result of the anisotropic diffusion of monomer and liquid crystal during recording of the grating and that this gradient causes the liquid crystal domain symmetry to orient in a direction perpendicular to the periodic planes.

As discussed in Born and Wolf, Principles of Optics, 5th Ed., New York (1975) and incorporated herein by reference, the birefringence of a subwavelength grating is given by the following relation:

$$n_e^2 - n_o^2 = \frac{-[(f_{PDLC})(f_P)(n_{PDLC}^2 - n_p^2)]}{[f_{PDLC}n_{PDLC}^2 + f_P n_p^2]}$$

where
$n_o$=the ordinary index of refraction of the subwavelength grating;
$n_e$=the extraordinary index of refraction;
$n_{PDLC}$=the refractive index of the PDLC plane;
$n_p$=the refractive index of the polymer plane;
$n_{LC}$=the effective refractive index of the liquid crystal seen by an incident optical wave;
$f_{PDLC}=t_{PDLC}/(t_{PDLC}+t_P)$
$f_P=t_P/(t_{PDLC}+t_P)$ Thus, the net birefringence of the subwavelength grating will be zero if $n_{PDLC}=n_p$.

It is known that the effective refractive index of the liquid crystal, $n_{LC}$, is a function of the applied electric field, having a maximum when the field is zero and a value equal to that of the polymer, np, at some value of the electric field, $E_{MAX}$. Thus, by application of an electric field, the refractive index of the liquid crystal, $n_{LC}$, and, hence, the refractive index of the PDLC plane can be altered. Using the relationship set forth above, the net birefringence of a subwavelength grating will be a minimum when $n_{PDLC}$ is equal to $n_p$, i.e., when $n_{LC}=n_p$. Therefore, if the refractive index of the PDLC plane can be matched to the refractive index of the polymer plane, i.e., $n_{PDLC}=n_p$, by the application of an electric field, the birefringence of the subwavelength grating can be switched off.

The following equation for net birefringence, i.e., $|\Delta n|=|n_e-n_o|$, follows from the equation given in Born and Wolf (reproduced above):

$$\Delta n = \frac{-[(f_{PDLC})(f_P)(n_{PDCL}^2 - n_p^2)]}{[2n_{AVG}(f_{PDLC}n_{PDLC}^2 + f_P n_p^2)]}$$

where $n_{AVG}=(n_e+n_o)/2$

Furthermore, it is known that the refractive index of the PDLC plane $n_{PDLC}$ is related to the effective refractive index of the liquid crystal seen by an incident optical wave, $n_{LC}$, and the refractive index of the surrounding polymer plane, $n_p$, by the following relation:

$$n_{PDLC}=n_p+f_{LC}[n_{LC}-n_p]$$

where $f_{LC}$ is the volume fraction of liquid crystal dispersed in the polymer within the PDLC plane, $f_{LC}=[V_{LC}/(V_{LC}+V_P)]$.

By way of example, a typical value for the effective refractive index for the liquid crystal in the absence of an electric field is $n_{LC}=1.7$, and for the polymer layer $n_p=1.5$. For a grating where the thickness of the PDLC planes and the polymer planes are equal (i.e., $t_{PDLC}=t_P$, $f_{PDLC}=0.5=f_P$) and $f_{LC}=0.35$, the net birefringence, $\Delta n$, of the subwavelength grating is approximately 0.008. Thus, where the incident light has a wavelength of 0.8 μm, the length of the subwavelength grating should be 50 μm for a half-wave plate and 25 μm for a quarter-wave plate. Furthermore, by application of an electric field of approximately 5 V/μm, the refractive index of the liquid crystal can be matched to the refractive index of the polymer and the birefringence of the subwavelength grating turned off. Thus, the switching voltage, $V_n$, for a halfwave plate is on the order of 250 volts, and for a quarterwave plate approximately 125 volts.

By applying such voltages, the plates can be switched between the on and off (zero retardance) states on the order of microseconds. As a means of comparison, current Pockels cell technology can be switched in nanoseconds with voltages of approximately 1000-2000 volts, and bulk nematic liquid crystals can be switched on the order of milliseconds with voltages of approximately 5 volts.

Figure 17:
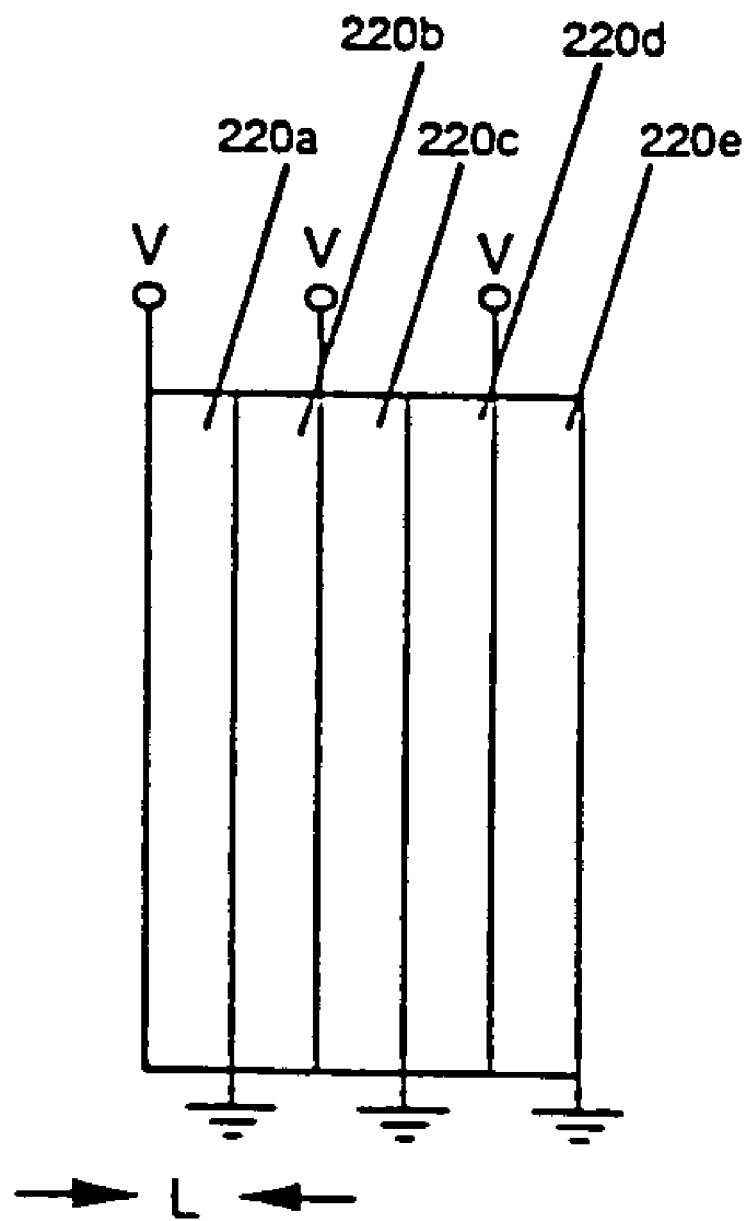
FIG. 17 is a side view of five subwavelength gratings wherein the gratings are stacked and connected electrically in parallel thereby reducing the switching voltage of the subwavelength grating.

In an alternative embodiment of the invention shown in FIG. 17, the switching voltage of the subwavelength grating can be reduced by stacking several subwavelength gratings 220a-e together, and connecting them electrically in parallel. By way of example, it has been found that a stack of five gratings each with a length of 10 μm yields the thickness required for a half-wave plate. It should be noted that the length of the sample is somewhat greater than 50 μm, because each grating includes an indium-tin-oxide coating which acts as a transparent electrode. The switching voltage for such a stack of plates, however, is only 50 volts.

Subwavelength gratings in accordance with the present invention are expected to find suitable application in the areas of polarization optics and optical switches for displays and laser optics, as well as tunable filters for telecommunications, colorimetry, spectroscopy, laser protection, and the like. Similarly, electrically switchable transmission gratings have many applications for which beams of light must be deflected or holographic images switched. Among these applications are: fiber optic switches, reprogrammable N×N optical interconnects for optical computing, beam steering for laser surgery, beam steering for laser radar, holographic image storage and retrieval, digital zoom optics (switchable holographic lenses), graphic arts and entertainment, and the like.

A switchable hologram is one for which the diffraction efficiency of the hologram may be modulated by the application of an electric field, and can be switched from a fully on state (high diffraction efficiency) to a fully off state (low or zero diffraction efficiency). A static hologram is one whose properties remain fixed independent of an applied field. In accordance with the present invention, a high contrast static hologram can also be created. In this variation of the present invention, the holograms are recorded as described previously. The cured polymer film is then soaked in a suitable solvent at room temperature for a short duration and finally dried. For the liquid crystal E7, methanol has shown satisfactory application. Other potential solvents include alcohols such as ethanol, hydrocarbons such as hexane and heptane, and the like. When the material is dried, a high contrast static hologram with high diffraction efficiency results. The high diffraction efficiency is a consequence of the large index modulation in the film (Δn~0.5) because the second phase domains are replaced with empty (air) voids (n~1).

Similarly, in accordance with the present invention, a high birefringence static sub-wavelength wave-plate can also be formed. Due to the fact that the refractive index for air is significantly lower than for most liquid crystals, the corresponding thickness of the half-wave plate would be reduced accordingly. Synthesized waveplates in accordance with the present invention can be used in many applications employing polarization optics, particularly where a material of the appropriate birefringence at the appropriate wavelength is unavailable, too costly, or too bulky.

In the claims, the term polymer-dispersed liquid crystals and polymer-dispersed liquid crystal material includes, as may be appropriate, solutions in which none of the monomers have yet polymerized or cured, solutions in which some polymerization has occurred, and solutions which have undergone complete polymerization. Those of skill in the art in the field of the invention will clearly understand that the use herein of the standard term used in the art, polymer-dispersed liquid crystals (which grammatically refers to liquid crystals dispersed in a fully polymerized matrix) is meant to include all or part of a more grammatically correct prepolymer-dispersed liquid crystal material or a more grammatically correct starting material for a polymer-dispersed liquid crystal material.

It will be seen that modifications to the invention as described may be made, as might occur to one with skill in the field of the invention, within the intended scope of the claims. Therefore, all embodiments contemplated have not been shown in complete detail. Other embodiments may be developed without departing from the spirit of the invention or from the scope of the claims.

What is claimed is:

1. A method for forming a hologram, the method comprising the steps of:
   providing a mixture comprising a polymerizable monomer and a second phase material;
   inducing photopolymerization by illuminating the mixture with a light pattern; and
   modulating a dielectric constant of the mixture.

2. The method of claim 1, wherein the mixture further comprises a photoinitiator dye.

3. The method of claim 1, wherein the mixture further comprises a coinitiator.

4. The method of claim 1, wherein the mixture further comprises a chain extender or a cross-linker.

5. The method of claim 1, wherein the mixture further comprises a surfactant.

6. The method of claim 1, wherein the polymerizable monomer comprises at least one of a di-, tri-, tetra-, and pentaacrylates.

7. The method of claim 1, wherein the polymerizable monomer comprises a mixture of urethane acrylates with functionalities 3, 4, 5, and 6.

8. The method of claim 6, wherein the polymerizable monomer is at least one acrylate selected from the group consisting of triethyleneglycol diacrylate, trimethylolpropane triacrylate, pentaerythritol triacrylate, pentaerythritol tetracrylate, and dipentaerythritol pentaacrylate.

9. The method of claim 6, wherein the polymerizable monomer is at least one acrylate selected from the group consisting of urethane acrylates with functionalities 3, 4, 5, and 6.

10. The method of claim 1, wherein the second phase material is selected from the group consisting of a mixture of cyanobiphenyls, 4'-n-pentyl-4-cyanobiphenyl, 4'-n-heptyl-4-cyanobiphenyl, 4'-octaoxy-4-cyanobiphenyl, 4'-pentyl-4-cyanoterphenyl, and α-methoxybenzylidene-4'-butylaniline, or the class of fluoro and chloro substituted biphenyls and triphenyls.

11. The method of claim 4, wherein the chain extender is at least one member selected from the group consisting of N-vinyl pyrrolidone; N-vinyl pyridine, acrylonitrile, and N-vinyl carbazole.

12. The method of claim 3, wherein the coinitiator is at least one member selected from the group consisting of N-phenylglycine, triethylene amine, triethanolamine, N,N-dimethyl-2,6-diisopropyl aniline, halogenated N-phenylglycine, 3,3,4,4'-tetrakis(t-butyl peroxy carbonyl)-benzophenone, trimethylfuran, and triaayl alkyl borate salt.

13. The method of claim 2, wherein the photoinitiator dye is at least one member selected from the group consisting of rose bengal ester, rose bengal sodium salt, eosin, eosin sodium salt, 4,5-diiodosuccinyl fluorescein, camphorquinone, methylene blue, cationic cyanine dyes with trialkylborate anions, merocyanine dyes derived from spiropyran, benzophenone, 2,2-dimethyl-2 hydroxyacetophenone, diphenyl (2,4,6-trimethylbenzoyl)-phosphine oxide, 2-benzyl-2-dimethylamino-1-(4-monopholinophenyl)-butan-1-one, bis(pentafluorophenyl)titanocene, metallo-benzoporphyrins, 3-substituted keto coumarin dye, thioxanthene dye, and diphenyl iodonium salts.

14. The method of claim 1, wherein the light pattern is obtained from at least four beams of coherent light.

15. The method of claim 5, wherein the surfactant is selected from the group consisting of octanoic acid, decanoic acid and dodecanoic acid.

16. The method of claim 1, wherein the polymerizable monomer comprises dipentaerythritol pentaacrylate, second phase material comprises the at least one liquid crystal comprising cyanobiphenyls the mixture further comprises, the chain-extending monomer being N-vinyl pyrrolidone, the coinitiator being N-phenylglycine, and the photoinitiator being rose bengal sodium salt.

17. A method for making an anisotropic spatial distribution of phase-separated liquid crystal droplets within a photochemically cured polymer matrix, the method comprising the steps of:
   disposing between at least two optically transparent electrode plates, a mixture that comprises, before exposure:
   (a) a polymerizable monomer comprising multifunctional aliphatic and aromatic thiols;
   (b) an allyl ether or multifunctional acrylate;

(c) a liquid crystal; and
(d) a photoinitiator; and
exposing this mixture to light in an interference pattern.

18. The method of claim 17, wherein the liquid crystal droplets separate at crystal lattice or interstitial points within the polymer matrix.

19. The method of claim 17, wherein the liquid crystal droplets are up to approximately 50 nm in diameter.

* * * * *